(12) United States Patent
Ootani et al.

(10) Patent No.: US 7,604,081 B2
(45) Date of Patent: Oct. 20, 2009

(54) VEHICLE PASSENGER RESTRICTING SYSTEM FOR VEHICLE ROLLOVER CONDITION

(75) Inventors: Ryuuji Ootani, Yokosuka (JP); Chinmoy Pal, Yokohama (JP); Katsushi Saito, Yokosuka (JP); Tsuneyuki Watanabe, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 259 days.

(21) Appl. No.: 11/594,247

(22) Filed: Nov. 8, 2006

(65) Prior Publication Data

US 2007/0107969 A1    May 17, 2007

(30) Foreign Application Priority Data

Nov. 11, 2005  (JP)  ............... 2005-327489
Aug. 25, 2006  (JP)  ............... 2006-228872

(51) Int. Cl.
B60K 28/12   (2006.01)
B60K 28/14   (2006.01)
B60R 21/00   (2006.01)
B60R 22/36   (2006.01)

(52) U.S. Cl. .................. 180/282; 180/268; 280/806; 297/216.1; 297/216.13; 297/468

(58) Field of Classification Search .......... 180/282, 180/268; 297/216.1, 216.13, 468; 280/806
See application file for complete search history.

(56) References Cited

U.S. PATENT DOCUMENTS

| 4,568,106 | A  | * | 2/1986  | Yokoyama ............. 280/807 |
| 5,249,840 | A  | * | 10/1993 | Hoshihara et al. ..... 297/378.12 |
| 5,716,102 | A  | * | 2/1998  | Ray et al. ............. 297/478 |
| 6,068,340 | A  | * | 5/2000  | Yano et al. ........... 297/478 |
| 6,076,887 | A  | * | 6/2000  | Andersson ............. 297/216.1 |
| 6,182,783 | B1 | * | 2/2001  | Bayley ................. 180/282 |
| 6,244,621 | B1 | * | 6/2001  | Kameyoshi et al. ..... 280/733 |
| 6,406,059 | B1 | * | 6/2002  | Taubenberger et al. .. 280/733 |
| 6,481,777 | B2 | * | 11/2002 | Mans .................. 296/68.1 |
| 6,499,554 | B1 | * | 12/2002 | Yano et al. ........... 180/268 |
| 6,988,026 | B2 | * | 1/2006  | Breed et al. .......... 701/29 |
| 7,089,099 | B2 | * | 8/2006  | Shostak et al. ........ 701/32 |
| 7,162,340 | B2 | * | 1/2007  | Schubert et al. ....... 701/38 |
| 7,195,092 | B2 | * | 3/2007  | Wu et al. ............. 180/282 |

(Continued)

FOREIGN PATENT DOCUMENTS

JP    2000-142303    5/2000

(Continued)

*Primary Examiner*—Ruth Ilan
*Assistant Examiner*—James English
(74) *Attorney, Agent, or Firm*—Global IP Counselors, LLP

(57) ABSTRACT

A vehicle passenger restricting system is provided to restrict passenger movement so that a space between a passenger's head and the ceiling of the vehicle is effectively enlarged when a rollover condition occurs. The vehicle passenger restricting system has a passenger seat, a rollover detector, a seat tilting device and a controller. The rollover detector detects a vehicle rollover condition. The vehicle passenger restricting device restricts passenger movement on the passenger seat. The seat tilting device tilts the seat in a backward direction. The controller activates the seat tilting device to recline the seat backwards when the rollover detector detects the vehicle rollover condition exists. Preferably, the controller also operates the restricting device when it determines that a rollover condition exists.

22 Claims, 70 Drawing Sheets

U.S. PATENT DOCUMENTS

| | | | |
|---|---|---|---|
| 7,201,447 B2* | 4/2007 | Yamada | 297/367 |
| 7,216,931 B2* | 5/2007 | Friedman | 297/216.1 |
| 7,243,945 B2* | 7/2007 | Breed et al. | 280/735 |
| 7,278,682 B2* | 10/2007 | Friedman et al. | 297/216.1 |
| 7,380,631 B2* | 6/2008 | Midorikawa | 180/268 |
| 7,380,821 B2* | 6/2008 | Higuchi | 280/743.1 |
| 7,386,384 B2* | 6/2008 | Le et al. | 701/70 |
| 2001/0040065 A1* | 11/2001 | Takagi et al. | 180/274 |
| 2003/0182042 A1* | 9/2003 | Watson et al. | 701/45 |
| 2004/0182963 A1* | 9/2004 | Mori et al. | 242/374 |
| 2005/0179239 A1* | 8/2005 | Farmer et al. | 280/735 |
| 2005/0263990 A1* | 12/2005 | Clute | 280/733 |
| 2006/0001298 A1* | 1/2006 | Tsuruta et al. | 297/216.16 |
| 2006/0042851 A1* | 3/2006 | Herrmann et al. | 180/271 |
| 2006/0175116 A1* | 8/2006 | Friedman et al. | 180/282 |
| 2006/0220426 A1* | 10/2006 | Moffatt et al. | 297/216.19 |
| 2007/0084128 A1* | 4/2007 | Recknagel et al. | 49/502 |

FOREIGN PATENT DOCUMENTS

WO     WO 2005/044634     *    5/2005

* cited by examiner

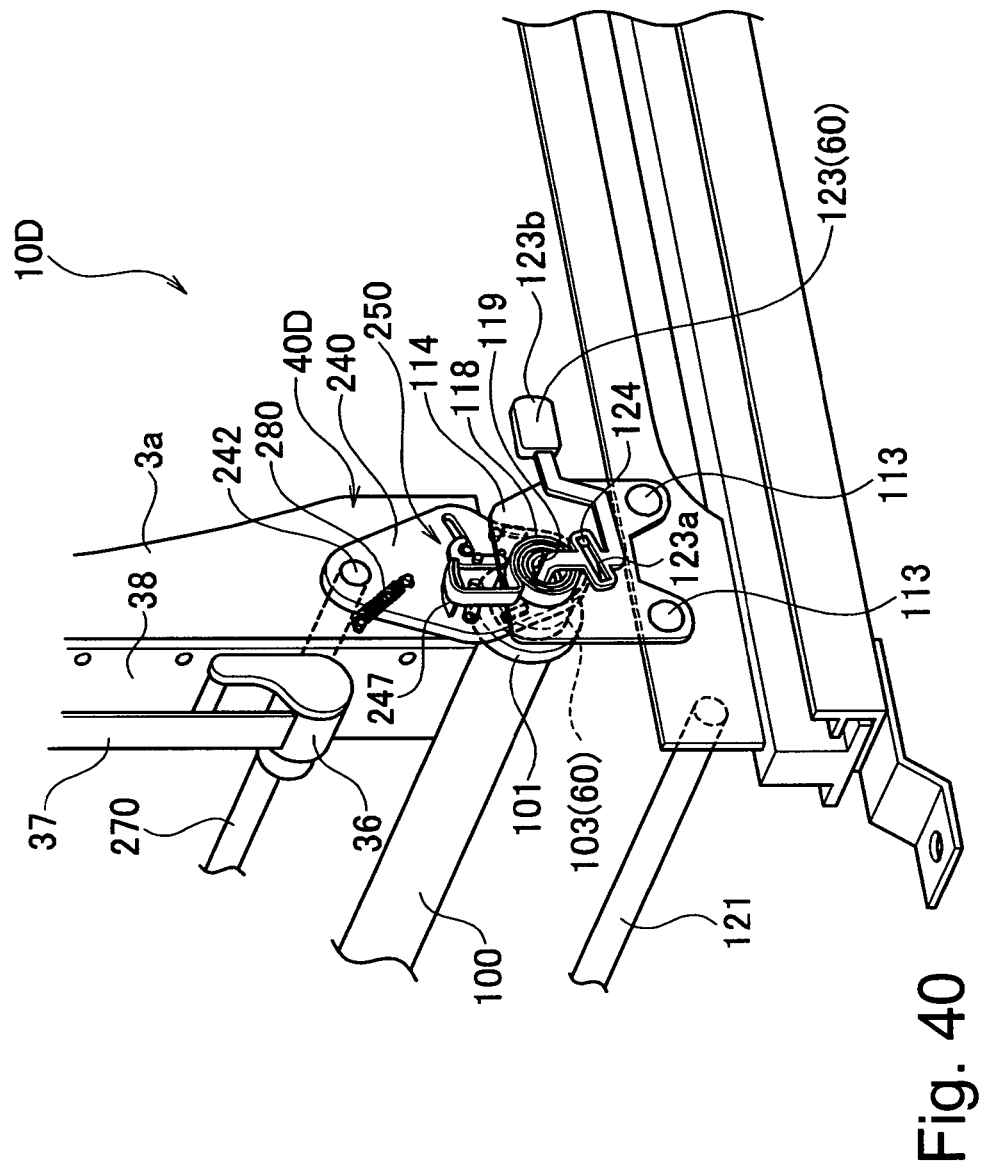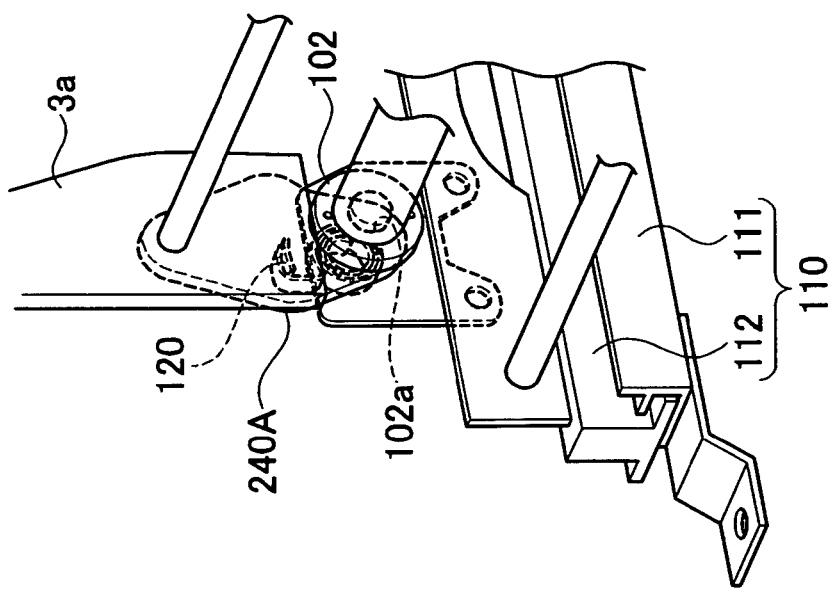
Fig. 40

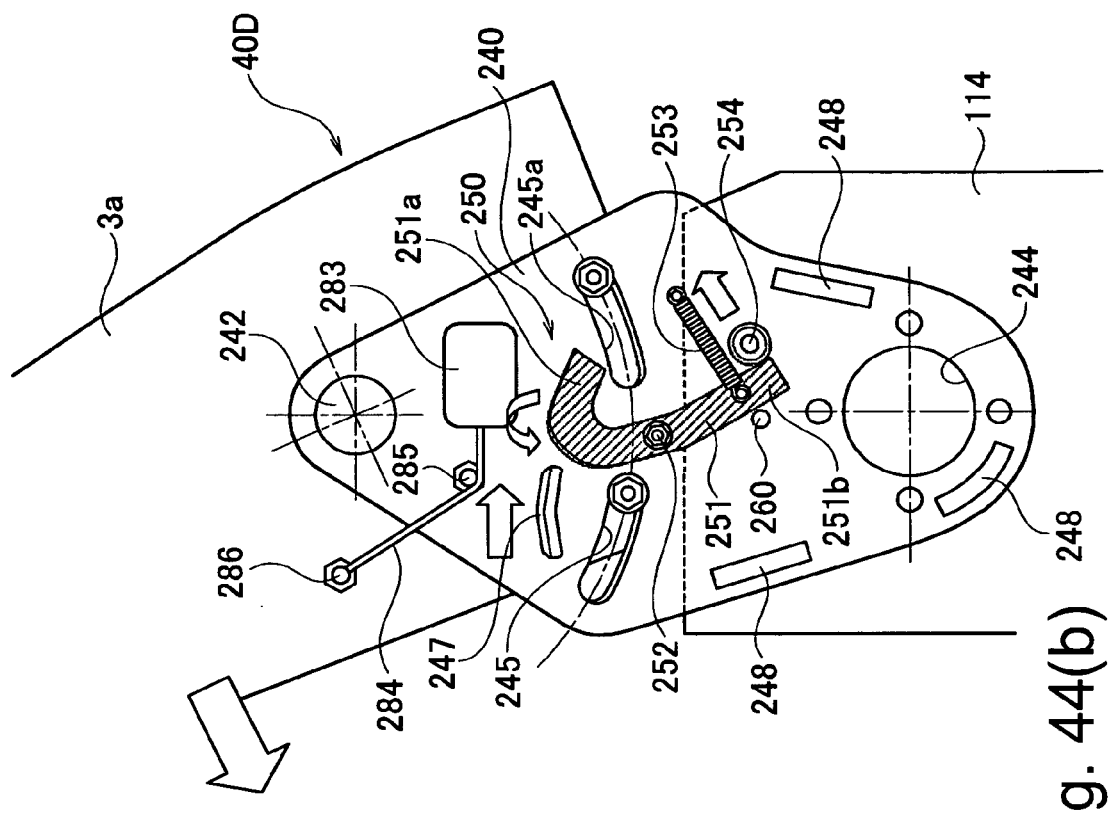
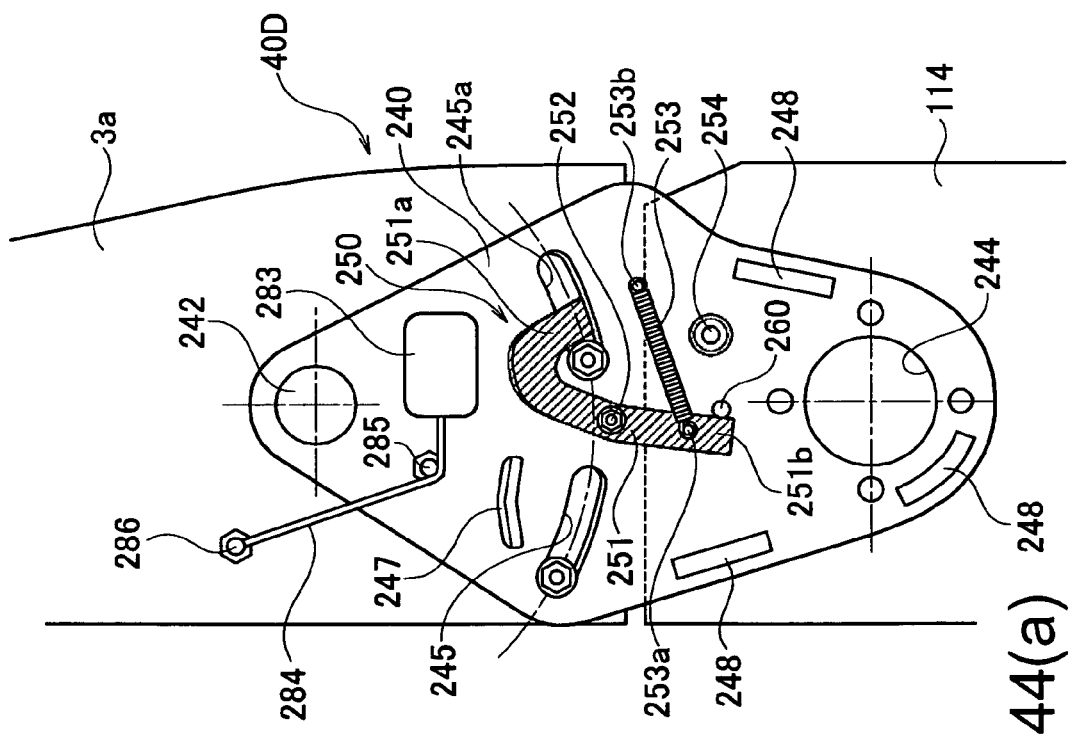
Fig. 44(a)
Fig. 44(b)

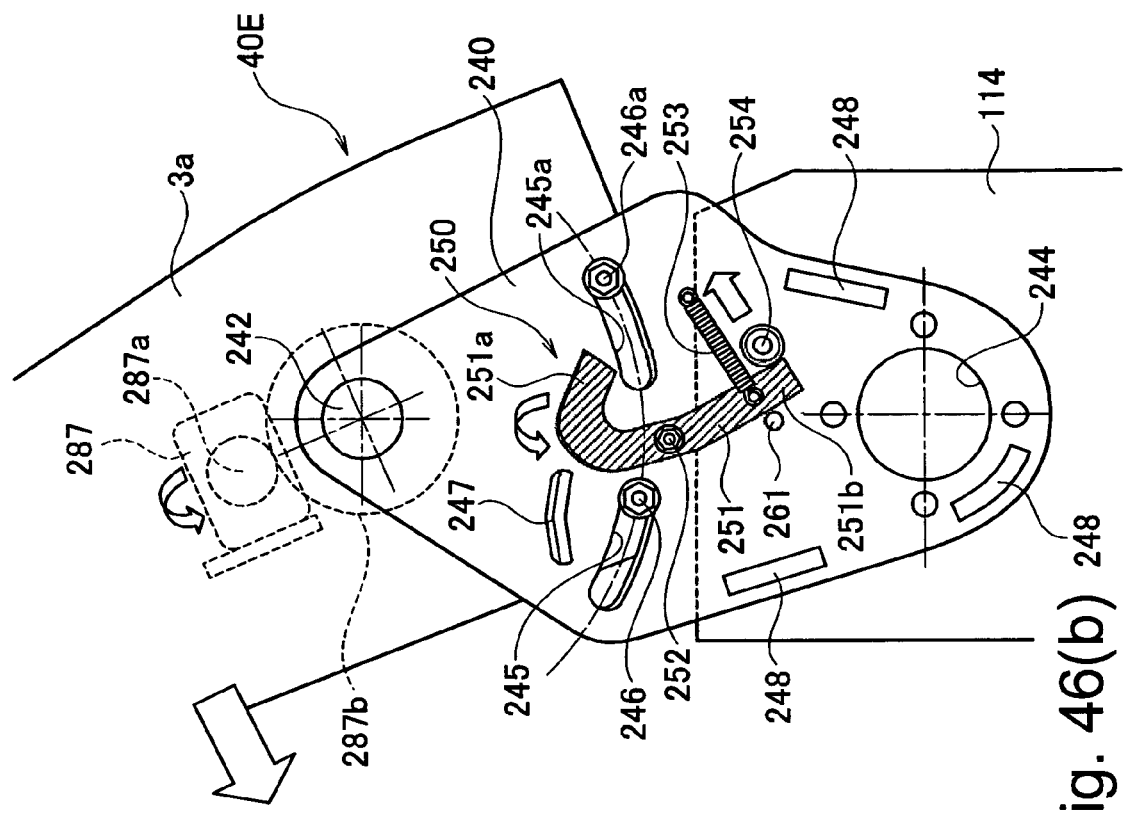
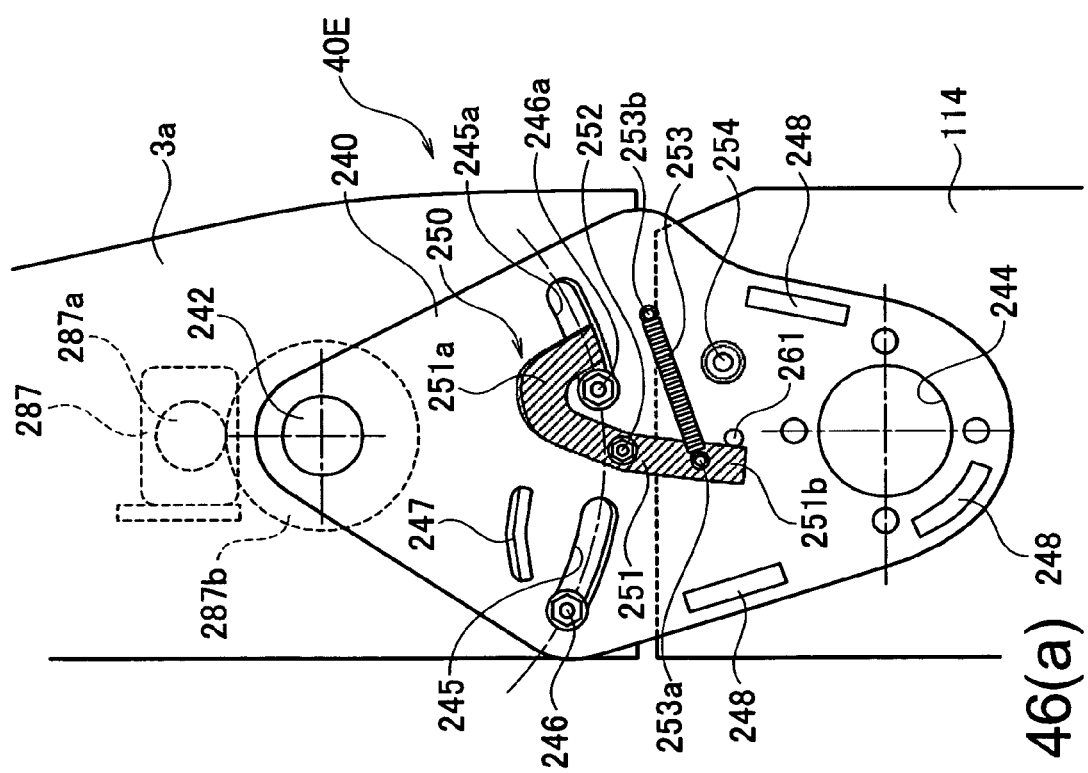

VEHICLE PASSENGER RESTRICTING SYSTEM FOR VEHICLE ROLLOVER CONDITION

CROSS-REFERENCE TO RELATED APPLICATIONS

This application claims priority to Japanese Patent Application Nos. 2005-327489, filed on Nov. 11, 2005 and 2006-228872, filed on Aug. 25, 2006. The entire disclosure of Japanese Patent Application Nos. 2005-327489 and 2006-228872 are hereby incorporated herein by reference.

BACKGROUND OF THE INVENTION

1. Field of the Invention

The present invention generally relates to a passenger restricting system for a passenger of a vehicle when the vehicle undergoes a rollover condition. More specifically, the present invention relates to a passenger restricting system in which a passenger seat is reclined when the vehicle undergoes a rollover condition.

2. Background Information

An air bag installed in an outside portion of a passenger compartment of a vehicle has been proposed as a restricting device for restricting movement of a passenger when a vehicle rolls over. The air bag is positioned in the vicinity of the passenger's head. When a rollover condition is detected, the air bag is inflated so as to restrict the passenger's head. (See, for example, Japanese Laid-Open Patent Publication No. 2000-142303, pages 5 to 6, FIG. 2.)

SUMMARY OF THE INVENTION

When a vehicle rolls over, there is the possibility that it may turn upside down and land on its roof and that the passenger's head may contact the ceiling of the vehicle. With an air bag serving as a restricting device as described in Japanese Laid-Open Patent Publication No. 2000-142303, lateral movement of the passenger's head can be restricted but the passenger's head cannot be positively prevented from contacting the ceiling.

Therefore, one object of the present invention is to provide a passenger restricting system and a passenger restricting method whereby the space between the passenger's head and the ceiling is enlarged when a rollover condition occurs such that the passenger's head can be protected with a higher degree of effectiveness.

In accordance with one aspect of the present invention is to provide a passenger restricting system that basically comprises a passenger seat, a rollover detector, a vehicle passenger restricting device, a seat tilting device and a controller. The rollover detector is configured to detect a vehicle rollover condition. The vehicle passenger restricting device is configured to restrict passenger movement on the passenger seat. The seat tilting device is configured to tilt the seat in a backward direction. The controller is configured to activate the seat tilting device to recline the seat backwards when the rollover detector detects the vehicle rollover condition exists.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 40 is an assembled perspective view of selected details of the internal structure of the lower portion of the seat back in accordance with the fifth embodiment of the present invention;

FIG. 44(a) is an enlarged side view of the main components of a seat back tilt-back device in accordance with a variation of the fifth embodiment of the present invention, with the seat back tilt-back device shown in a locked state;

FIG. 44(b) is an enlarged side view of the main components of a seat back tilt-back device in accordance with a variation of the fifth embodiment of the present invention, with the seat back tilt-back device shown in a released state;

FIG. 46(a) is an enlarged side view of the main components of a seat back tilt-back device in accordance with the sixth embodiment of the present invention, the seat back tilt-back device shown in a locked state;

FIG. 46(b) is an enlarged side view of the main components of a seat back tilt-back device in accordance with the sixth embodiment of the present invention, the seat back tilt-back device shown in a released state;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
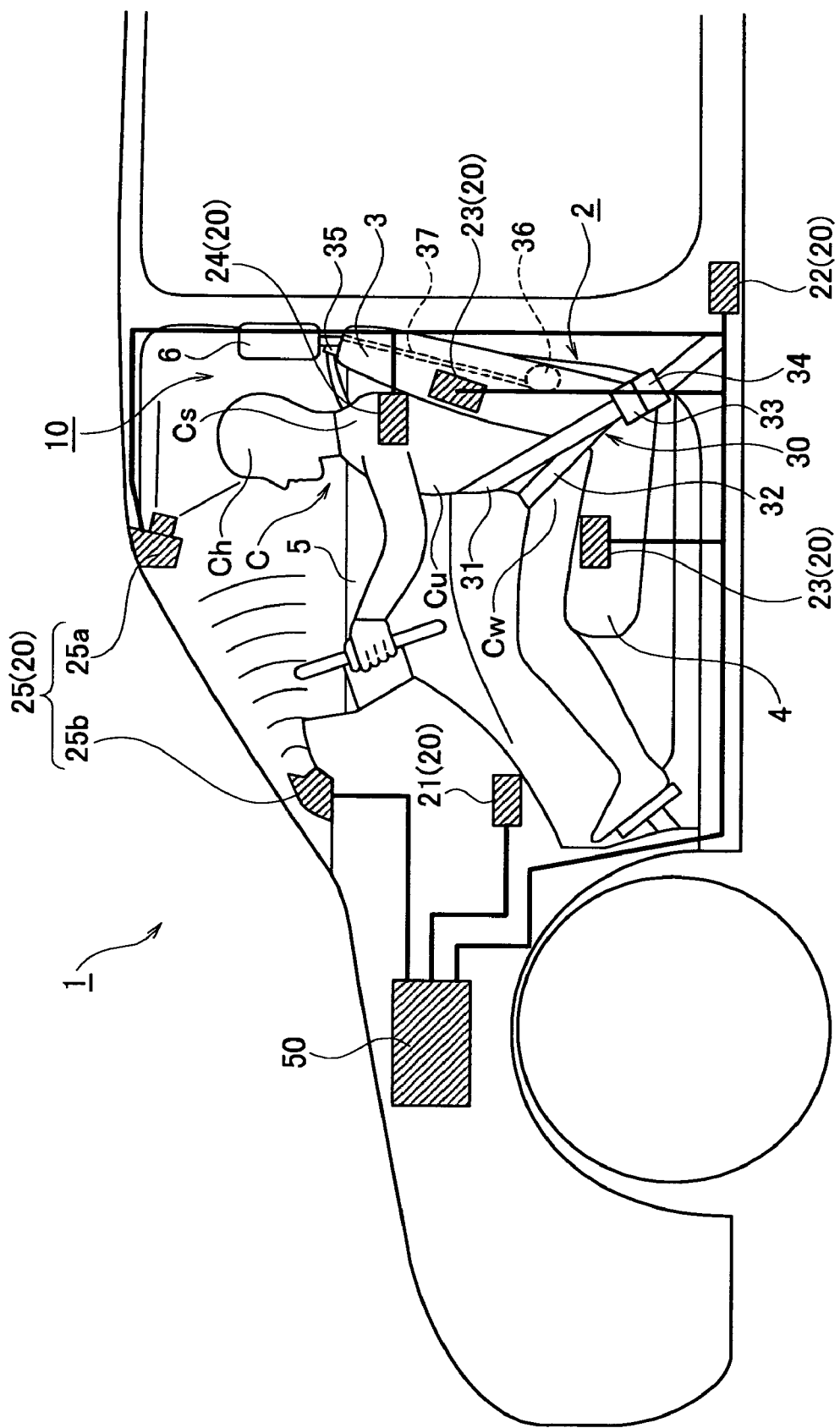
FIG. 1 is a schematic side view of a front half portion of a vehicle equipped with a passenger restricting system in accordance with a first embodiment of the present invention.

Referring initially to FIG. 1, a vehicle 1 is schematically illustrated in which a seat 2 having a seat back 3 and a seat cushion 4 is equipped a vehicle rollover passenger restricting system 10 in accordance with a first embodiment of the present invention. In this embodiment, the vehicle rollover passenger restricting system 10 is employed in the seat 2 of the vehicle 1 to restrict a passenger C when the vehicle rolls over. The passenger restricting system 10 basically includes a vehicle rollover detector 20, a seat belt apparatus 30, a seat back tilt-back device 40 and a controller 50. The vehicle rollover detector 20 is configured and arranged to detect a rollover state of the vehicle 1. The seat belt apparatus 30 serves as a passenger restraining device that is configured to restrain the passenger C in the seat 2. The seat back tilt-back device 40 (see FIG. 3) is configured and arranged to tilt the seat back 3 of the seat 2 rearward by a prescribed amount with respect to the seat cushion 4 of the seat 2. The controller 50 serves as a control device that is configured to determine if a rollover condition exists based on a detection signal from the vehicle rollover detector 20 and to operate the seat belt apparatus 30 and the seat back tilt-back device 40 when it determines that a rollover condition exists.

With the present invention, as explained below in greater detail, when a rollover condition of the vehicle 1 is detected, the passenger is restrained to the seat 2 and the seat 2 is tilted back by a prescribed amount. The tilting back of the seat 2 causes the passenger's head to move rearward and the space between the passenger's head and the ceiling of the vehicle to increase. As a result, contact of the passenger's head against the ceiling can be suppressed in an effective manner.

Figure 2:
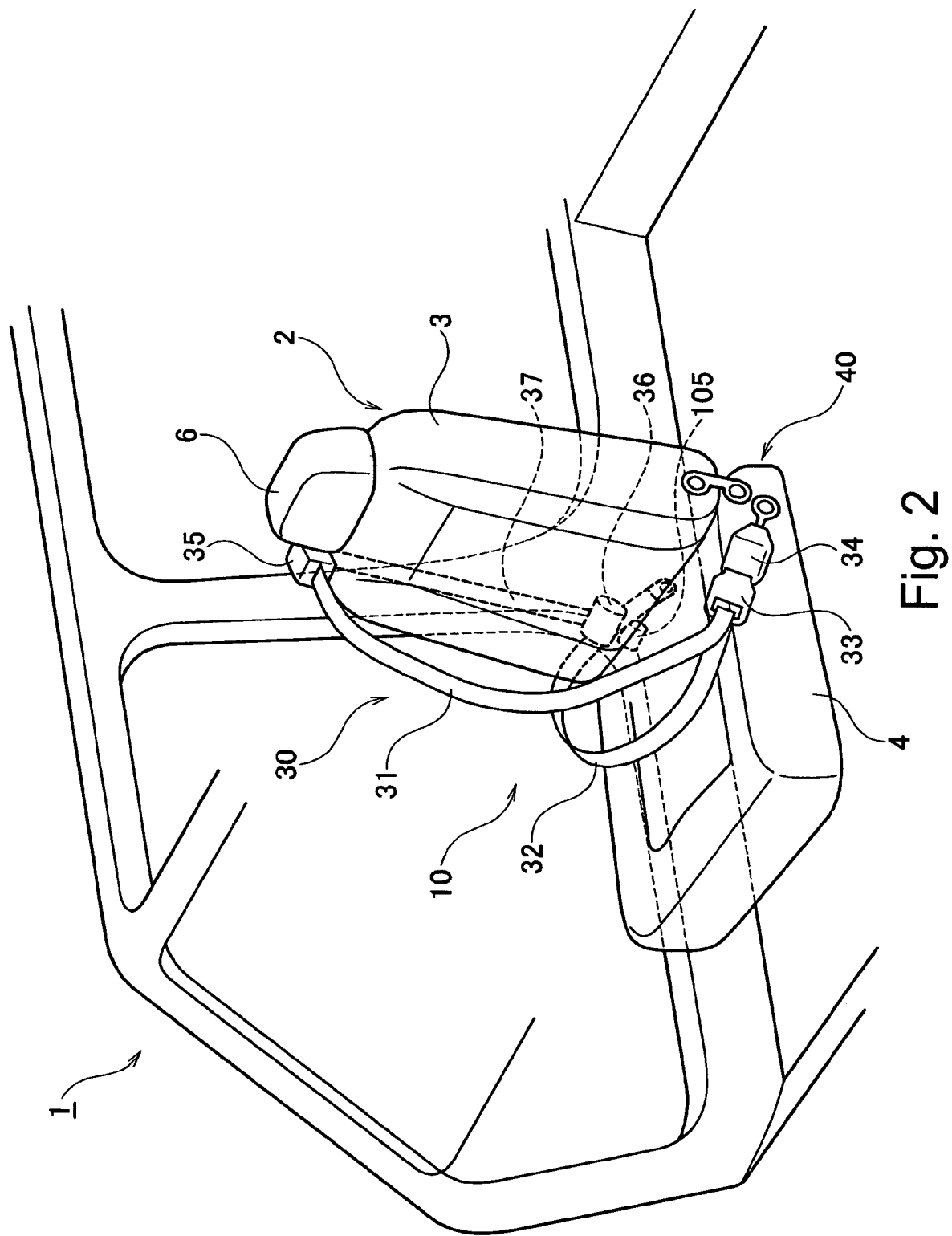
FIG. 2 is a perspective view of a passenger seat in which the passenger restricting system is equipped in accordance with the first embodiment of the present invention, with the seat shown during normal driving conditions.

As shown in FIG. 2, the seat belt apparatus 30 includes a shoulder belt 31 and a lap belt 32. The shoulder belt 31 is configured to restrain the upper body (torso) Cu of the passenger C to the seat back 3. The lap belt 32 is configured to restrain the waist area Cw of the passenger C to the seat cushion 4. Thus, a three-point seat belt structure is formed.

More specifically, the shoulder belt 31 is arranged to span diagonally from the shoulder Cs of the passenger C located closer to the outside of the vehicle to the side of the waist area Cw located farther inside the vehicle. The lap belt 32 is arranged to span across both sides of the waist area Cw. The shoulder belt 31 and the lap belt 32 constitute a single continuous piece of seat belt webbing 37 and are separated by a tongue 33 through which the seat belt webbing 37 passes. The tongue 33 is configured to be detachably engaged with an inner buckle 34.

The upper end of the shoulder belt 31 (i.e., the end near the passenger's shoulder) passes through a webbing passage opening 35 provided on an upper end portion of the seat back 3 and is drawn into the inside of the seat back 3. An electric retractor 36 serves as a seat belt webbing retracting device. The electric retractor 36 is installed inside a lower portion of the seat back 3 and retracts the shoulder belt 31 (i.e., the seat belt webbing 37).

The electric retractor 36 is provided with a pre-tensioner function and a load limiter function. Additionally, the electric retractor 36 is equipped with a motorized retracting device configured to retract and dispense the seat belt webbing 37 under normal circumstances and an explosive retracting device for retracting the seat belt webbing 37 in an emergency situation, such as a collision or a rollover condition.

As shown in FIG. 1, the vehicle rollover detector 20 includes at least an angular velocity sensor 21 that is configured and arranged to measure the roll angle and roll rate of the vehicle 1. The angular velocity sensor 21 feeds a roll angle signal and a roll rate signal to the controller 50. The controller 50 then determines if the vehicle is rolling over based on the map shown in FIG. 11. The controller 50 determines that the vehicle is rolling over when the roll angle and roll rate lie in a region B where a prescribed threshold value K is exceeded.

In order to accurately detect a rollover condition, in addition to the angular velocity sensor 21, the vehicle rollover detector 20 preferably includes an acceleration sensor 22, a seat pressure sensor 23, a trim pressure sensor 24 and a passenger movement sensor 25. The acceleration sensor 22 is configured and arranged to measure a lateral acceleration of the vehicle 1. The seat pressure sensor 23 is configured and arranged to measure a distribution of contact pressure of the passenger C against the seat 2. The trim pressure sensor 24 is configured and arranged to measure a contact pressure of the passenger C against a door trim 5. The passenger movement sensor 25 includes a small camera 25a and an ultrasound sensor 25b that are configured and arranged to measure a movement of the passenger's head Ch and a movement of the passenger's upper body Cu (head Ch), respectively.

The controller 50 is configured to determine that a rollover condition exists when the roll angle and roll rate, the lateral acceleration, the contact pressure against the seat, the contact pressure against the trim, and the passenger movement amount (i.e., the movement of the upper body Cu of the passenger C) each lie in a region where a threshold value K is exceeded. Thus, the controller 50 detects movement of the upper body of the passenger C and triggers operation of the seat belt apparatus 30 when the upper body movement exceeds a prescribed threshold value.

Figure 3:
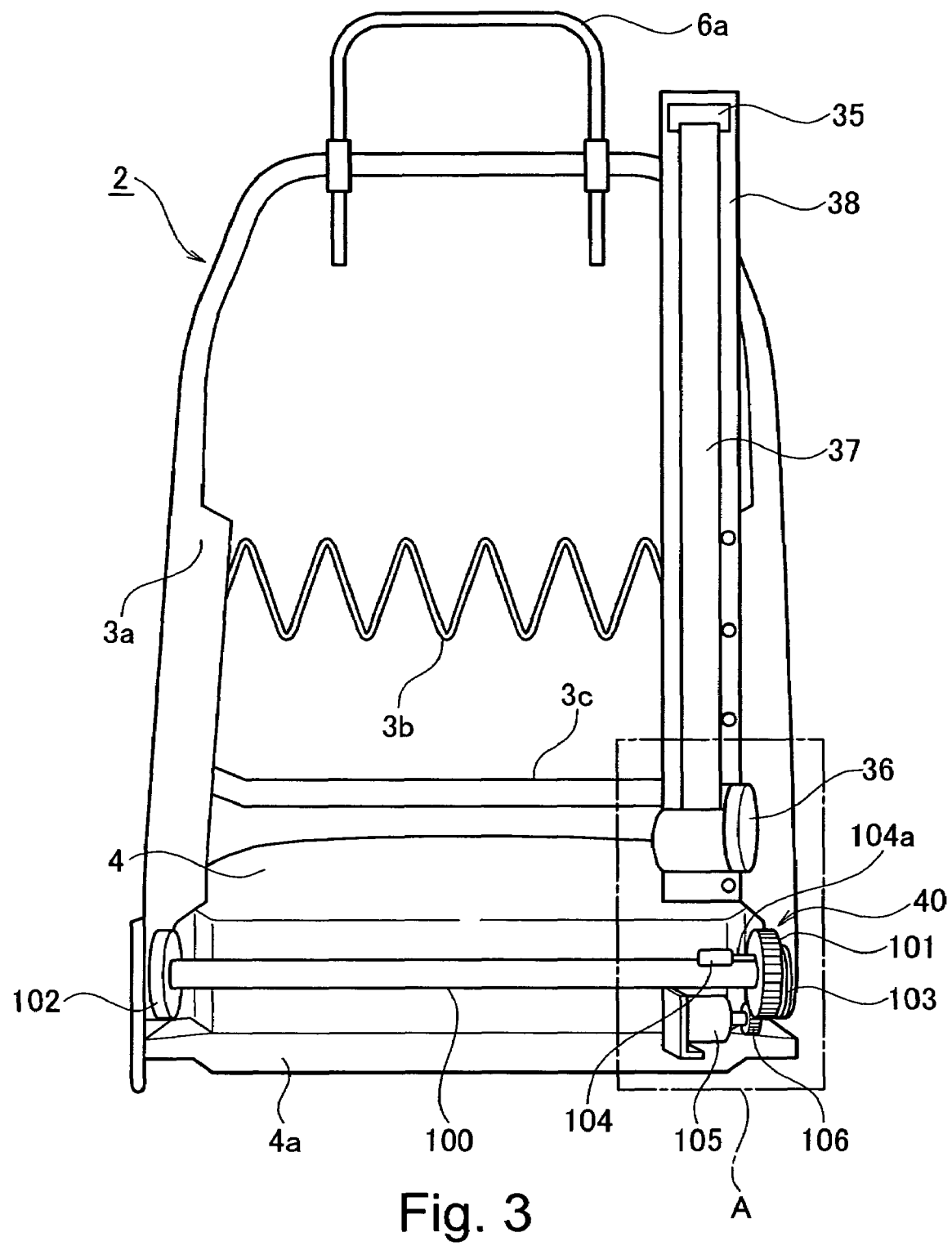
FIG. 3 is a rear view of selected portions of the internal structure of the passenger seat in which the passenger restricting system is equipped in accordance with the first embodiment of the present invention.
Figure 4:
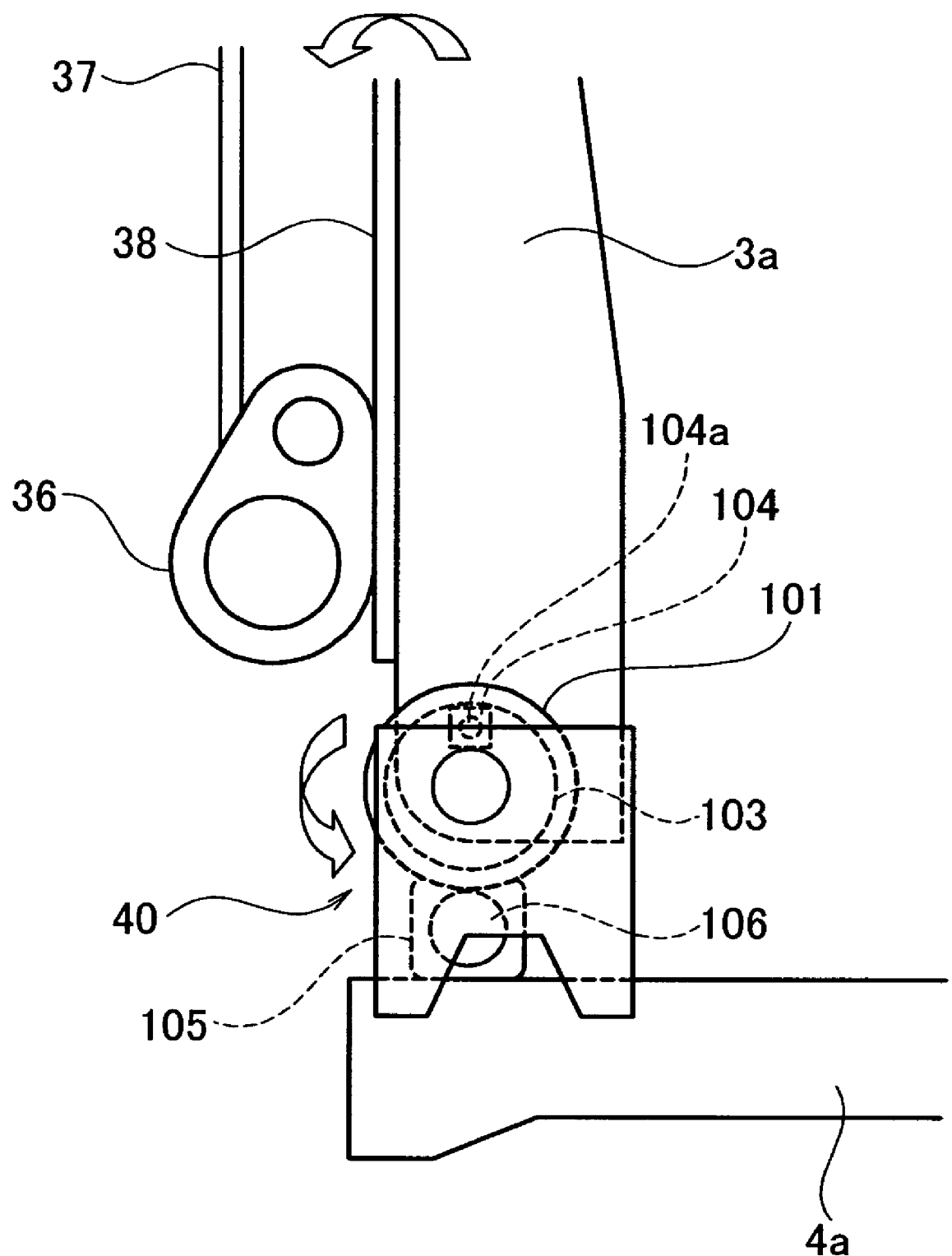
FIG. 4 is an enlarged, partial side view of the portion A of the internal structure of the passenger seat illustrated in FIG. 3.

As shown in FIGS. 3 and 4, the seat 2 (which is provided with the seat back tilt-back device 40) has a seat back frame 3a shaped generally like an upside down U and a headrest frame 6a of a headrest 6 is mounted to an upper end portion of the seat back frame 3a. A seat back spring 3b and a reinforcing frame 3c are provided so as to span between the left and right sides of the seat back frame 3a at a generally central position relative to the vertical direction of the seat back 3. A main shaft 100 serving as the tilt axis of the seat back 3 is provided at a bottom end portion of the seat back frame 3a and is coupled to a rearward end portion of a seat cushion frame 4a of the seat cushion 4.

Shaft guides 101 and 102 serving to fix the tilt position of the seat back 3 are provided on both end portions of the main shaft 100 and a seat back recliner 103 for adjusting the reclining position of the seat back 3 as desired is provided on one end of the main shaft 100.

A solenoid 104 is provided at the same end of the main shaft 100 as the seat back recliner 103. The solenoid 104 has an operating pin configured to engage with and disengage from the shaft guide 101, the seat back recliner 103 and the seat back frame 3a. The solenoid 104 extends and retracts the operating pin 104a in accordance with a command signal from the controller 50.

The outside circumference of the shaft guide 101 is provided with gear teeth configured to mesh with a gear 106 of a seat tilting motor 105 provided on the seat cushion frame 4a. When a rollover condition is detected, the controller 50 issues a command signal to the seat tilting motor 105 and the seat tilting motor 105 rotates the gear 106. As a result, the gear 106 rotates the shaft guide 101 such that the seat back 3 is tilted back by a prescribed amount. The shaft guide 101, the solenoid 104, and the seat tilting motor 105 constitute the seat back tilt-back device 40.

A webbing guide 38 is arranged on the seat back frame 3a such that it extends upward from the mounting portion of the electric retractor 36 and protrudes slightly from the upper end of the seat back frame 3a. The webbing passage opening 35 is provided on the protruding portion of the webbing guide 38. The seat belt webbing 37 dispensed from the electric retractor 36 passes through the webbing passage opening 35 and extends in front of the seat back 3 to become the shoulder belt 31.

Figure 5:
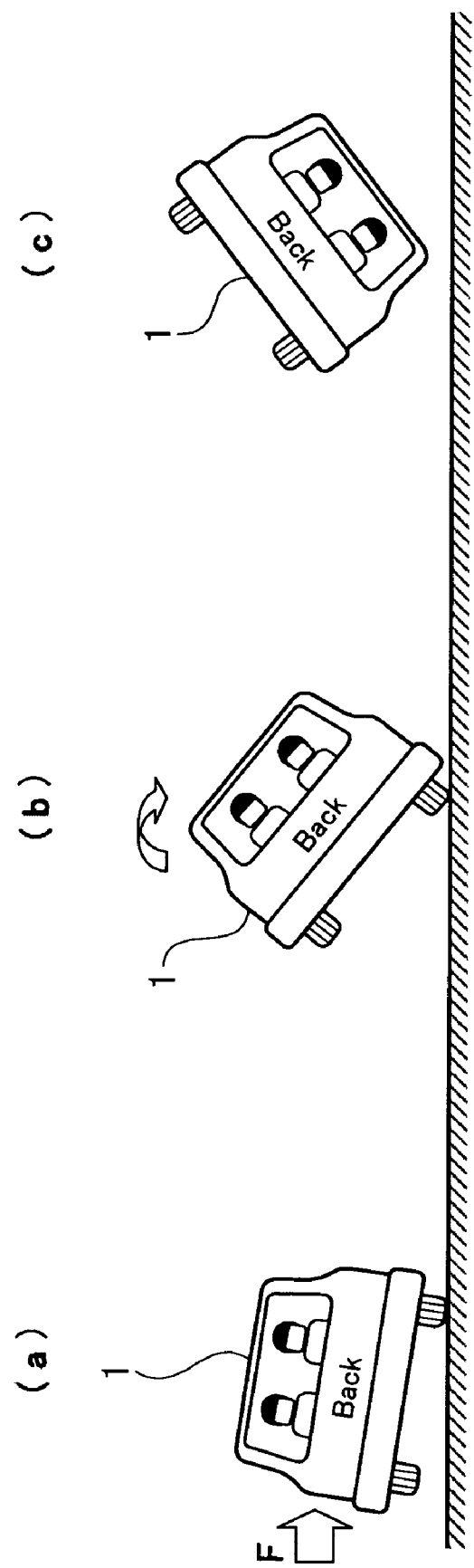
FIG. 5 is a series of rear views or diagrams (a) to (c) illustrating successive states that the vehicle assumes during a rollover condition in the first embodiment of the present invention.
Figure 6:
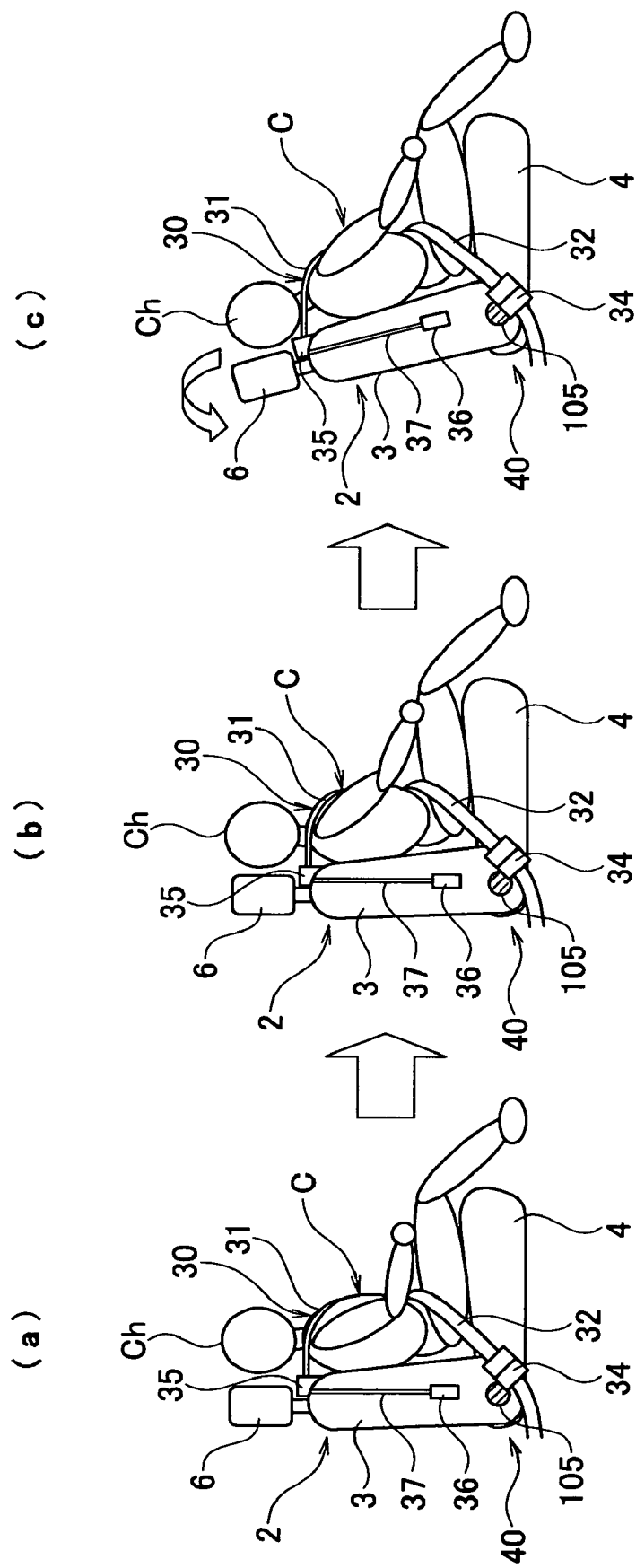
FIG. 6 is a series of side views or diagrams (a) to (c) of the seat illustrating successive operating states of the passenger restricting system during a rollover condition in accordance with the first embodiment of the present invention.

When the vehicle 1 in which the passenger restricting system 10 is installed rolls over as shown in diagrams (a) to (c) of FIG. 5, the seat belt apparatus 30 and the seat back 3 operate as shown in diagrams (a) to (c) of FIG. 6 so as to lean the passenger C back by a prescribed amount, thereby widening the space between the passenger's head Ch and the ceiling of the vehicle. Diagram (a) of FIG. 5 illustrates the occurrence of a lateral force F acting on the vehicle. Diagram (b) of FIG. 5 illustrates the state of the vehicle body when it has rotated a quarter turn. Diagram (c) of FIG. 5 illustrates the state of the vehicle body when it has rotated three quarters of a turn.

FIG. 6(a) illustrates the state of the system 10 under normal circumstances in which the vehicle is not rolling over. The passenger C is sitting in the seat 2 with the seat belt apparatus 30 fastened. When the vehicle rollover detector 20 detects a rollover condition, the electric retractor 36 operates and reels in the seat belt webbing 37 such that the shoulder belt 31 restrains the passenger C to the seat back 3 securely with a prescribed tensile force. At the same time, as shown in FIG. 6(c), the seat tilting motor 105 tilts back the seat back 3 by a prescribed amount such that the passenger C is leaned back by a prescribed amount.

Since the electric retractor 36 and the seat tilting motor 105 are both configured such that they can rotate in a forward direction and in a reverse direction, the seat belt apparatus 30 and the seat back tilt-back device 40 are provided with a reversible function whereby they can return to the state in which they existed before a rollover condition was detected.

Figure 7:
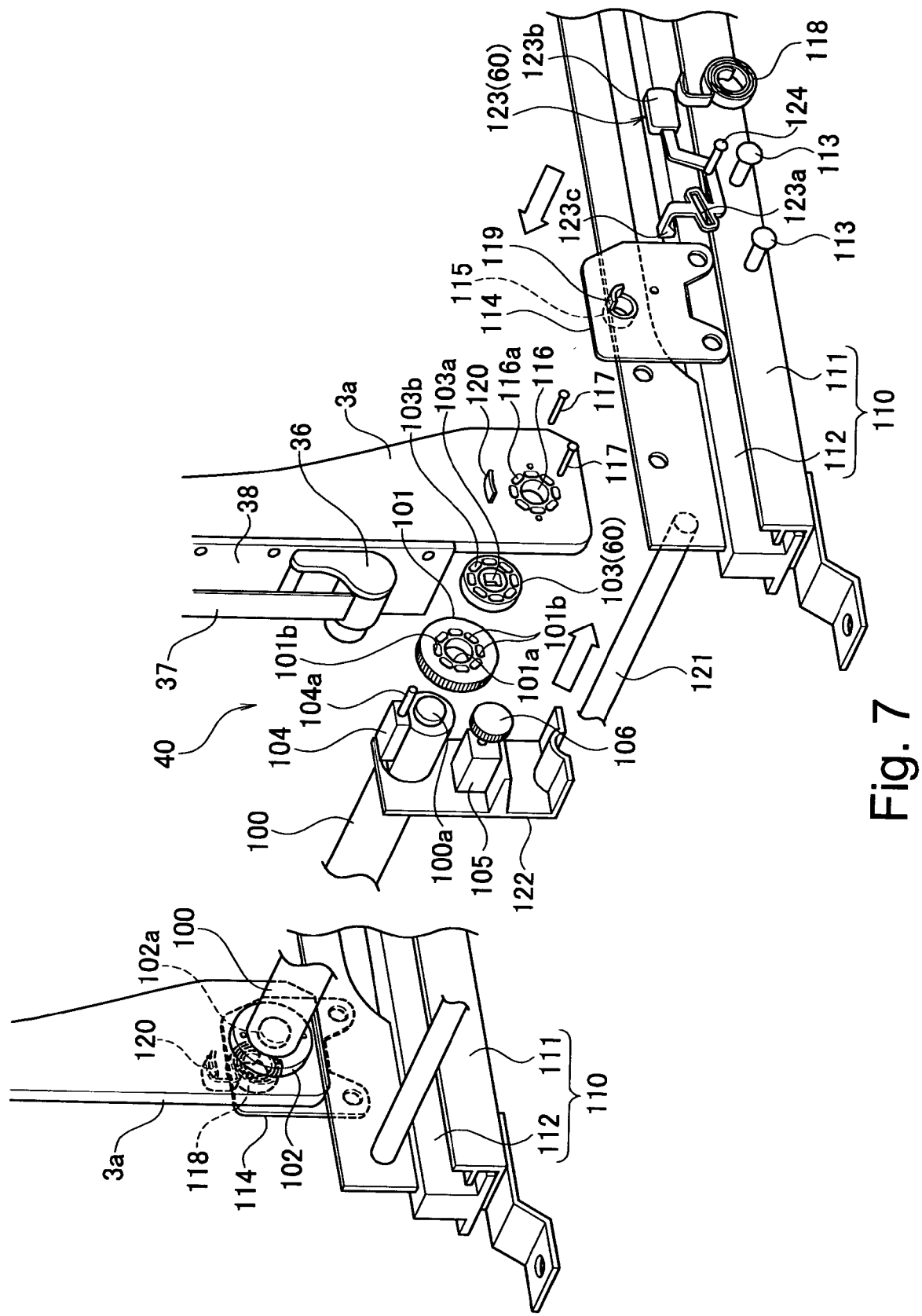
FIG. 7 is an exploded perspective view of selected details of the internal structure of a lower portion of the seat back in accordance with the first embodiment of the present invention.
Figure 8:
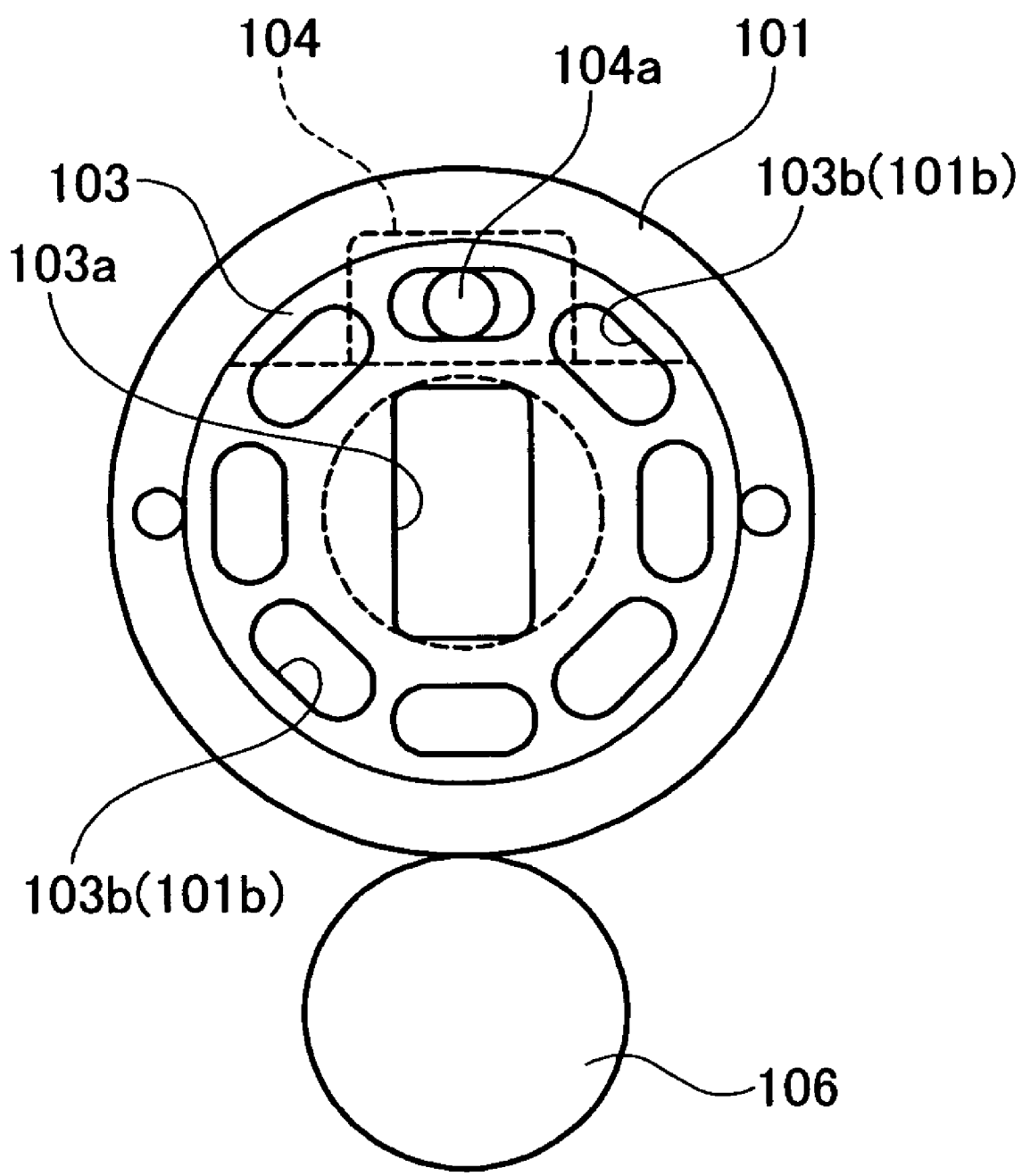
FIG. 8 is an enlarged view of a shaft guide used in the tilt-back device of the seat back in accordance with the first embodiment of the present invention.
Figure 9:
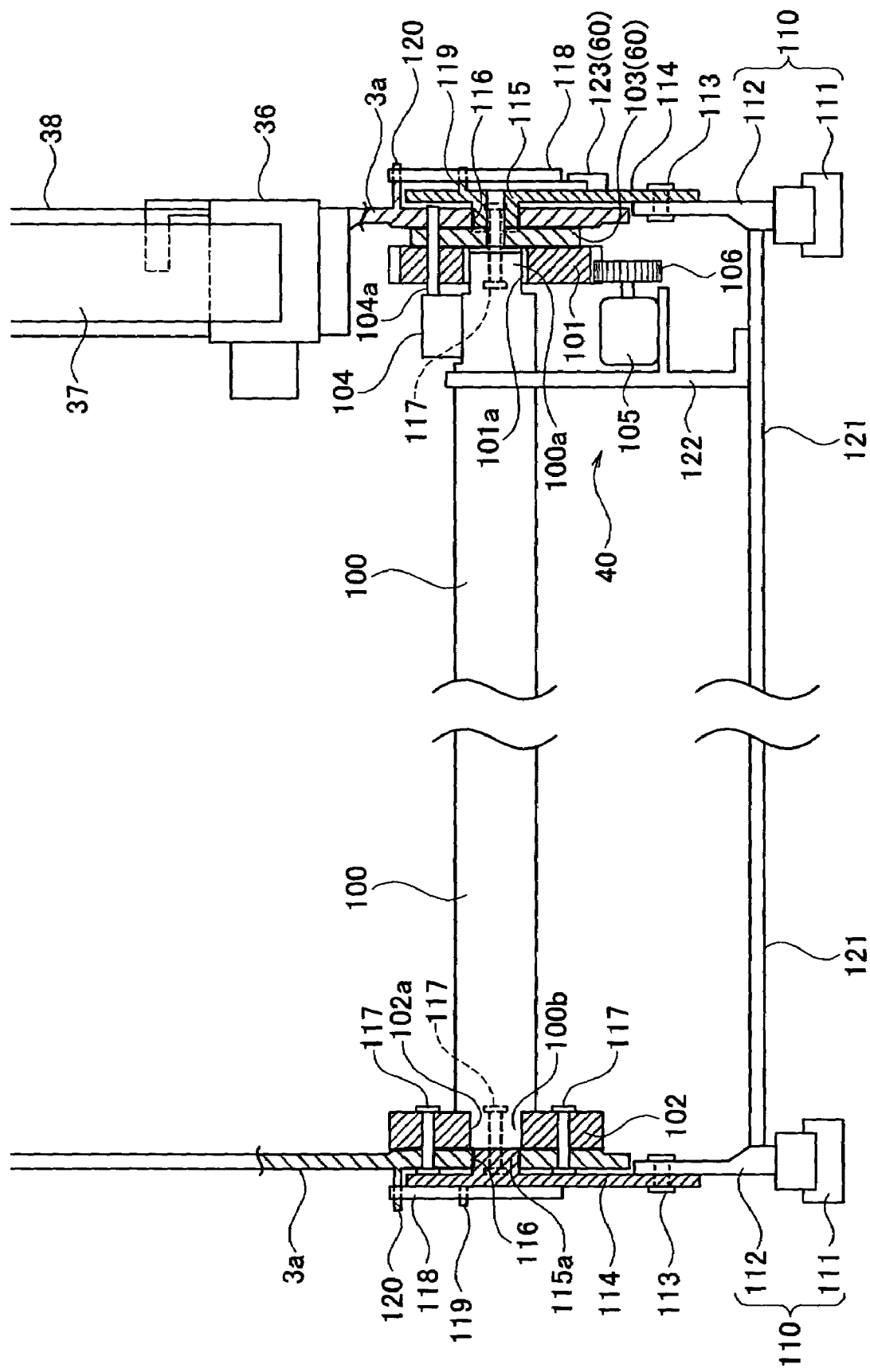
FIG. 9 is a rear cross-sectional view of the main components used in the internal structure of the lower portion of the seat in accordance with the first embodiment of the present invention.

FIGS. 7 to 9 show the structure of the lower portion of the seat 2 in more detail. The lower end portion of the seat back frame 3a is mounted to a pair of seat sliders 110.

The seat sliders 110 includes a pair of slide rails 111 that are fastened to a floor panel of the vehicle 1 in such an arrangement as to extend along the longitudinal direction of the vehicle 1 and be spaced apart from each other along the widthwise direction of the vehicle 1 and a pair of sliders 112 arranged on the slide rails 111 such that they can move freely back and forth. A separate plate 114 is coupled to each of the sliders 112 with a pin 113, and the bottom end portions of the seat back frame 3a are coupled in a movable (rotatable) fashion to the plates 114.

More specifically, a hole 115 having a boss is provided on the plate 114 located toward the inside of the vehicle (right-hand side in the figures) such that the boss thereof protrudes inward toward the seat. The boss of the hole 115 fits movably into a support hole 116 formed in a lower end portion of the seat back frame 3a. Similarly, a boss 115a (FIG. 9) is provided on the plate 114 located toward the outside of the vehicle (left-hand side in the figures) and configured to protrudes inward toward the seat. The boss 115a fits movably into a support hole 116 formed in a lower end portion of the seat back frame 3a.

The circular disc-shaped seat back recliner 103 and the circular disc-shaped shaft guide 101 are arranged on the inward side of the lower end portion of the seat back frame 3a that is located toward the inside of the vehicle (right-hand side in the figures). The shaft guide 101 is located farther inward toward the seat than the seat back recliner 103. Similarly, the circular disc-shaped shaft guide 102 is arranged on the inward side of the lower end portion of the seat back frame 3a that is located toward the outside of the vehicle (left-hand side in the figures). The ends of the main shaft 100 are provided with smaller diameter support portions 100a and 100b that fit into center holes 101a and 102a of the shaft guides 101 and 102, respectively, and support the shaft guides 101 and 102 in a freely rotatable manner. Each of the shaft guides 101 and 102 is coupled to the seat back frame 3a with a pin 117.

Elongated holes 101b, 103b and 116a are formed around the perimeters of the center hole 101a of the shaft guide 101, the center hole 103a of the seat back recliner 103, and the support hole 116 of the seat back frame 3a. The elongated holes 101b, 103b and 116a are arranged in corresponding positions along the circumferential direction such that the operating pin 104a of the solenoid 104 mounted to the main shaft 100 can pass through the elongated holes 101b, 103b and 116a when the operating pin 104a is extended, thereby enabling the operating pin 104a to fix (i.e., prevent movement of) the seat back frame 3a.

One spiral spring 118 is arranged between the seat back frame 3a and the inside plate 114 and another spiral spring 118 is arranged between the seat back frame 3a and outside plate 114. The spiral springs 118 serve to torsionally spring load the seat back frame 3a in the return direction. The radially inward end of the one spiral spring 118 engages with an engaging protrusion 119 provided on the periphery the hole 115 and the radially inward end of the other spiral spring 118 engages with an engaging protrusion 119 provided on opposite side face of the plate 114 as the boss 115a. The radially outward ends of the spiral springs 118 engage with engaging protrusions 120 provided so as to protrude from respective side faces of the seat back frame 3a.

A connecting frame 121 is provided so as to span in the widthwise direction of the vehicle between the two sliders 112. A support bracket 122 is coupled to the connecting frame 121 and serves to support the end of the main shaft 100 located more toward the inside of the vehicle in such a manner that the main shaft 100 can rotate freely. Additionally, the seat tilting motor 105 is mounted to the support bracket 122. As previously mentioned, gear teeth are formed on the external circumference of the shaft guide 101 and a gear 106 provided on a rotary shaft of the seat tilting motor 105 is arranged such that it is always meshed with the shaft guide 101.

In this embodiment, the seat back 3 is connected to the seat cushion 4 with a reclining device 60 disposed there-between, the reclining device 60 enabling the reclining position of the seat back 3 to be adjusted as desired. More specifically, a recliner operating lever 123 is provided on the outward side of the plate 114 on the side of the seat 2 where the seat back recliner 103 is provided and the seat back recliner 103 and recliner operating lever 123 constitute the reclining device 60.

The recliner operating lever 123 is mounted to the plate 114 with a pin 124 passed through an elongated hole 123a provided in a substantially middle portion of the recliner operating lever 123. The end portion 123c opposite an operating part 123b is passed through the hole/boss 115 and engages with the center hole 103a of the seat back recliner 103.

Figure 10:
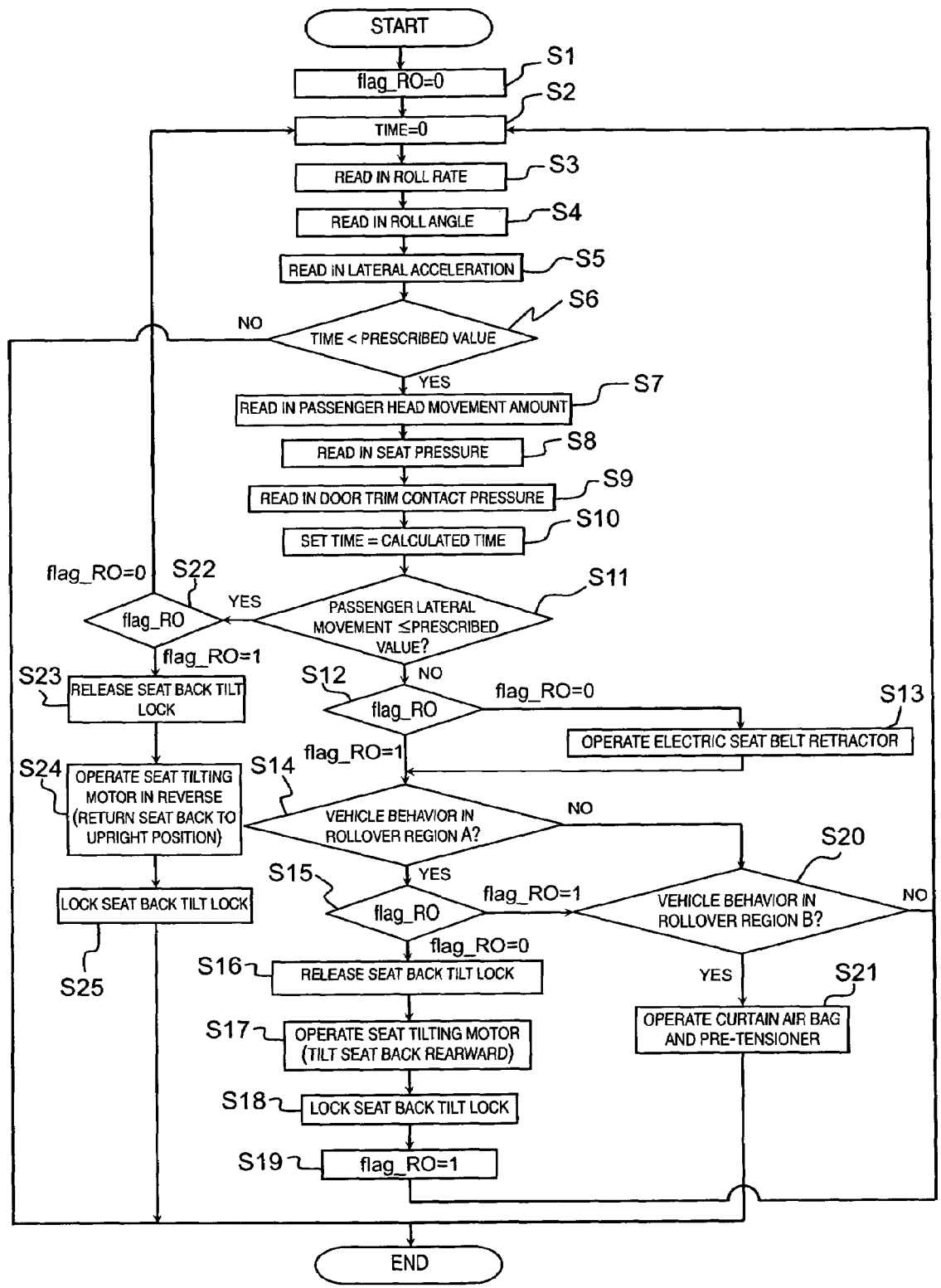
FIG. 10 is a flowchart showing the control operations executed by the controller in order to control the passenger restricting system in accordance with the first embodiment of the present invention.

In this passenger restricting system 10, the controller 50 executes the steps shown in the flowchart of FIG. 10 in order to detect if the vehicle 1 is rolling over and to control the seat back tilt-back device 40 and the seat belt apparatus 30 based on the results of the rollover detection. Additionally, in this embodiment, the vehicle 1 is provided with curtain air bags that are also controlled by the controller 50 as part of the passenger restricting system 10.

The flowchart starts when the ignition is turned on. In step S1, the controller 50 sets a flag for determining if the seat back 3 is in a tilted back state to 0 and proceeds to step S2. In step S2, the controller 50 sets a timer to 0. In steps S3 to S5, the controller 50 reads in the roll rate, the roll angle, and the lateral acceleration, respectively.

In step S6, the controller 50 determines if the amount of time that has elapsed since the control started (i.e., since the controller started executing the control loop of FIG. 10) is less than a prescribed amount of time. In steps S7 to S9, the controller 50 reads in the movement amount of the passenger's head Ch, the seat pressure distribution, and the contact pressure against a door trim. In step S10, the controller 50 calculates the time elapsed since the control started. In step S11, the controller 50 determines if the lateral movement amount of the passenger C is less than or equal to a prescribed value. If the lateral movement amount exceeds the prescribed value, then the controller 50 determines that a rollover condition may exist and proceeds to step S12. In step S12, the controller 50 determines if the seat back 3 is in a tilted back state. If not, the controller 50 proceeds to step S13 and operates the electric retractor 36 such that the shoulder belt 31 restrains the passenger C more securely to the seat back 3.

Figure 11:
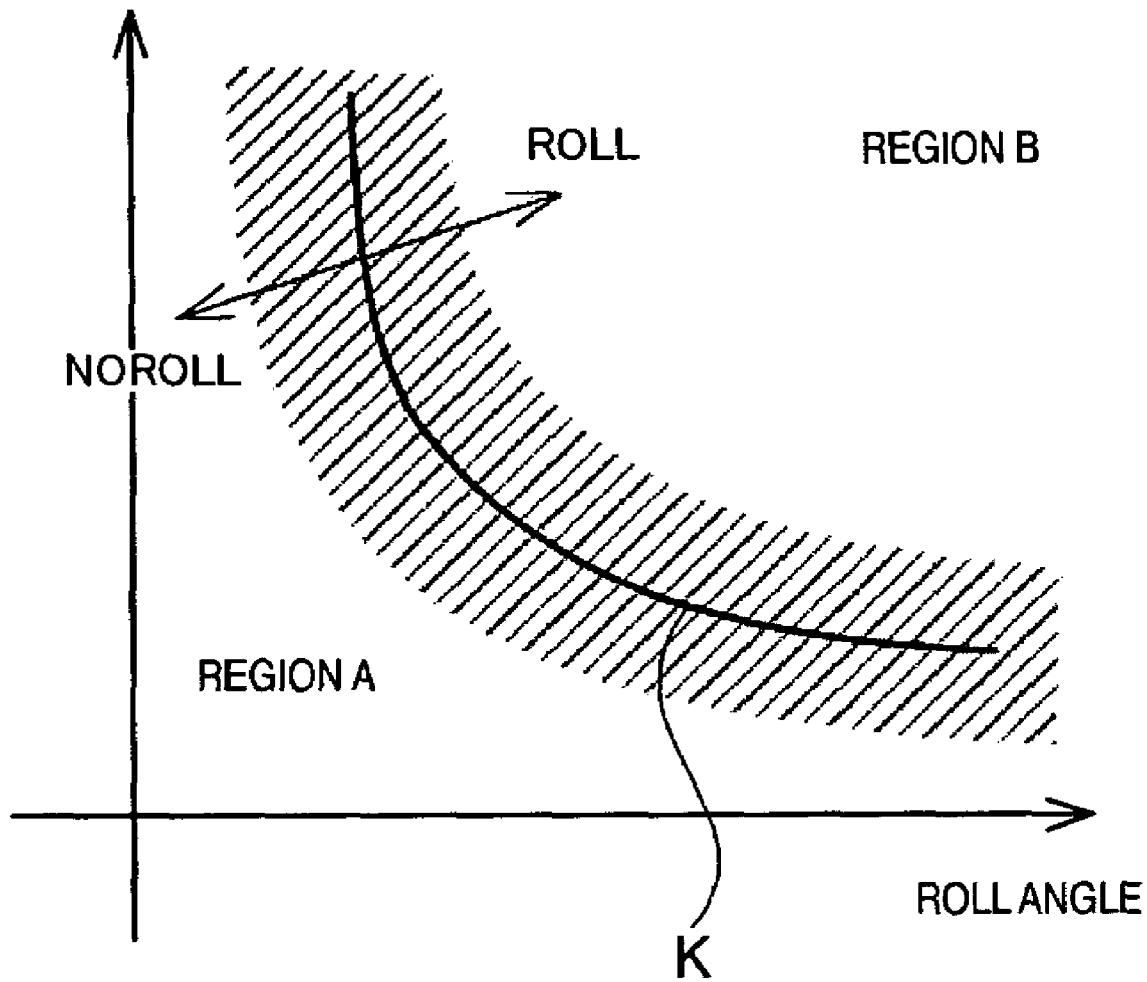
FIG. 11 is an example of a map used to determine if a rollover condition exists in accordance with the first embodiment of the present invention.

In step S14, the controller 50 determines if the roll angle and roll rate are in a region A where the threshold value K is not exceeded on the map shown in FIG. 11. If the roll angle and roll rate are in the region A, then the controller 50 proceeds to step S15 and checks that the seat back 3 is not already tilted back. Then, in step S16, the controller 50 instructs the solenoid 104 to retract the operating pin 104a such that the locked state of the seat back 3 is released. In step S17, the controller 50 instructs the seat tilting motor 105 to operate such that the seat back is tilted back by a prescribed amount. In step S18, the controller 50 instructs the solenoid 104 to extend the operating pin 104a such that the seat back 3 is locked in position at the prescribed amount of tilt back. In step S19, the controller 50 sets the flag to 1 to indicate that the seat back 3 is in the tilted back state.

After step S19, the controller 50 returns to step S2 to retrieve new values of the input data. After executing steps S2 to S11 in the same manner as just described, the controller 50 proceeds from step S12 to step S14. If the roll angle and roll rate are beyond the region A on the map, then the controller 50 proceeds to step S20 and determines if the roll angle and roll rate are in the region B of the map. If the roll angle and roll rate are in the region B, then the controller 50 determines that a rollover condition has occurred and proceeds to step S21, where it operates the pre-tensioner of the electric retractor 36 and deploys the curtain air bag to alleviate any impact of the passenger's head Ch against a side portion of the vehicle body.

Meanwhile, if it was determined in step S11 that the lateral movement of the passenger C has not exceeded a prescribed value and determined in step S22 that the seat back 3 is in a tilted back state (flag=1), then the controller 50 proceeds to step S23 and instructs the solenoid 104 to retract the operating pin 104a so as to release the locked state of the seat back 3. Then, in step S24, the controller 50 operates the seat tilting motor 105 in reverse and returns the seat back 3 to the state it was in before it was tilted back. In step S25, the controller 50 instructs the solenoid 104 to extend the operating pin 104a again so as to lock the seat back 3.

In this embodiment, the vehicle rollover passenger restricting system 10 is provided with the vehicle rollover detector 20 to detect if the vehicle is in a rollover state, the seat belt apparatus 30 restrains a passenger C in the seat 2, the seat back tilt-back device 40 tilts the seat back 3 back by a prescribed amount, and the controller 50 determines if a rollover condition exists based on a detection signal from the vehicle rollover detector 20 and to operate the seat belt apparatus 30 and the seat tilt-back device 40 when it determines that a rollover condition exists. Thus, when a rollover condition is detected, the passenger C can be tilted back by a prescribed amount along with the seat back 3 while being restrained in the seat 2. Consequently, the head Ch of the passenger C can be moved rearward about the main shaft 100 of the seat back 3 when the seat back 3 is tilted back. As a result, the space between the passenger's head Ch and the ceiling of the passenger compartment can be enlarged and contact of the passenger's head Ch against the ceiling can be suppressed in an effective manner.

The seat belt apparatus 30 includes the shoulder belt 31 to restrain the upper body Cu of the passenger C to the seat back 3 and the lap belt 32 to restrain the waist area Cw of the passenger C to the seat cushion 4, thereby forming a three-point seat belt structure. As a result, when the passenger C is restrained to the seat 2 during a rollover condition, the passenger C can be restrained to the seat back 3 in an effective manner by the shoulder belt 31 and the space between the passenger's head Ch and the ceiling can be reliably widened when the seat back 3 is tilted back.

The upper end of the shoulder belt 31 (i.e., the end near the passenger's shoulder) passes through a webbing passage opening 35 provided on an upper end portion of the seat back 3 and is drawn into the inside of the seat back 3. The electric retractor 36 is installed inside a lower portion of the seat back 3 to retract the shoulder belt 31 (i.e., the seat belt webbing 37). As a result, when the passenger C is tilted back with the seat back 3, the seat belt webbing 37 can be retracted readily and the passenger C can be restrained rapidly because the amount of seat belt webbing 37 retracted is reduced.

The electric retractor 36 is provided with a pre-tensioner function and a load limiter function. Additionally, the electric retractor 36 is equipped with a motorized retracting device configured to retract and dispense the seat belt webbing 37 under normal circumstances and an explosive retracting device for retracting the seat belt webbing 37 in an emergency situation, such as a collision or a rollover condition. Thus, the seat belt webbing 37 can be retracted freely (to any desired degree) under normal circumstances and instantaneously in a rollover condition or other emergency. As a result, the passenger C can be restrained quickly and effectively.

The seat belt apparatus 30 and the seat back tilt-back device 40 are provided with a reversible function whereby they can return to the state in which they existed before a rollover condition was detected. Thus, in a situation where the vehicle 1 initially exhibits rollover behavior but ultimately does not rollover, the heavy restraining force of the shoulder belt 31 can be released automatically and the seat back 3 can be returned to its original state automatically. As a result, the passenger C can be saved the trouble of manually readjusting the seat belt apparatus 30 and the reclining position of the seat back 3.

The vehicle rollover detector 20 is equipped with the angular velocity sensor 21 to measure the roll angle and roll rate of the vehicle 1. The controller 50 determines that the vehicle is rolling over when the roll angle and roll rate lie in a region B where a threshold value K is exceeded. As a result, vehicle rollover can be detected with a simple apparatus. In addition to the angular velocity sensor 21, the vehicle rollover detector 20 includes sensors 22 to 25 as discussed above. The controller 50 determines that a rollover condition exists when the roll angle and roll rate, the lateral acceleration, the contact pressure against the seat, the contact pressure against the trim, and the passenger movement amount are each in a region where a prescribed threshold value K is exceeded. As a result, vehicle rollover can be detected with a high degree of precision.

Figure 12:
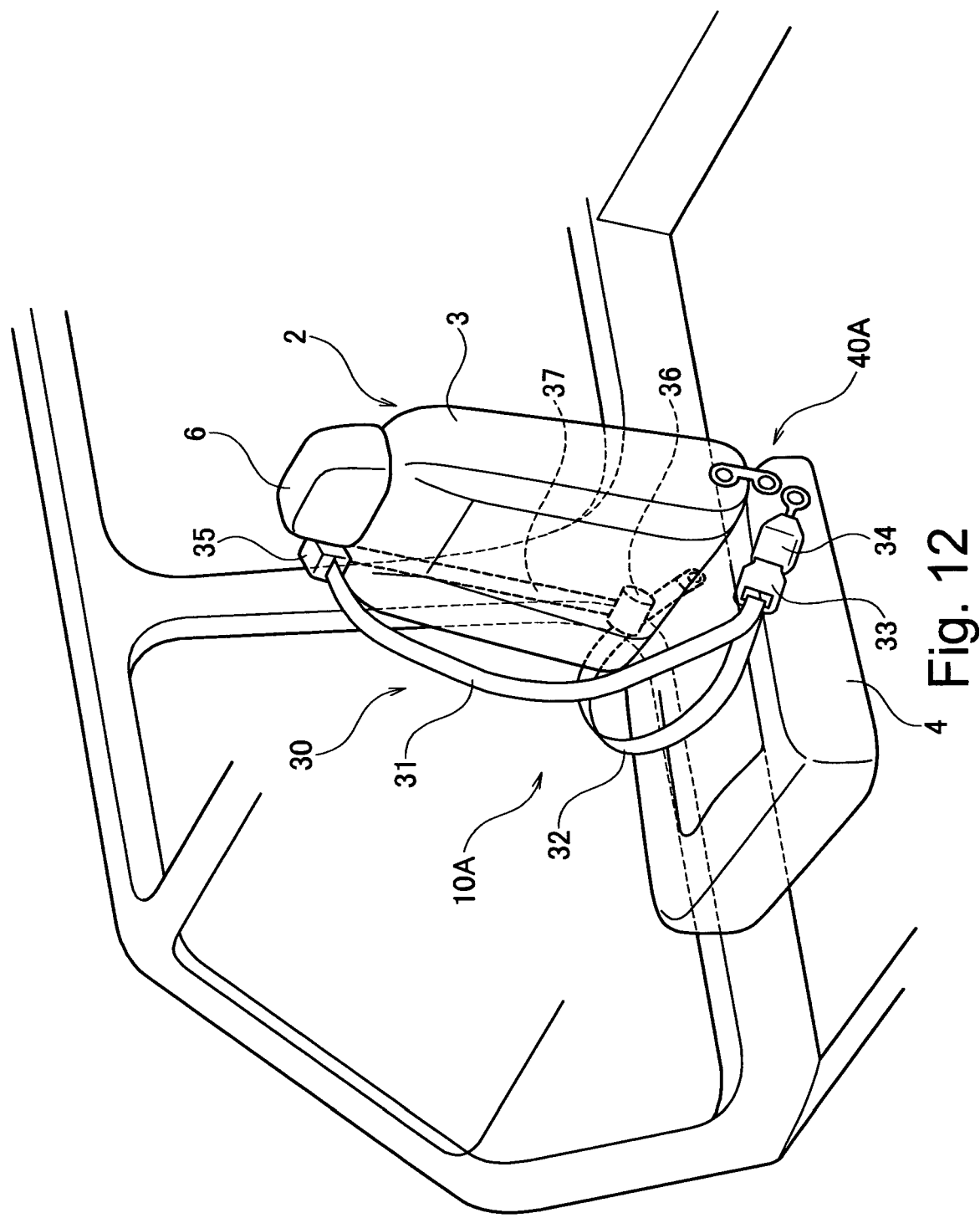
FIG. 12 is a perspective view of a passenger seat in which a passenger restricting system is equipped in accordance with a second embodiment of the present invention.
Figure 13:
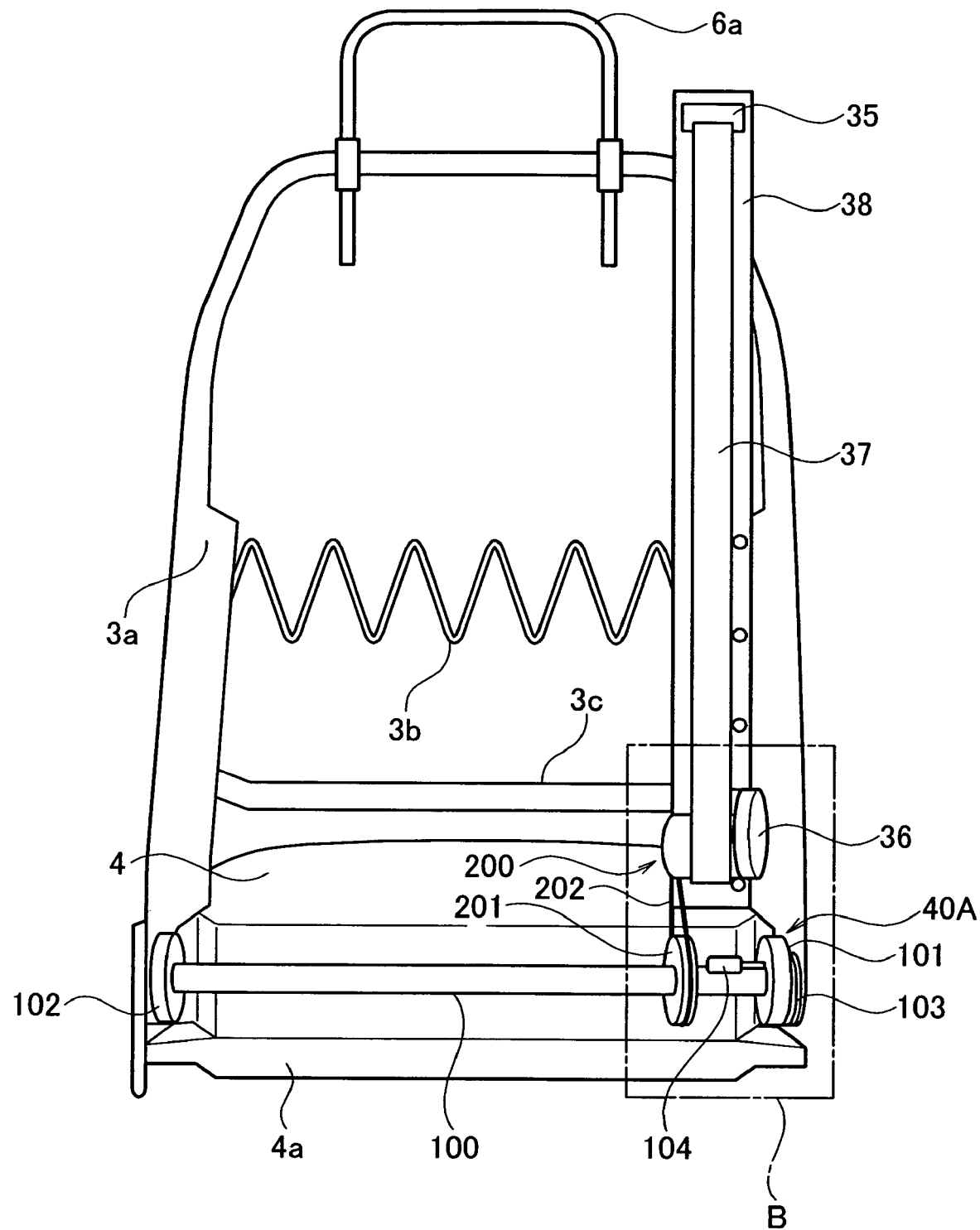
FIG. 13 is a rear view of selected portions of the internal structure of the passenger seat in which the passenger restricting system is equipped in accordance with the second embodiment of the present invention.
Figure 14:
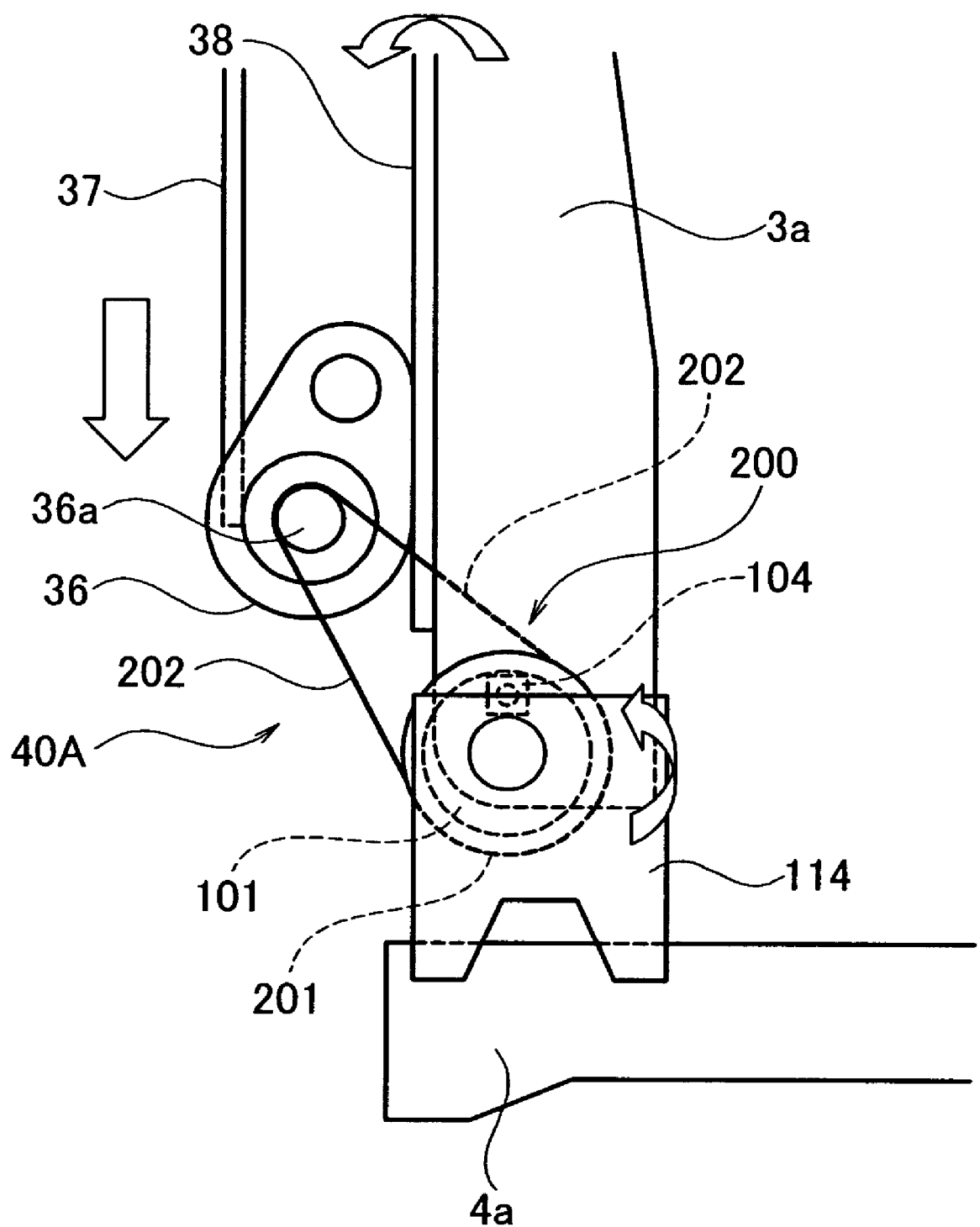
FIG. 14 is an enlarged, partial side view of the portion B of the internal structure of the passenger seat illustrated in FIG. 13.
Figure 15:
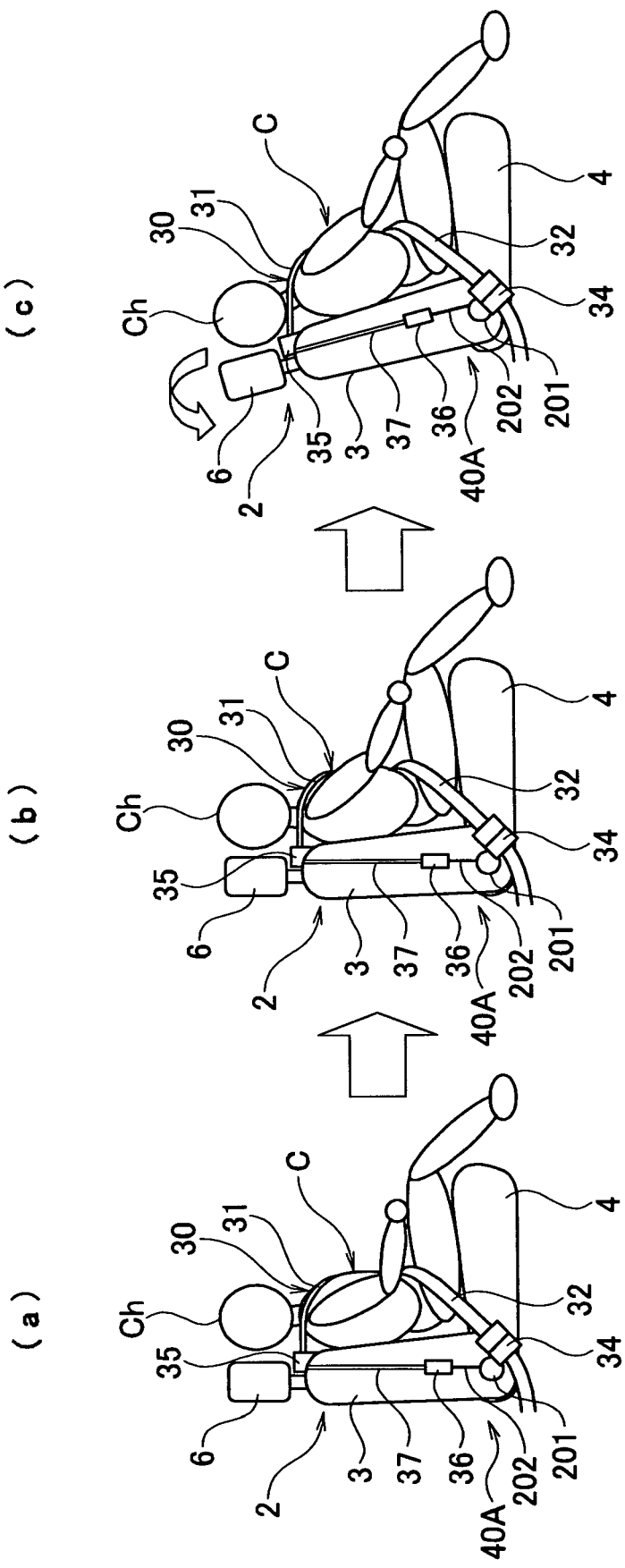
FIG. 15 is a series of side views or diagrams (a) to (c) of the seat illustrating successive operating states of the passenger restricting system during a rollover condition in the second embodiment of the present invention.
Figure 16:
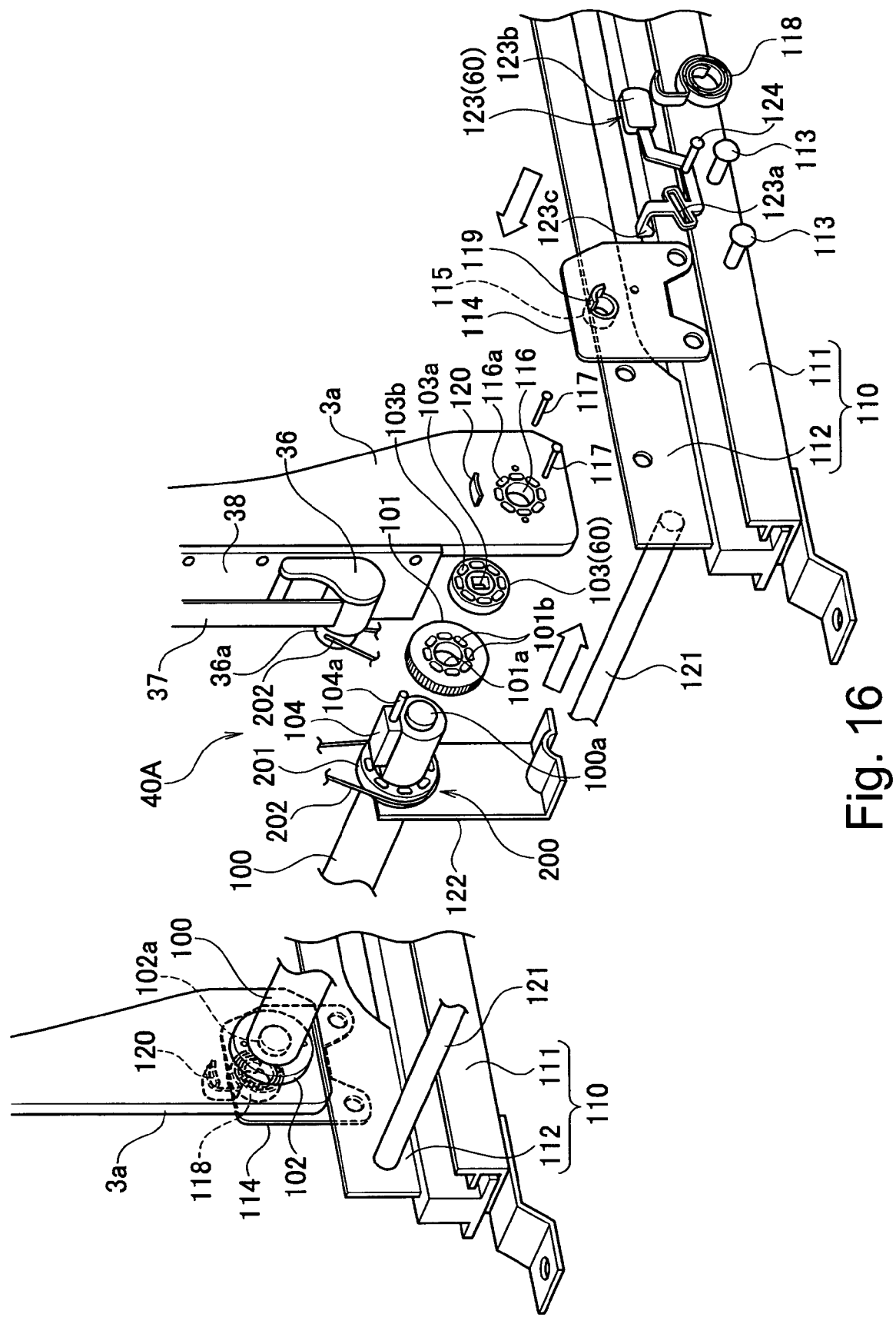
FIG. 16 is an exploded perspective view of selected details of the internal structure of a lower portion of the seat back in accordance with the second embodiment of the present invention.
Figure 17:
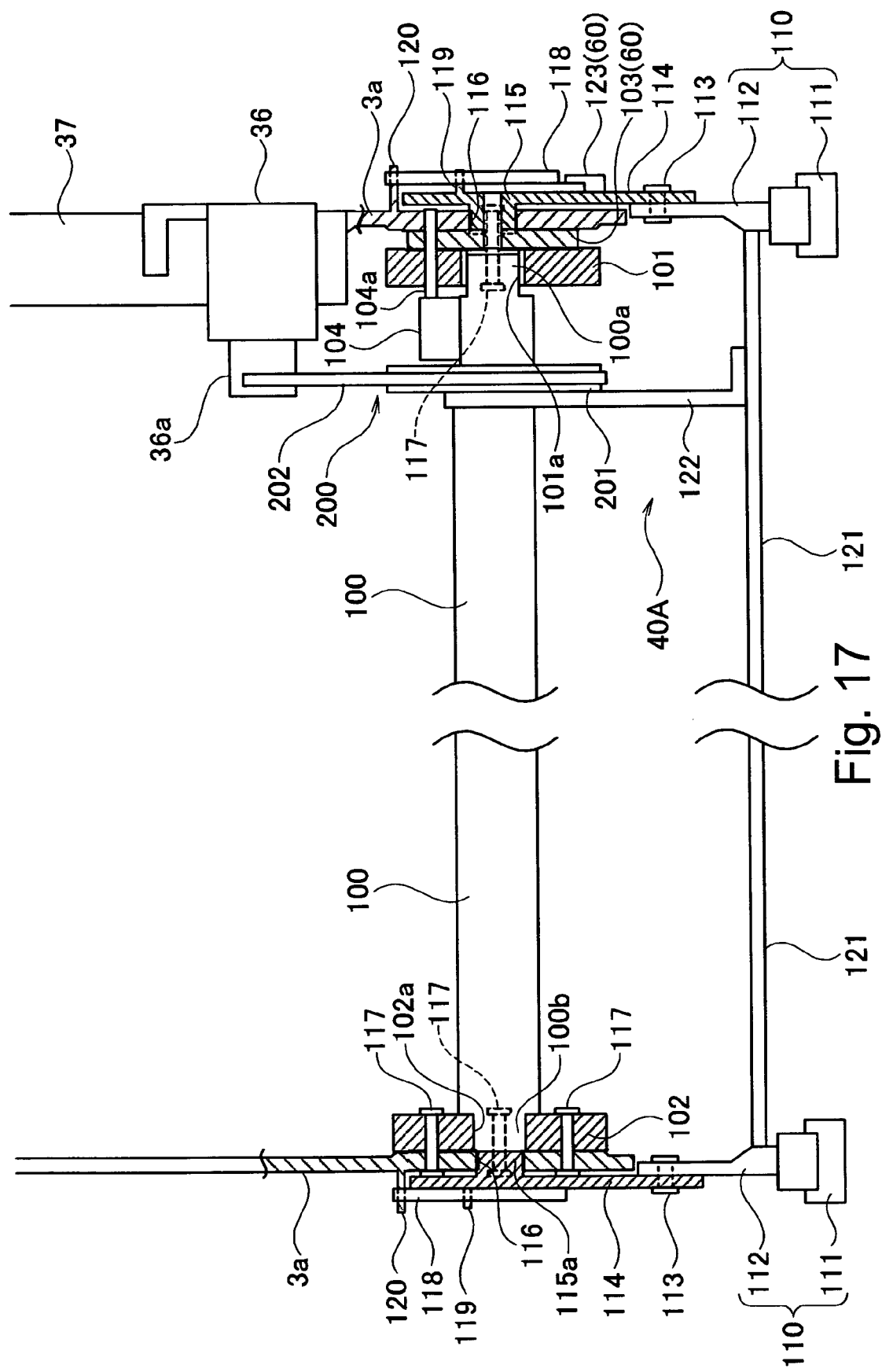
FIG. 17 is a rear cross-sectional view of the main components used in the internal structure of the lower portion of the seat in accordance with the second embodiment of the present invention.
Figure 18:
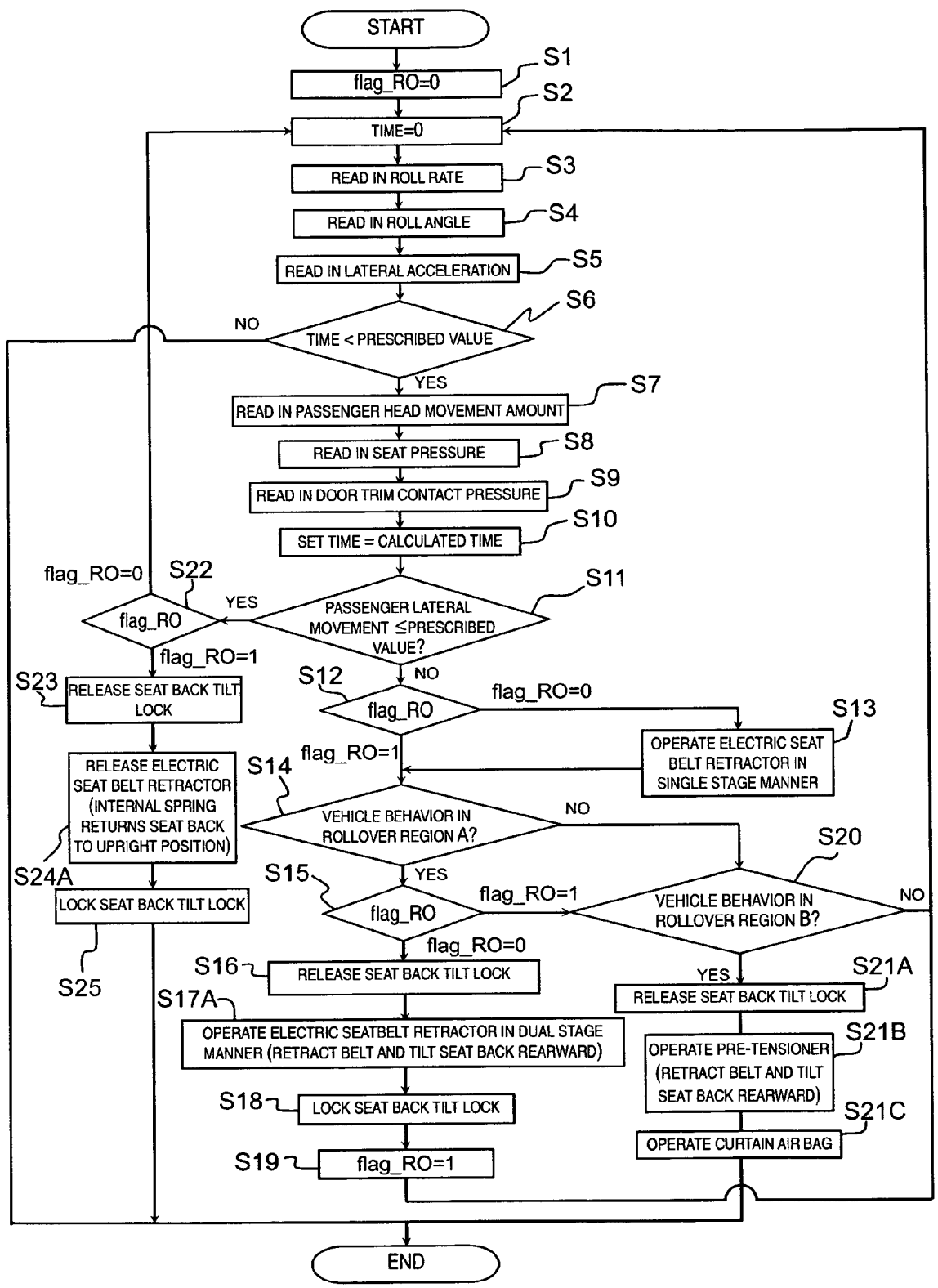
FIG. 18 is a flowchart showing the control operations executed by the controller in order to control the passenger restricting system in accordance with the second embodiment of the present invention.

FIGS. 12 to 18 show a second embodiment of the present invention. Parts that are the same as the parts of the first embodiment are indicated with the same reference numerals and explanations thereof are omitted for the sake of brevity. FIG. 12 is a perspective view of a seat in which the passenger restricting system is employed. FIG. 13 is a rear view showing the internal structure of the seat. FIG. 14 is a side view of the portion B of FIG. 12. FIG. 15 is a series of side views or diagrams (a) to (c) of the seat illustrating successive operating states of the passenger restricting system during a rollover condition. FIG. 16 is an exploded perspective view showing the internal structure of a lower portion of the seat back in detail. FIG. 17 is a rear cross-sectional view showing the main components in the internal structure of the lower portion of the seat. FIG. 18 is a flowchart showing the control operations executed in order to control the passenger restricting system.

The vehicle rollover passenger restricting system 10A of this embodiment is basically the same as the passenger restricting system 10 of the first embodiment. More specifically, similarly to the passenger restricting system 10, the passenger restricting system 10A is provided with the vehicle rollover detector 20, the seat belt apparatus 30 serving as a passenger restraining device, a seat back tilt-back device 40A, and the controller 50. The vehicle rollover detector 20 and the controller 50 have the same constituent features as in the first embodiment. As shown in FIG. 12, the seat belt apparatus 30 includes the shoulder belt 31 and the lap belt 32 to form a three-point seat belt structure, which is the same as in the first embodiment.

As shown in FIGS. 12 to 14, a coordinating device 200 (coupling device) is provided between the seat belt apparatus 30 and the seat back tilt-back device 40A. The coordinating device 200 is configured to coordinate the operation of the seat belt apparatus 30 and the seat back tilt-back device 40A such that the restraining of the passenger C and the tilting back of the seat back 3 occur at the same time in a coordinated manner.

As shown in FIGS. 13 and 14, the coordinating device 200 includes a rotary part 36a of the electric retractor 36 of the seat belt apparatus 30, a pulley 201 provided on the main shaft 100 (which serves as a tilt or pivot shaft of the seat back 3), and a ring-shaped wire 202 functioning as an endless belt that is connected across the rotary part 36a and the pulley 201 and serves to transfer torque there-between.

When the vehicle 1 rolls over as shown in FIG. 5 of the first embodiment, the seat belt apparatus 30 and the seat back 3 operate as shown in diagrams (a) to (c) of FIG. 15, i.e., in the same manner as in the first embodiment, so as to lean the passenger C back by a prescribed amount, thereby widening the space between the passenger's head Ch and the ceiling of the vehicle.

Diagram (a) of FIG. 15 illustrates the state of the system 10A under normal circumstances in which the vehicle is not rolling over. The passenger C is sitting in the seat 2 with the seat belt apparatus 30 fastened. When the vehicle rollover detector 20 detects a rollover condition, the electric retractor 36 operates and reels in the seat belt webbing 37 as shown in diagram (b) of FIG. 15 such that the shoulder belt 31 restrains the passenger C to the seat back 3 securely with a prescribed tensile force. At the same time, as shown in diagram (c) of FIG. 15, the operation of the electric retractor 36 causes the wire 202 to tilt back the seat back 3 by a prescribed amount such that the passenger C is leaned back by a prescribed amount.

In this embodiment, too, the electric retractor 36 rotates in both a forward and a reverse direction. Thus, the seat belt apparatus 30 and the seat back tilt-back device 40A are provided with a reversible function whereby they can return to the state in which they existed before a rollover condition was detected.

FIGS. 16 to 17 show the structure of the lower portion of the seat 2 in more detail. The lower end portions of the seat back frame 3a are mounted to the sliders 112 of a pair of seat sliders 110 with plates 114 disposed there-between. The lower end portions of the seat back frame 3a are pivotally attached to the plates 114.

The seat back recliner 103 and the shaft guide 101 are arranged on the inward side of the lower end portion of the seat back frame 3a that is located toward the inside of the vehicle (right-hand side in the figures), with the shaft guide 101 being located farther inward toward the seat than the seat back recliner 103. Similarly, the shaft guide 102 is arranged on the inward side of the lower end portion of the seat back frame 3a that is located toward the outside of the vehicle (left-hand side in the figures). The ends of the main shaft 100 are provided with smaller diameter support portions 100a and 100b that fit into center holes 101a and 102a of the shaft guides 101 and 102, respectively, and support the shaft guides 101 and 102 in a freely rotatable manner.

Elongated holes 101b, 103b and 116a are formed in the shaft guide 101, the seat back recliner 103, and the seat back frame 3a. The elongated holes 101b, 103b and 116a are arranged such that the operating pin 104a of the solenoid 104 mounted to the main shaft 100 can pass through the elongated holes 101b, 103b and 116a when the operating pin 104a is extended, thereby enabling the operating pin 104a to fix (i.e., prevent movement of) the seat back frame 3a.

One spiral spring 118 is arranged between the seat back frame 3a and the plate 114 located toward the inside of the vehicle along the widthwise direction of the vehicle and another spiral spring 118 is arranged between the seat back frame 3a and plate 114 located toward the outside of the vehicle. The spiral springs 118 serve to torsionally spring load the seat back frame 3a in the return direction. A connecting frame 121 is provided so as to span in the widthwise direction of the vehicle between the two sliders 112 and a support bracket 122 is coupled to the connecting frame 121. The support bracket 122 serves to support the end of the main shaft 100 located more toward the inside of the vehicle in such a manner that the main shaft 100 can rotate freely.

In this embodiment, the pulley 201 is provided on the main shaft 100 in a position located more toward the inside of the vehicle than the support bracket 122 and is mounted (engaged) in such a manner that it cannot rotate relative to the main shaft 100. Also, the wire 202 is connected across the pulley 201 and the rotary part 36a of the electric retractor 36 positioned above the pulley 201. Thus, the torque of the electric retractor 36 is transmitted to the main shaft 100.

Similarly to the first embodiment, the recliner operating lever 123 is provided on the outward side of the plate 114 on the side of the seat 2 where the seat back recliner 103 is provided. The seat back recliner 103 and the recliner operating lever 123 constitute the reclining device 60 that enables the reclining position of the seat back 3 to be adjusted as desired.

In the passenger restricting system 10A, the controller 50 executes the steps shown in the flowchart of FIG. 18 in order to detect if the vehicle 1 is rolling over and to control the seat back tilt-back device 40A and seat belt apparatus 30 based on the results of the rollover detection. The steps of the flowchart will now be explained. Control steps that are the same as in the first embodiment are indicated with the same step numbers as in the flowchart of FIG. 10 and explanations thereof are omitted for the sake of brevity.

In the flowchart, steps S1 to S16, steps S18 to S20, and steps S22, S23, and S25 are the same as in the first embodiment. This embodiment differs from the first embodiment regarding step S17A. In step S17A, the controller 50 operates the electric retractor 36 such that the seat belt webbing 37 of the seat belt apparatus 30 is reeled in and, at the same time, the seat back 3 is tilted back due to the main shaft 100 being rotated by the wire 202.

Also, if it determines in step S20 that the roll angle and roll rate are in the region B of the map, the controller 50 proceeds to step S21A where it retracts the operating pin 104a of the solenoid 104 so as to release the locked state of the seat back 3 with respect to tilting. Then, in step S21B, the controller 50 operates the pre-tensioner of the electric retractor 36. The operation of the electric retractor 36 serves to tilt back the seat back 3 as well as retract the seat belt webbing 37. Next, in step S21C, the controller 50 deploys the curtain air bag.

This embodiment also differs from the first embodiment regarding step S24A. After it operates the solenoid 104 in step S23 so as to retract the operating pin 104a and release the locked state of the seat back 3, in step S24A the controller 50 stops the operation of the electric retractor 36 such that the rotary part 36a can turn freely. As a result, the spring load of the spiral springs 118 causes the seat back 3 to pivot forward toward an upright position. When the seat back 3 returns to its original position, the controller 50 operates the solenoid 104 such that the operating pin 104a is extended and the seat back 3 is locked.

In this embodiment, too, a map is used to determine if a rollover condition exists. An explanation of the map is omitted here because the map is the same as the map shown in FIG. 11 of the first embodiment.

Similarly to the first embodiment, the vehicle rollover passenger restricting system 10A of this embodiment is configured such that when a rollover condition is detected, the passenger C can be tilted back by a prescribed amount along with the seat back 3 while being restrained in the seat 2. Consequently, the head Ch of the passenger C can be moved rearward about the main shaft 100 of the seat back 3 when the seat back 3 is tilted back. As a result, the space between the passenger's head Ch and the ceiling of the passenger compartment can be enlarged and contact of the passenger's head Ch against the ceiling can be suppressed in an effective manner.

In this embodiment, the coordinating device 200 is provided between the electric retractor 36 and the seat back tilt-back device 40A and serves to coordinate the restraining of the passenger C and the tilting back of the seat back 3 such that they occur at the same time. Thus, when a rollover condition occurs, the seat back 3 can be tilted back while the passenger C is being restrained to the seat 2 by the seat belt apparatus 30. As a result, the seat back 3 can be tilted back more quickly and the space between the passenger's head Ch and the ceiling can be widened more reliably.

The coordinating device 200 includes the wire 202 that is connected across a rotary part 36a of the electric retractor 36 of the seat belt apparatus 30 and the pulley 201 provided on the main shaft 100. As a result, the torque of the electric retractor 36 can be reliably transmitted to the main shaft 100 and the seat back 3 can be tilted back with a simple configuration.

Figure 19:
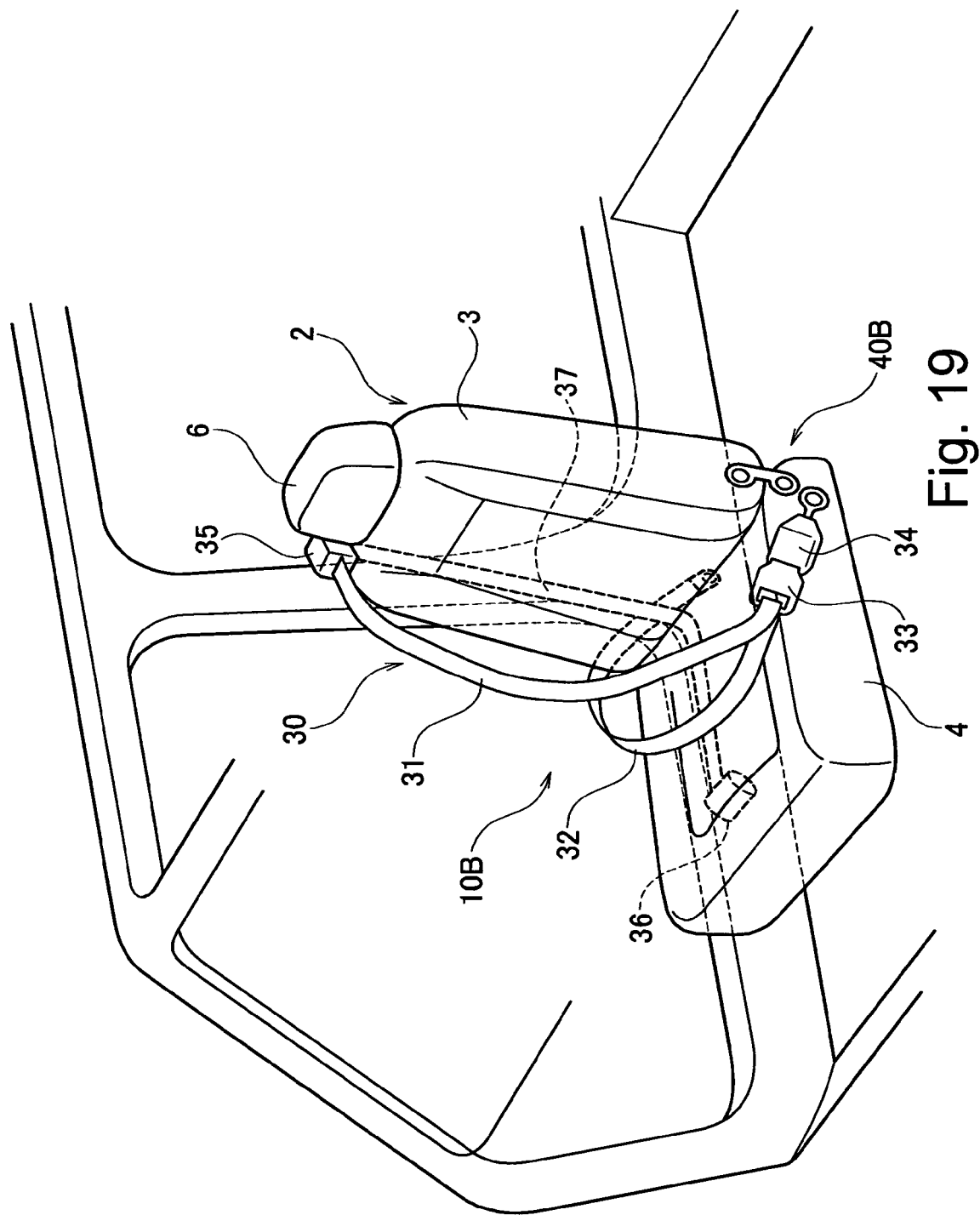
FIG. 19 is a perspective view of a passenger seat in which the passenger restricting system is equipped in accordance with a third embodiment of the present invention.
Figure 20:
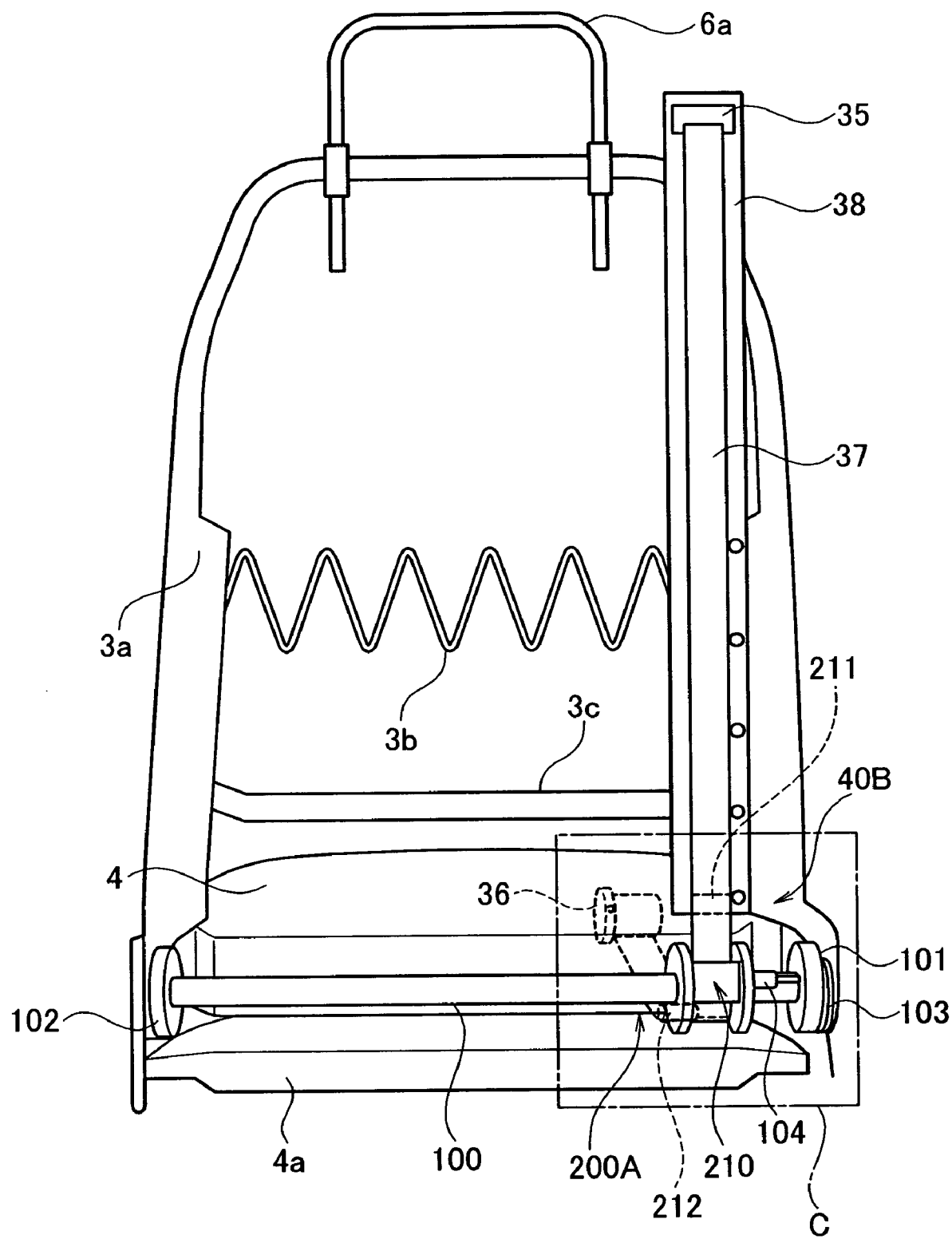
FIG. 20 is a rear view of selected portions of the internal structure of the passenger seat in which the passenger restricting system is equipped in accordance with the third embodiment of the present invention.
Figure 21:
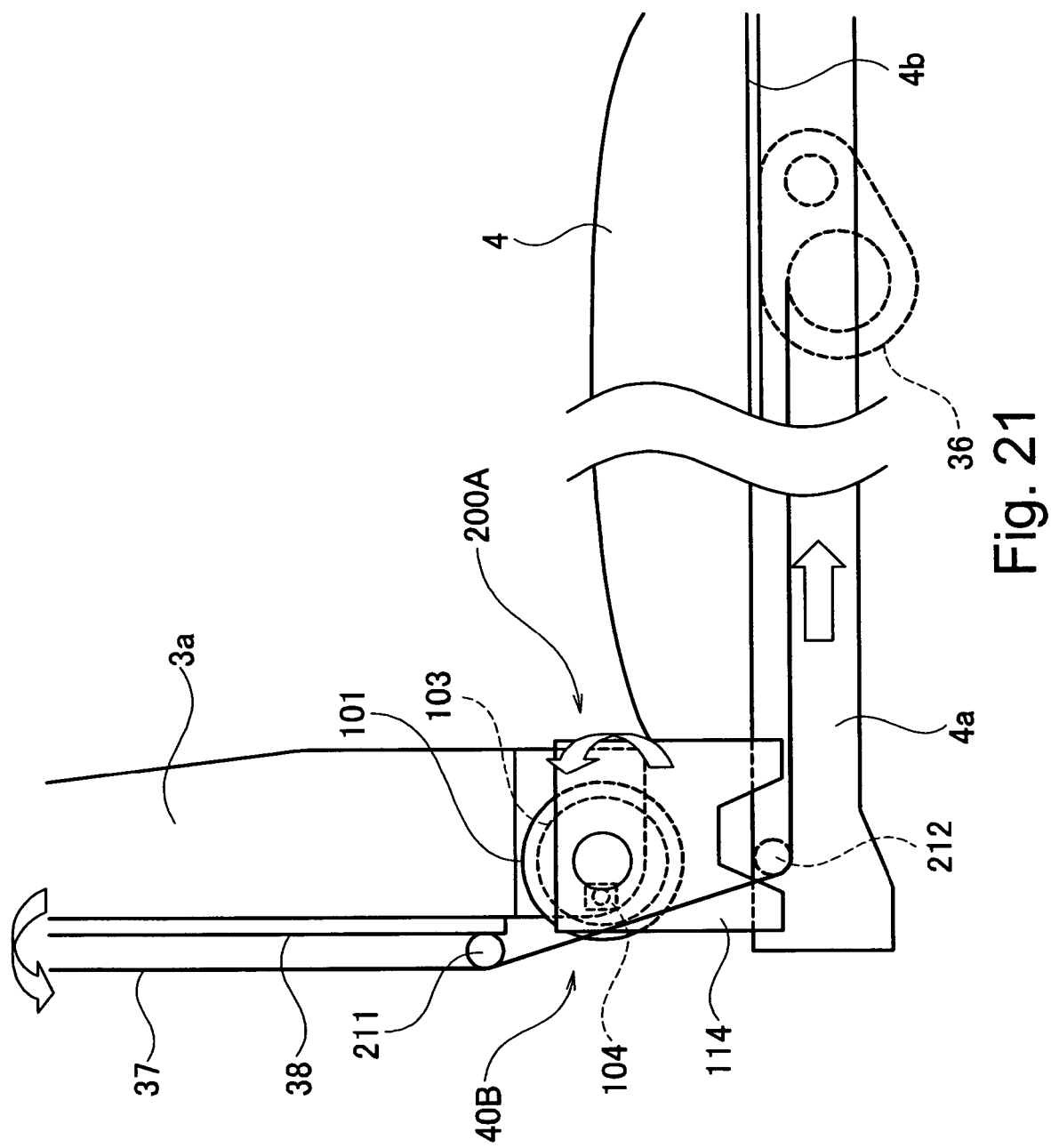
FIG. 21 is an enlarged, partial side view of the portion C of the internal structure of the passenger seat illustrated in FIG. 20.
Figure 22:
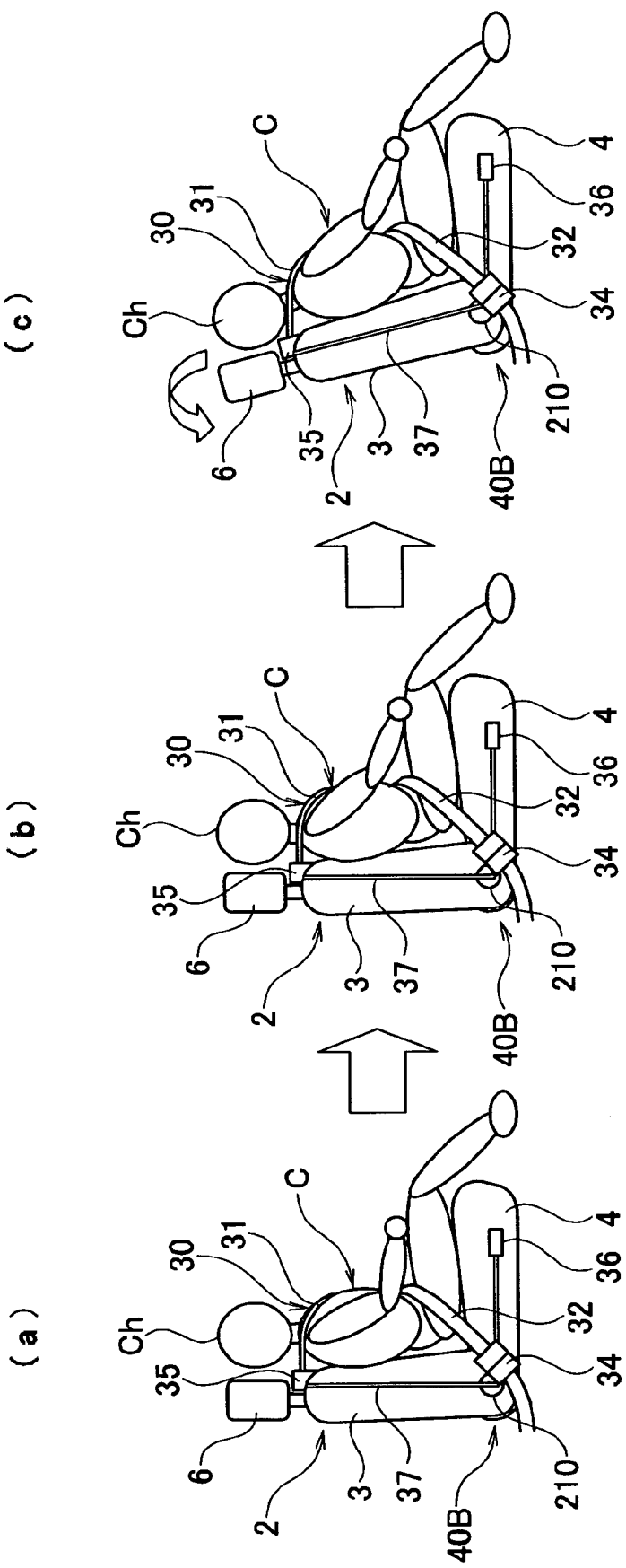
FIG. 22 is a series of side views or diagrams (a) to (c) of the seat illustrating successive operating states of the passenger restricting system during a rollover condition in accordance with the third embodiment of the present invention.
Figure 23:
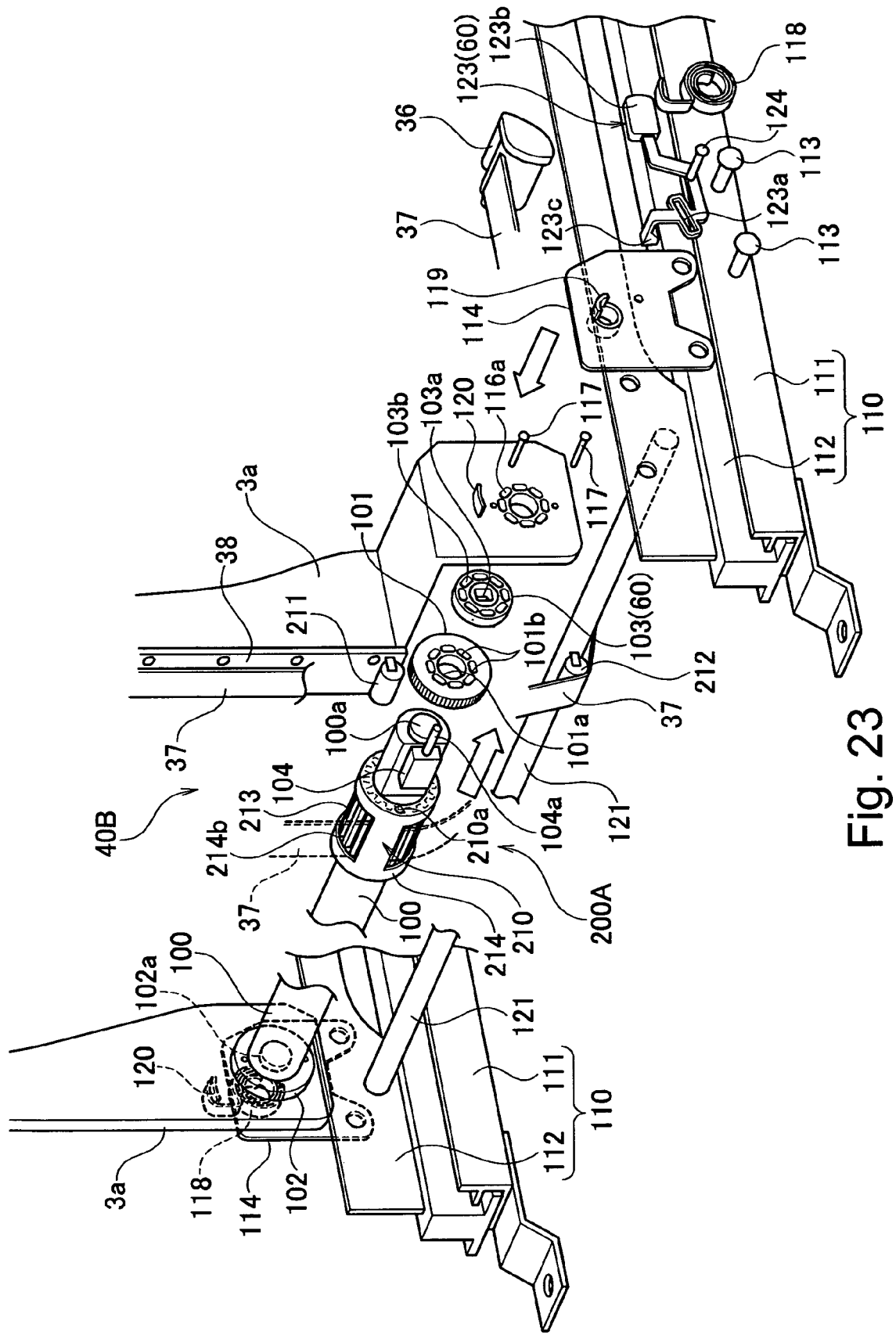
FIG. 23 is an exploded perspective view of selected details of the internal structure of a lower portion of the seat back in accordance with the third embodiment of the present invention.
Figure 24:
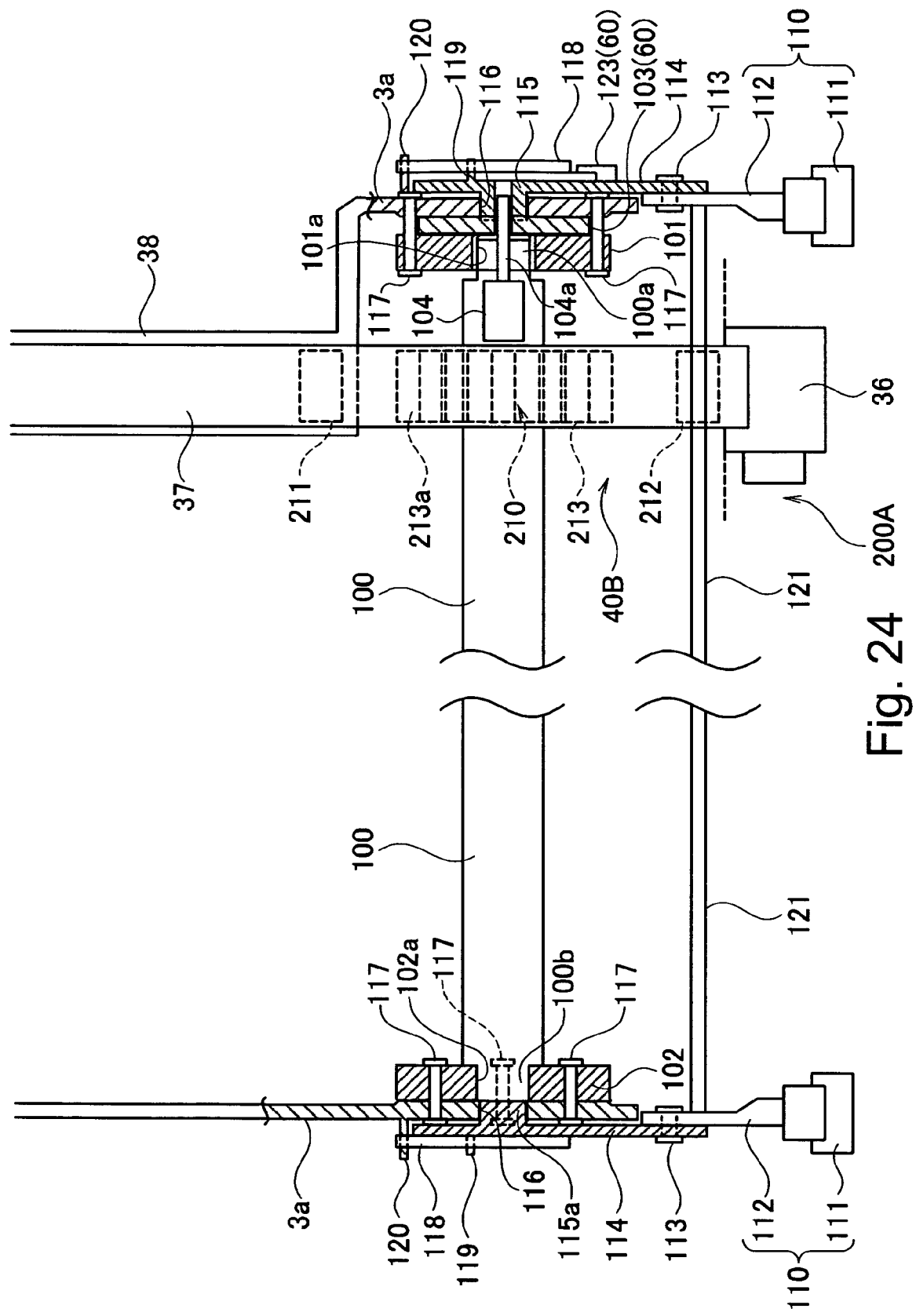
FIG. 24 is a rear cross-sectional view of the main components used in the internal structure of the lower portion of the seat in accordance with the third embodiment of the present invention.
Figure 25:
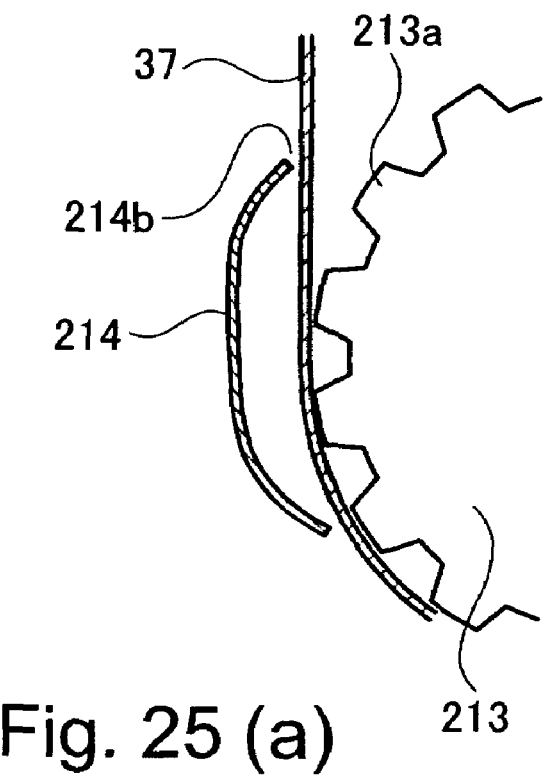
FIG. 25(a) is a cross sectional view of the main components of a torque transmission section of the coordinating device during a first operating state of the coordinating device in the third embodiment of the present invention.
FIG. 25(b) is a cross sectional view of the main components of a torque transmission section of the coordinating device during a second operating state of the coordinating device in the third embodiment of the present invention.
Figure 25:
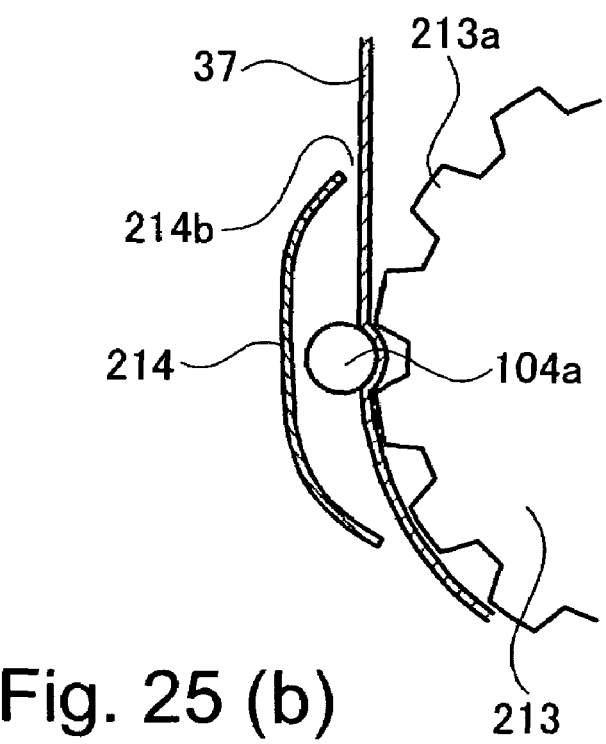
Figure 26:
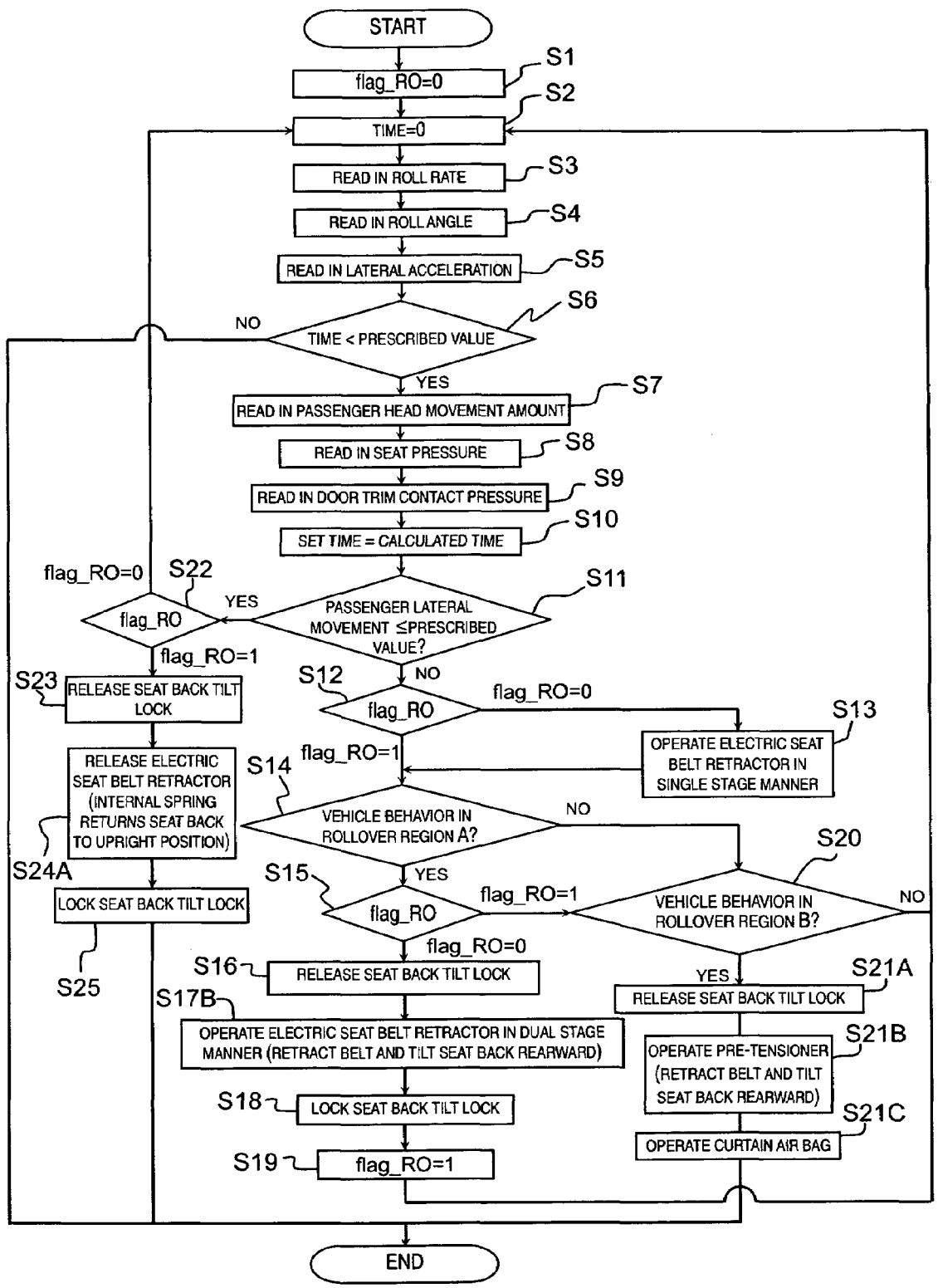
FIG. 26 is a flowchart showing the control operations executed by the controller in order to control the passenger restricting system in accordance with the third embodiment of the present invention.

FIGS. 19 to 26 show a third embodiment of the present invention. Parts that are the same as the parts of the previously explained embodiments are indicated with the same reference numerals and explanations thereof are omitted for the sake of brevity. FIG. 19 is a perspective view of a seat in which the passenger restricting system is employed. FIG. 20 is a rear view showing the internal structure of the seat. FIG. 21 is a side view of the portion C of FIG. 20. FIG. 22 is a series of side views or diagrams (a) to (c) of the seat illustrating successive operating states of the passenger restricting system during a rollover condition. FIG. 23 is an exploded perspective view showing the internal structure of a lower portion of the seat back in detail. FIG. 24 is a rear cross-sectional view showing the main components in the internal structure of the lower portion of the seat. FIGS. 25(a) and 25(b) are cross sectional views showing the main components of a torque transmission section of the coordinating device during two different operating states of the coordinating device. FIG. 26 is a flowchart showing the control operations executed in order to control the passenger restricting system.

The vehicle rollover passenger restricting system 10B of this embodiment is basically the same as the passenger restricting system 10 of the first embodiment. More specifically, similarly to the passenger restricting system 10, the passenger restricting system 10A is provided with the vehicle rollover detector 20, the seat belt apparatus 30 serving as a passenger restraining device, a seat back tilt-back device 40B, and the controller 50. The vehicle rollover detector 20 and the controller 50 have the same constituent features as in the first embodiment. As shown in FIG. 19, the seat belt apparatus 30 includes the shoulder belt 31 and the lap belt 32 to form a three-point seat belt structure, which is the same as in the first embodiment.

Similarly to the second embodiment, a coordinating device 200A is provided between the seat belt apparatus 30 and the seat back tilt-back device 40B. The coordinating device 200A is configured to coordinate the operation of the seat belt apparatus 30 and the seat back tilt-back device 40B such that the restraining of the passenger C and the tilting back of the seat back 3 occur at the same time in a coordinated manner.

As shown in FIGS. 20 and 21, the coordinating device 200A includes mainly a bobbin 210 serving as a rotary member that is configured and arranged to engage with the seat belt webbing 37 dispensed from the electric retractor 36 of the seat belt apparatus 30 in such a manner that the rotary member (bobbin 210) and the seat belt webbing 37 can move freely relative to each other under normal circumstances, and to engage with the seat belt webbing 37 during a rollover condition in such a manner that the retracting movement of the seat belt webbing 37 causes the main shaft 100 of the seat back 3 to rotate.

When the vehicle 1 rolls over as shown in FIG. 5 of the first embodiment, the seat belt apparatus 30 and the seat back 3 operate as shown in diagrams (a) to (c) of FIG. 22, i.e., in the same manner as in the first embodiment, so as to lean the passenger C back by a prescribed amount, thereby widening the space between the passenger's head Ch and the ceiling of the vehicle.

Diagram (a) of FIG. 22 illustrates the state of the system 10B under normal circumstances in which the vehicle is not rolling over. The passenger C is sitting in the seat 2 with the seat belt apparatus 30 fastened. When the vehicle rollover detector 20 detects a rollover condition, the electric retractor 36 operates and reels in the seat belt webbing 37 as shown in diagram (b) of FIG. 22 such that the shoulder belt 31 restrains the passenger C to the seat back 3 securely with a prescribed tensile force. At the same time, as shown in diagram (c) of FIG. 22, the reeling in of the seat belt webbing 37 by the electric retractor 36 causes the rotor 213 of the bobbin 210 to rotate, which causes the main shaft 100 to rotate. Likewise, the rotation of the main shaft 100 causes the seat back 3 to tilt back by a prescribed amount such that the passenger C is leaned back by a prescribed amount.

In this embodiment, too, the electric retractor 36 is configured such that it can rotate in both a forward and a reverse direction and, thus, the seat belt apparatus 30 and the seat back tilt-back device 40B are provided with a reversible function whereby they can return to the state in which they existed before a rollover condition was detected.

FIGS. 23 to 24 show the structure of the lower portion of the seat 2 in more detail. The lower end portions of the seat back frame 3a are mounted to the sliders 112 of a pair of seat sliders 110 with plates 114 disposed therebetween. The lower end portions of the seat back frame 3a are pivotally attached to the plates 114.

The seat back recliner 103 and the shaft guide 101 are arranged on the inward side of the lower end portion of the seat back frame 3a that is located toward the inside of the vehicle (right-hand side in the figures), with the shaft guide 101 being located farther inward toward the seat than the seat back recliner 103. Similarly, the shaft guide 102 is arranged on the inward side of the lower end portion of the seat back frame 3a that is located toward the outside of the vehicle (left-hand side in the figures). The ends of the main shaft 100 are provided with smaller diameter support portions 100a and 100b that fit into center holes 101a and 102a of the shaft guides 101 and 102, respectively, and support the shaft guides 101 and 102 in a freely rotatable manner.

Elongated holes 101b, 103b and 116a are formed in the shaft guide 101, the seat back recliner 103, and the seat back frame 3a. The elongated holes 101b, 103b and 116a are arranged such that the operating pin 104a of a solenoid 104 mounted to the main shaft 100 can pass through the elongated holes 101b, 103b and 116a when the operating pin 104a is extended, thereby enabling the operating pin 104a to fix (i.e., prevent movement of) the seat back frame 3a.

One spiral spring 118 is arranged between the seat back frame 3a and the plate 114 located toward the inside of the vehicle along the widthwise direction of the vehicle and another spiral spring 118 is arranged between the seat back frame 3a and the plate 114 located toward the outside of the vehicle. The spiral springs 118 serve to torsionally spring load the seat back frame 3a in the return direction. The connecting frame 121 is provided so as to span in the widthwise direction of the vehicle between the two sliders 112.

In this embodiment, the electric retractor 36 is arranged on the bottom side of a seat pan 4b of the seat cushion 4 (see FIG. 21) and the bobbin 210 arranged more toward the center of the seat 2 than the solenoid 104 of the main shaft 100. The seat belt webbing 37 fed into the seat back 3 from the webbing passage opening 35 (see FIG. 19) passes over an upper roller 211 provided on a lower end portion of the webbing guide 38 and through the bobbin 210. The seat belt webbing 37 then passes over the lower roller 212 provided on the connecting frame 121 and into the electric retractor 36.

As shown in FIGS. 25(a) and 25(b), the bobbin 210 includes mainly a rotor 213 having protrusions and recesses 213a on the external circumference thereof and a case 214 in which the rotor 213 is housed. The rotor 213 is mounted on (engaged with) the main shaft 100 such that it cannot rotate relative to the main shaft 100 and the case 214 is supported on the main shaft 100 on the opposite side of the rotor 213 the side where the solenoid 104 is arranged. On the side where the solenoid 104 is arranged, the case 214 has a pin passage hole 210a through which the operating pin 104a can pass so as to be disposed between the rotor 213 and the case 214.

The solenoid 104 is configured such that the operating pin 104a can be extended toward the bobbin 210, which is the opposite direction as the seat back recliner 103. Thus, when the operating pin 104a is retracted from the elongated holes 103b and 116a of the seat back recliner 103 and seat back frame 3a, the other end of the operating pin 104a extends and passes between the rotor 213 and the case 214.

The seat belt webbing 37 passes through an outer opening 214b of the case 214 from above and over a portion of the external circumference of the rotor 213 as shown in FIG. 25(a). The seat belt webbing 37 then passes out through the bottom side of the outside opening 214b and over the aforementioned lower roller 212.

As shown in FIG. 25(b), when the operating pin 104a of the solenoid 104 enters between the rotor 213 and the case 214, the operating pin 104a presses the seat belt webbing 37 against the protrusions 213a of the rotor 213 and causes the seat belt webbing 37 to become locked to the rotor 213. Thus, when the seat belt webbing 37 is retracted by the electric retractor 36, the movement of the seat belt webbing 37 causes the rotor 213 to rotate. The coordinating device 200A is configured such that the rotor 213 is rotated through a prescribed angle by the seat belt webbing 37. As a result, the main shaft 100 can be rotated by such an amount that the seat back 3 is tilted back by a prescribed amount.

Similarly to the first embodiment, the recliner operating lever 123 is provided on the outward side of the plate 114 on the side of the seat 2 where the seat back recliner 103 is provided. The seat back recliner 103 and the recliner operating lever 123 constitute a reclining device 60 that enables the reclining position of the seat back 3 to be adjusted as desired.

In the passenger restricting system 10B, the controller 50 executes the steps shown in the flowchart of FIG. 26 in order to detect if the vehicle 2 is rolling over and to control the seat back tilt-back device 40B and the seat belt apparatus 30 based on the results of the rollover detection. The steps of the flowchart will now be explained, although they are substantially the same as the steps of the flowchart shown in FIG. 18 of the second embodiment. Control steps that are the same as in the second embodiment are indicated with the same step numbers as in the flowchart of FIG. 18 and explanations thereof are omitted for the sake of brevity.

In step S17B of this embodiment, similarly to the second embodiment, the electric retractor 36 is operated such that the seat belt webbing 37 of the seat belt apparatus 30 is reeled in and the seat back 3 is tilted back. This embodiment is different from the second embodiment in that the rotation of the main shaft 100 and the accompanying tilting back of the seat back 3 by a prescribed amount is accomplished by using the engagement between the seat belt webbing 37 and the rotor 213 of the bobbin 210.

In this embodiment, too, a map is used to determine if a rollover condition exists. An explanation of the map is omitted here because the map is the same as the map shown in FIG. 11 of the first embodiment.

Similarly to the first embodiment, the vehicle rollover passenger restricting system 10B of this embodiment is configured such that when a rollover condition is detected, the passenger C can be tilted back by a prescribed amount along with the seat back 3 while being restrained in the seat 2. Consequently, the head Ch of the passenger C can be moved rearward about the main shaft 100 of the seat back 3 when the seat back 3 is tilted back. As a result, the space between the passenger's head Ch and the ceiling of the passenger compartment can be enlarged and contact of the passenger's head Ch against the ceiling can be suppressed in an effective manner.

In another similarity with the second embodiment, the coordinating device 200A is provided between the electric retractor 36 and the seat back tilt-back device 40B and serves to coordinate the restraining of the passenger C and the tilting back of the seat back 3 such that they occur at the same time. Thus, when a rollover condition occurs, the seat back 3 can be tilted back while the passenger C is being restrained to the seat 2 by the seat belt apparatus 30. As a result, the seat back 3 can be tilted back more quickly and the space between the passenger's head Ch and the ceiling can be widened more reliably.

The coordinating device 200A includes mainly a bobbin 210 that is configured and arranged to engage with the seat belt webbing 37 dispensed from the electric retractor 36 of the seat belt apparatus 30 in such a manner that the bobbin 210 and seat belt webbing 37 can move freely relative to each other under normal circumstances, and to engage with the seat belt webbing 37 during a rollover condition in such a manner that the retracting movement of the seat belt webbing 37 causes the main shaft 100 of the seat back 3 to rotate. Consequently, the bobbin 210 can be driven directly by the seat belt webbing 37. As a result, the torque of the electric retractor 36 can be transmitted reliably to the main shaft 100 and the seat back 3 can be tilted back using a comparatively simple structure.

Figure 27:
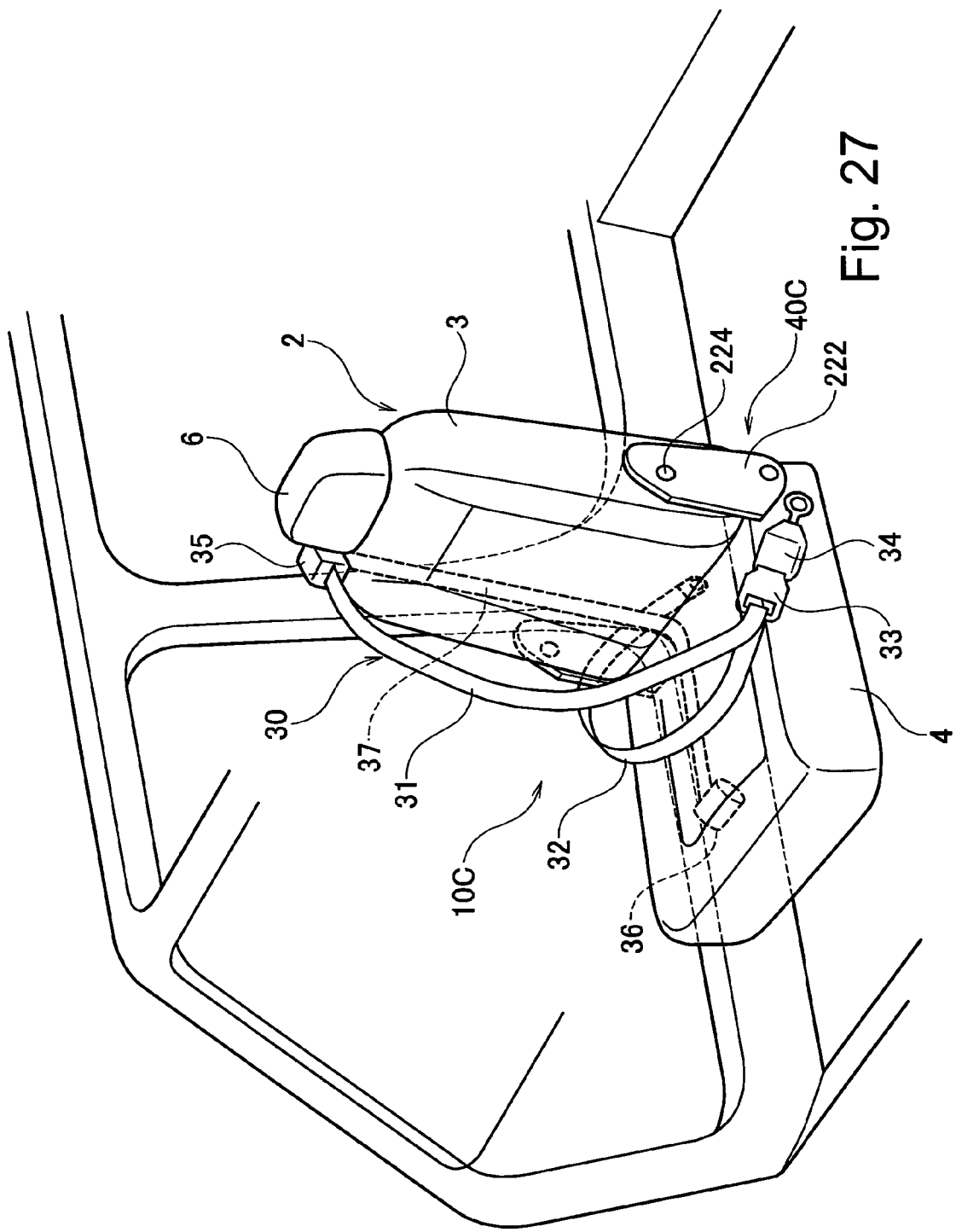
FIG. 27 is a perspective view of a passenger seat in which the passenger restricting system is equipped in accordance with a fourth embodiment of the present invention, with the seat shown during normal driving conditions.
Figure 28:
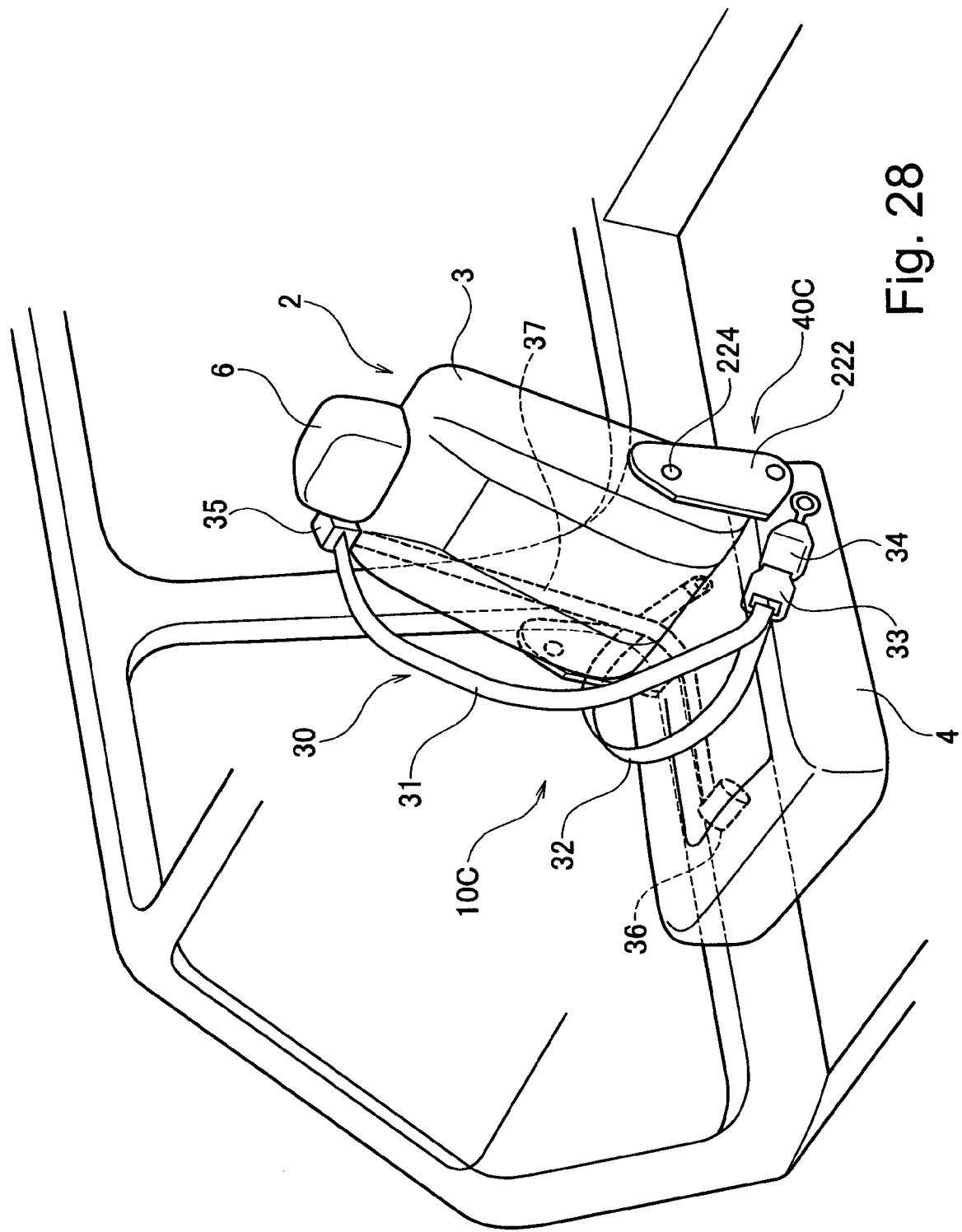
FIG. 28 is a perspective view of the seat when a rollover condition is detected in accordance with the fourth embodiment of the present invention.
Figure 29:
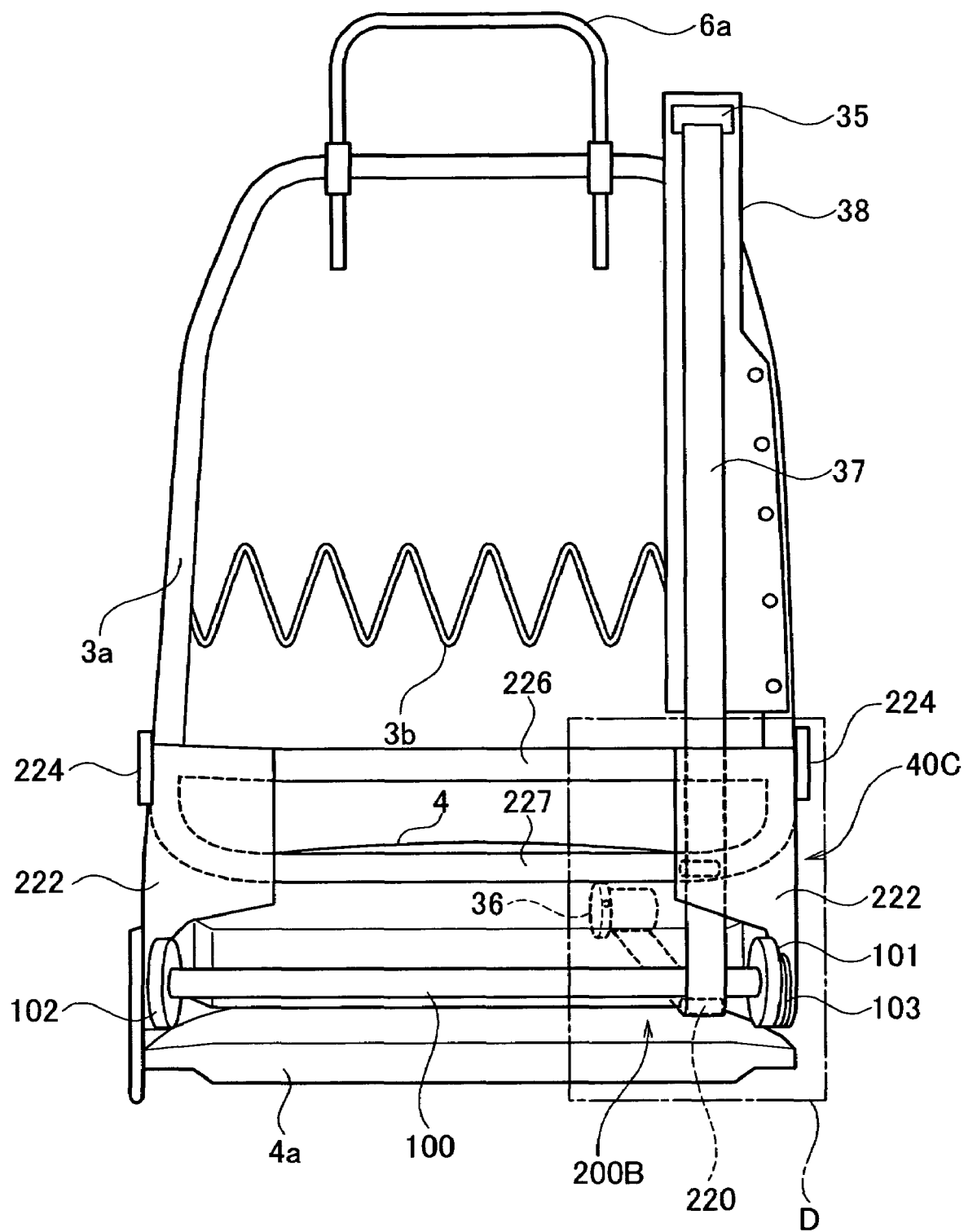
FIG. 29 is a rear view of selected portions of the internal structure of the passenger seat in which the passenger restricting system is equipped in accordance with the fourth embodiment of the present invention.
Figure 30A:
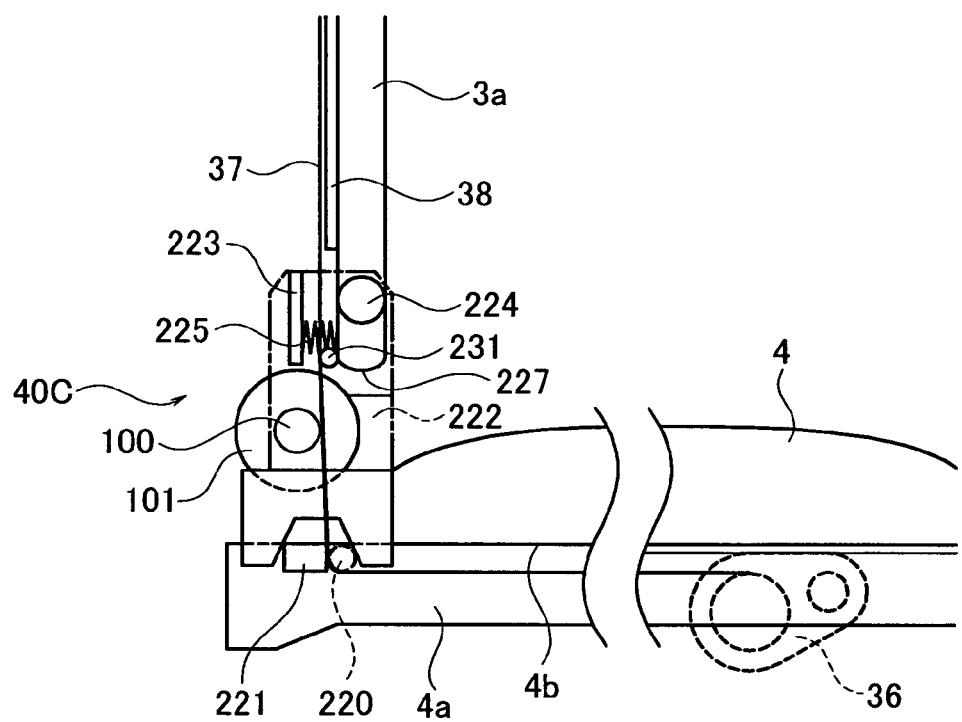
FIG. 30(a) is a side view of the portion D illustrated in FIG. 29 during normal driving in accordance with the fourth embodiment of the present invention.
Figure 30B:
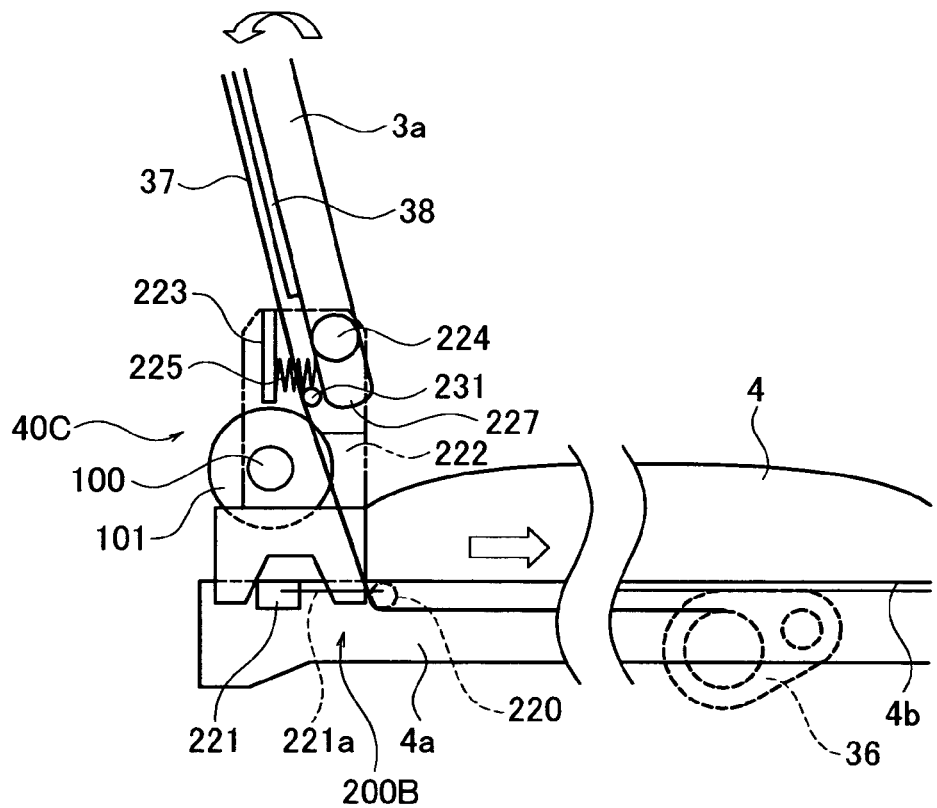
FIG. 30(b) is a side view of the portion D illustrated in FIG. 29 when a rollover condition is detected in accordance with the fourth embodiment of the present invention.
Figure 31:
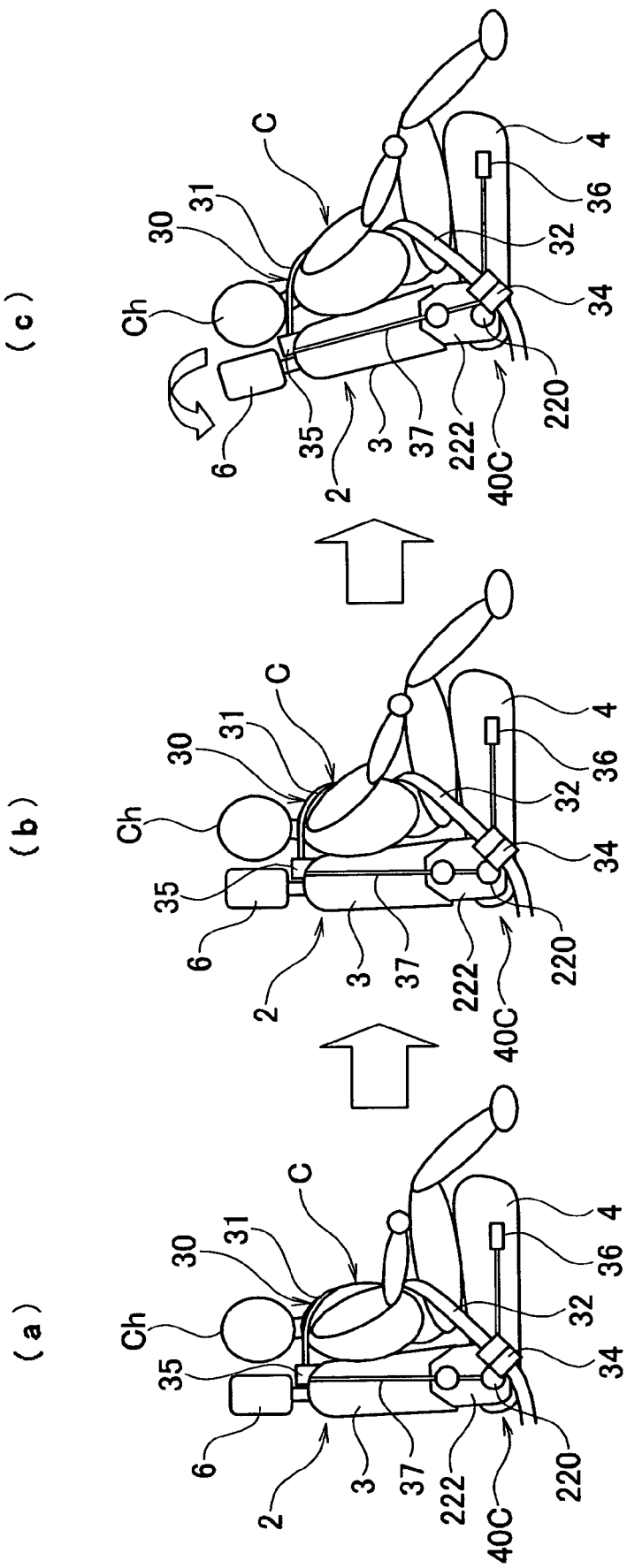
FIG. 31 is a series of side views or diagrams (a) to (c) of the seat illustrating successive operating states of the passenger restricting system during a rollover condition in accordance with the fourth embodiment of the present invention.
Figure 32:
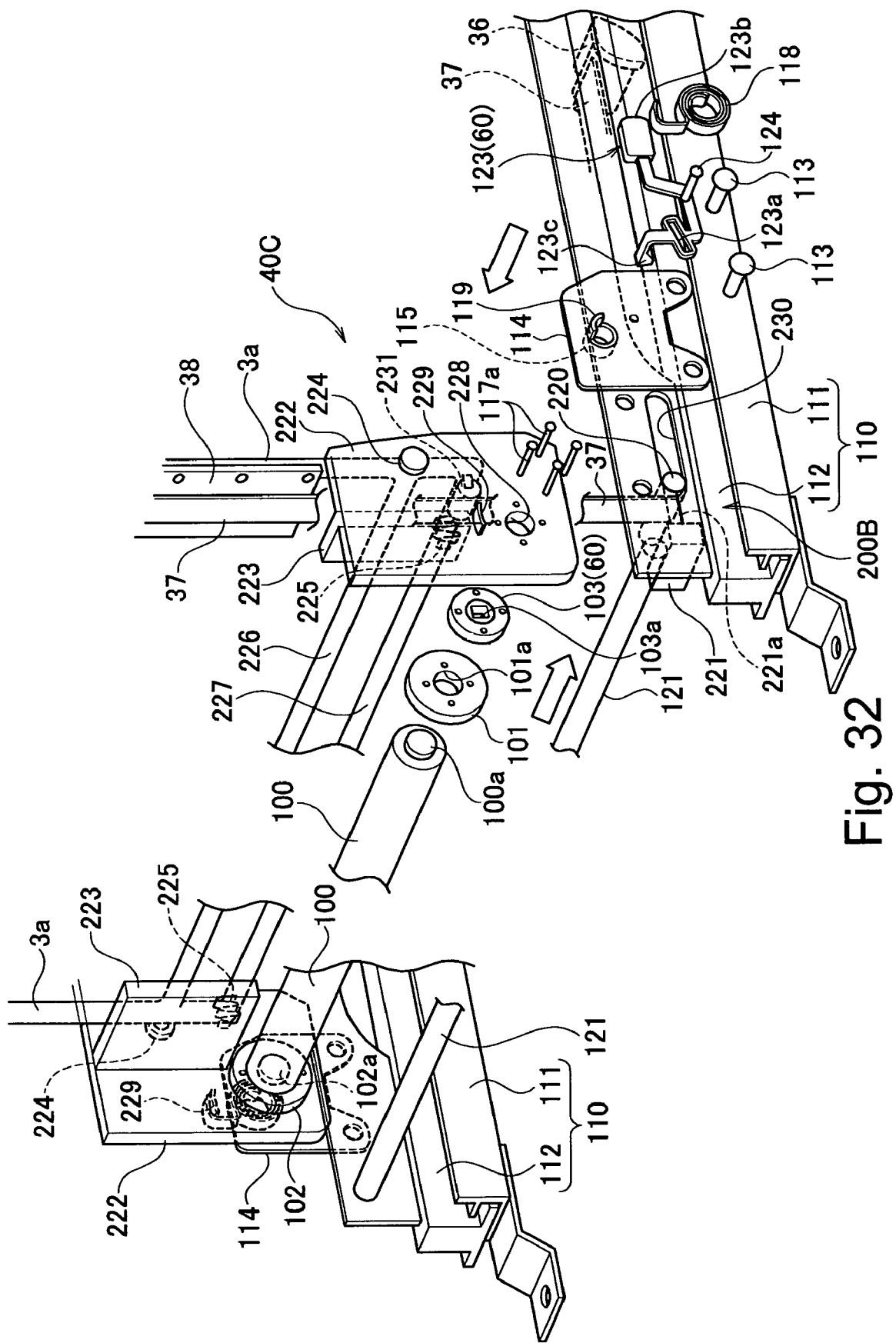
FIG. 32 is an exploded perspective view of selected details of the internal structure of a lower portion of the seat back in accordance with the fourth embodiment of the present invention.
Figure 33:
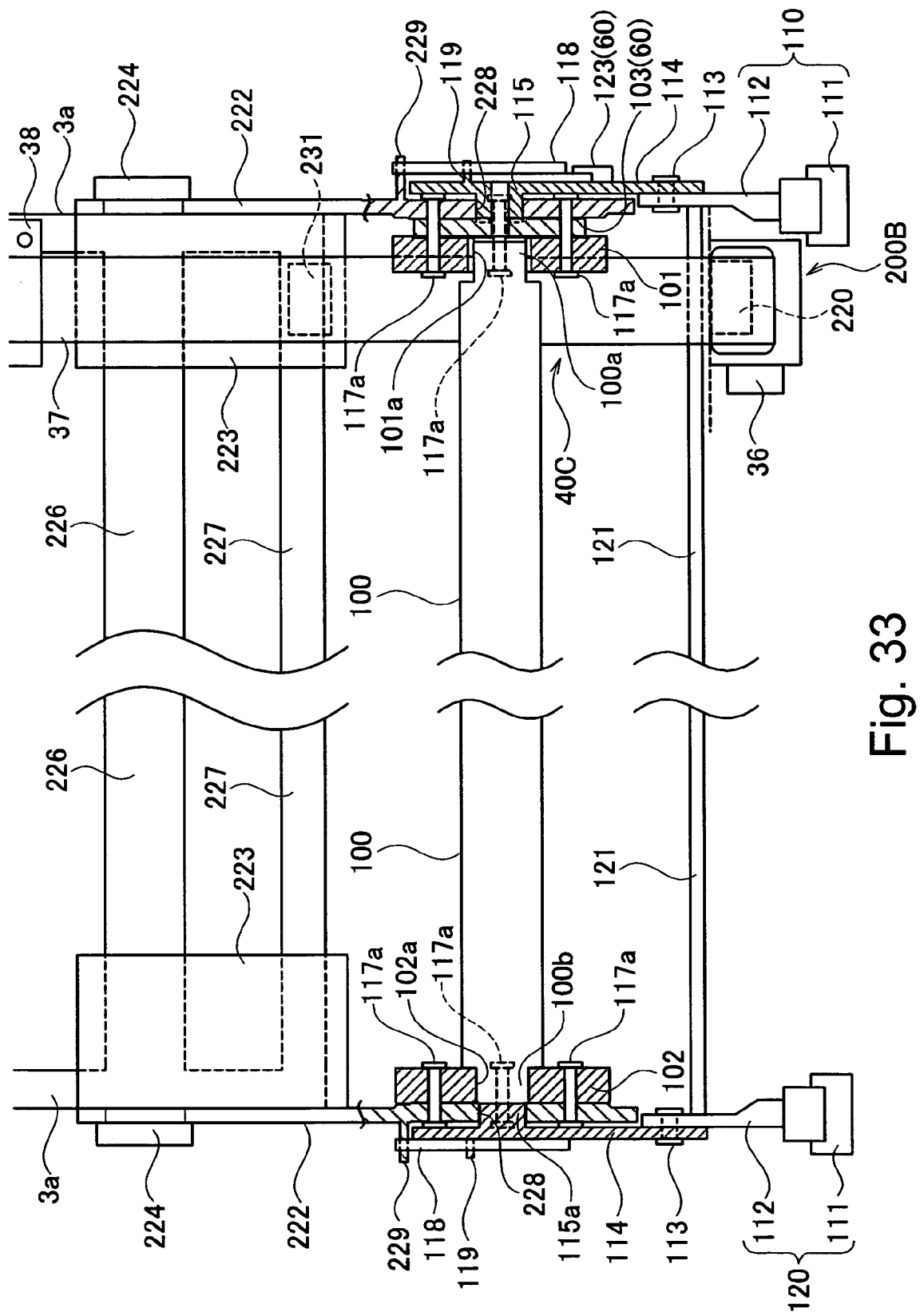
FIG. 33 is a rear cross-sectional view of the main components used in the internal structure of the lower portion of the seat in accordance with the fourth embodiment of the present invention.
Figure 34:
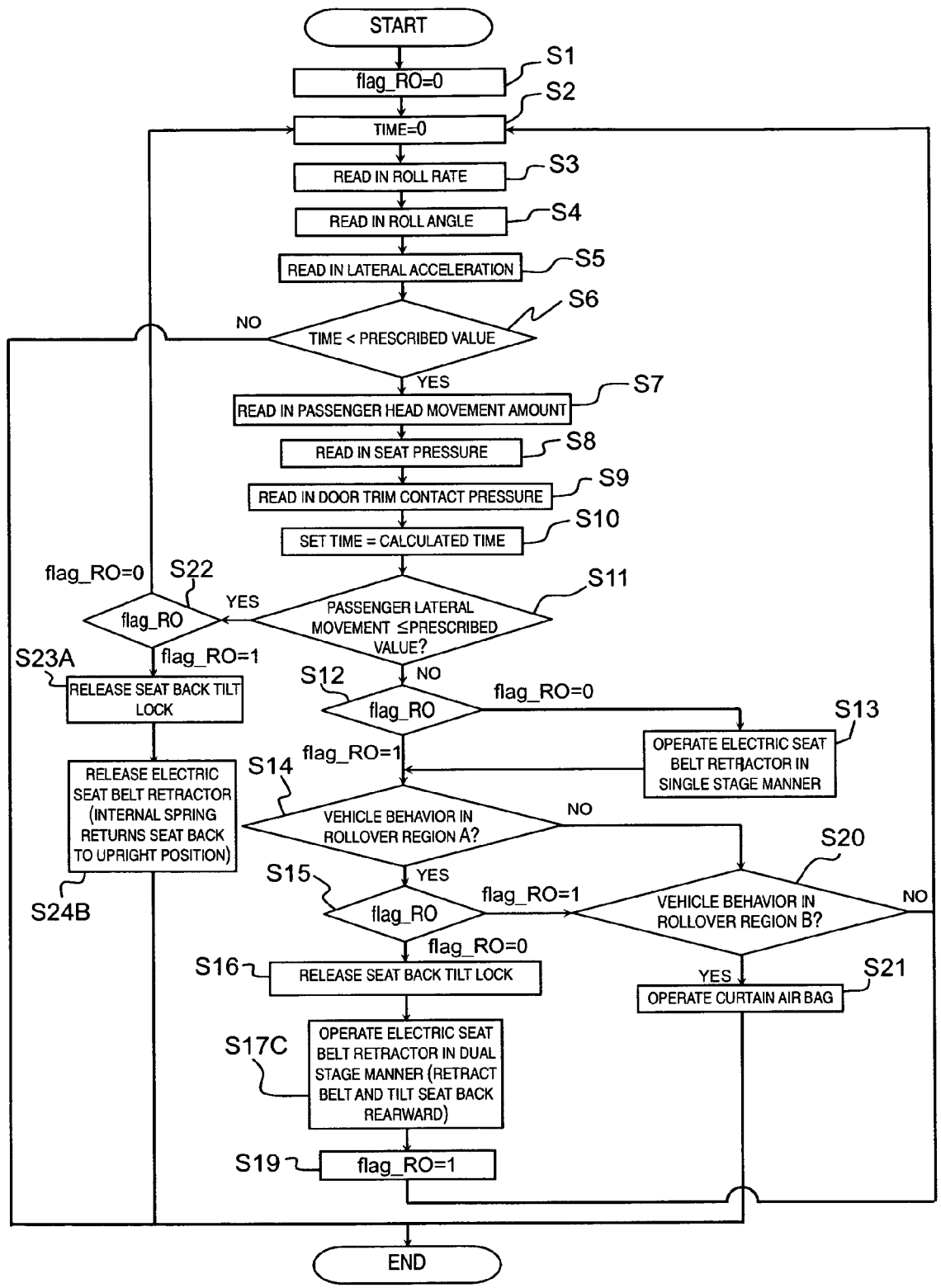
FIG. 34 a flowchart showing the control operations executed by the controller in order to control the passenger restricting system in accordance with the fourth embodiment of the present invention.

FIGS. 27 to 34 show a fourth embodiment of the present invention. Parts that are the same as the parts of the previously explained embodiments are indicated with the same reference numerals and explanations thereof are omitted for the sake of brevity. FIG. 27 is a perspective view showing a seat in which the passenger restricting system is employed during normal conditions. FIG. 28 is a perspective view showing the seat when a rollover condition is detected. FIG. 29 is a rear view showing the internal structure of the seat. FIGS. 30(a) and 30(b) are side views showing the portion D of FIG. 29 during normal driving and when a rollover condition is detected, respectively. FIG. 31 is a series of side views or diagrams (a) to (c) of the seat illustrating successive operating states of the passenger restricting system during a rollover condition. FIG. 32 is an exploded perspective view showing the internal structure of a lower portion of the seat back in detail. FIG. 33 is a rear cross-sectional view showing the main components in the internal structure of the lower portion of the seat. FIG. 34 is a flowchart showing the control operations executed in order to control the passenger restricting system.

The vehicle rollover passenger restricting system 10C of this embodiment is basically the same as the passenger restricting system 10 of the first embodiment. More specifically, similarly to the passenger restricting system 10, the passenger restricting system 10C is provided with the vehicle rollover detector 20, the seat belt apparatus 30 serving as a passenger restraining device, a seat back tilt-back device 40C, and the controller 50. The vehicle rollover detector 20 and the controller 50 have the same constituent features as in the first embodiment. As shown in FIGS. 27 and 28, the seat belt apparatus 30 includes the shoulder belt 31 and the lap belt 32 to form a three-point seat belt structure as in the first embodiment.

As shown in FIGS. 29 and 30, this embodiment, too, has a coordinating device 200B provided between the seat belt apparatus 30 and the seat back tilt-back device 40C. The coordinating device 200B is configured to coordinate the operation of the seat belt apparatus 30 and the seat back tilt-back device 40C such that the restraining of the passenger C and the tilting back of the seat back 3 occur at the same time in a coordinated manner.

As shown in FIGS. 29 and 30, the coordinating device 200B includes mainly a movable roller 220 and a solenoid 221. The movable roller 220 is arranged and configured such that a lower portion of the seat belt webbing 37 extending vertically along the back side of the seat back 3 passes thereover and can be moved frontward and rearward thereby. The movable roller 220 also directs the seat belt webbing 37 toward the electric retractor 36 arranged toward the front of the seat cushion 4. The solenoid 221 serves as a moving device that is configured and arranged to move the movable roller 220 toward the front of the vehicle when a rollover condition occurs. When a rollover condition occurs and the movable roller 220 is moved forward, the retracting force of the seat belt webbing 37 is converted into a force that causes the seat back 3 to tilt back.

When the vehicle 1 rolls over as shown in FIG. 5 of the first embodiment, the seat belt apparatus 30 and the seat back 3 operate as shown in diagrams (a) to (c) of FIG. 31, i.e., in the same manner as in the first embodiment, so as to lean the passenger C back by a prescribed amount, thereby widening the space between the passenger's head Ch and the ceiling of the vehicle.

Diagram of (a) FIG. 31 illustrates the state of the system 10C under normal circumstances in which the vehicle is not rolling over. The passenger C is sitting in the seat 2 with the seat belt apparatus 30 fastened. When the vehicle rollover detector 20 detects a rollover condition, the electric retractor 36 operates and reels in the seat belt webbing 37 as shown in diagram of (b) FIG. 31 such that the shoulder belt 31 restrains the passenger C to the seat back 3 securely with a prescribed tensile force. At the same time, as shown in diagram of (c) FIG. 31, the operation of the electric retractor 36 causes the seat back webbing 37 to tilt back the seat back 3 by a prescribed amount such that the passenger C is leaned back by a prescribed amount.

In this embodiment, too, the electric retractor 36 is configured such that it can rotate in both a forward and a reverse direction and, thus, the seat belt apparatus 30 and the seat back tilt-back device 40C are provided with a reversible function whereby they can return to the state in which they existed before a rollover condition was detected.

FIGS. 32 to 33 show the structure of the lower portion of the seat 2 in more detail. The lower end portions of the seat back frame 3a are pivotally mounted to the sliders 112 of a pair of seat sliders 110 by using a pair of seat back plates 222 and a pair of plates 114. The seat back plates 222 are a new feature of this embodiment and the plates 114 are the same as in the previous embodiments.

Each of the seat back plates 222 has a rib 223 that protrudes inward toward the seat such that the seat back plate 222 has a T-shape in a top plan view. The bottom portion of the seat back frame 3a is pivotally connected to a pivot support 224 that is provided toward the front of the vehicle from the rib 223 of the respective seat back plate 222 and functions as a tilt shaft.

A shaft 226 joining the pivot supports 224 is provided on the seat back frame 3a and a lower frame 227 joining the bottom ends of the seat back frame 3a is also provided. Similarly to the first to third embodiments, the webbing guide 38 is provided on the side of the seat back frame 3a located more toward the inside of the vehicle.

Similarly to the previous embodiments, the seat sliders 110 located under the seat 2 support the seat cushion 4 in such a manner that it can move freely frontward and rearward. The connecting frame 121 is connected between the sliders 112 so as to be oriented along the widthwise direction of the vehicle.

As shown in FIGS. 30(a) and 30(b), a tension spring 225 is provided between the rib 223 of each seat back plate 222 and the lower frame 227 of the seat back frame 3a. Each tension spring 225 is positioned lower than the pivot support 224 and is arranged so as to exert a compressive spring load that causes the seat back frame 3a to pivot in the return direction (tilt-forward direction).

The boss of the hole 115 provided on the plate 114 located toward the inside of the vehicle (right-hand side in the figures) fits pivotally into a support hole 228 formed in a lower portion of the corresponding seat back plate 222, and the boss 115 provided on the plate 114 located toward the outside of the vehicle (left-hand side in the figures) fits pivotally into a support hole 228 formed in a lower portion of the corresponding seat back plate 222.

The seat back recliner 103 and the shaft guide 101 are arranged on the inward side of the seat back plate 222 that is located more toward the inside of the vehicle relative to the widthwise direction of the vehicle, the shaft guide 101 being located farther inward toward the seat than the seat back recliner 103. Similarly, the shaft guide 102 is arranged on the inward side of the seat back plate 222 that is located more toward the outside of the vehicle. The ends of the main shaft 100 are provided with smaller diameter support portions 100a and 100b that fit into center holes 101a and 102a of the shaft guides 101 and 102, respectively, and support the shaft guides 101 and 102 in a freely rotatable manner.

In this embodiment, the elongated holes 101b, 103b and 116a mentioned in the first to third embodiments are not provided in the shaft guide 101, the seat back recliner 103, and the seat back frame 3a. The seat back recliner 103 and the shaft guide 101 are coupled to the corresponding seat back plate 222 with pins 117a, and the shaft guide 102 is coupled to the other seat back plate 222 with the pins 117a.

One spiral spring 118 is arranged between the seat back frame 3a and the inside plate 114 and another spiral spring 118 is arranged between the seat back frame 3a and outside plate 114. The spiral springs 118 serve to torsionally spring load the seat back plates 222 in the return direction. The radially inward end of the one spiral spring 118 engages with an engaging protrusion 119 provided on the periphery the hole 115 and the radially inward end of the other spiral spring 118 engages with an engaging protrusion 119 provided on opposite side face of the plate 114 as the boss 115a. The radially outward ends of the spiral springs 118 engage with engaging protrusions 229 provided so as to protrude from respective side faces of the seat back plates 222.

In this embodiment, the electric retractor 36 is arranged at an edge of the bottom surface of the seat pan 4b of the seat cushion 4 on the side located farther inside the vehicle and serves to retract the seat belt webbing arranged along the webbing guide 38.

An elongated hole 230 is formed in the slider 112 that is positioned farther inside the vehicle under the webbing guide 38. The elongated hole 230 is positioned so as to extend longitudinally toward the front of the vehicle (rightward in FIG. 32) from a position substantially directly under the webbing guide 38. The movable roller 220 fits into this elongated hole 230 such that it can move freely forward and rearward there-within. The seat belt webbing 37 is passed around the movable roller 220 and guided to the electric retractor 36 arranged toward the front of the vehicle.

The solenoid 221 for moving the movable roller 220 back and forth is arranged rearward of the elongated hole 230 and has an extending/retracting operating member 221a that is coupled to the movable roller 220. When a rollover condition occurs, the operating member 221a is extended such that the movable roller 220 is pushed toward the front of the vehicle, causing the portion of the seat belt webbing 37 that passes over the movable roller 220 to be moved farther frontward than a vertical extension line extending downward from the webbing guide 38.

A guide roller 231 is provided on the lower frame 227 (which constitutes the bottommost portion of the seat back frame 3a) and arranged such that it touches against the seat back webbing 37 extending downward from the webbing guide 38.

When a rollover condition is detected and the solenoid 221 is operated such that the operating member 221a extends and moves the movable roller 220 toward the front of the vehicle, the guide point of the seat belt webbing 37, i.e., the position where the seat belt webbing 37 passes around the moveable roller 220, is moved farther toward the front of the vehicle than an extension line extending downward from the webbing guide 38. As a result, when the electric retractor 36 reels in the seat belt webbing 37, the resulting force generated in the seat belt webbing 37 acts to push against the guide roller 231 provided on the bottom portion of the seat back frame 3a in a direction oriented toward the front of the vehicle.

This frontward pushing against the guide roller 231 causes the seat back frame 3a to tilt rearward about the pivot supports 224 such that the seat back 3 and the passenger C are tilted back by a prescribed amount and the space between the passenger's head Ch and the ceiling is widened. At the same time, since the electric retractor 36 is retracting the seat belt webbing 37, the passenger C is more securely restrained to the seat back 3 by the shoulder belt 31.

Similarly to the other embodiments, the recliner operating lever 123 is provided on the outward side of the plate 114 on the side of the seat 2 where the seat back recliner 103 is provided. The seat back recliner 103 and the recliner operating lever 123 constitute a reclining device 60 that enables the reclining position of the seat back 3 to be adjusted as desired.

The recliner operating lever 123 is mounted to the plate 114 with the pin 124 passed through the elongated hole 123a provided in a substantially middle portion of the recliner operating lever 123. The end portion 123c opposite the operating lever 123b is passed through the hole/boss 115 and engages with the center hole 103a of the seat back recliner 103.

In the passenger restricting system 10C, the controller 50 executes the steps shown in the flowchart of FIG. 34 in order to detect if the vehicle 1 is rolling over and to control the seat back tilt-back device 40C and the seat belt apparatus 30 based on the results of the rollover detection. The steps of the flowchart will now be explained. Control steps that are the same as in the previous embodiments are indicated with the same step numbers as in the respective flowcharts and explanations thereof are omitted for the sake of brevity.

In the vehicle rollover passenger restricting system 10C of this embodiment, the main shaft 100 is used only as a center axis about which the reclining device 60 tilts the seat back 3. Consequently, the solenoid 104 used in the first to third embodiments is omitted. Since it is not necessary to lock the seat back recliner 103 to the seat back frame 3a, steps S18 and S25 of the flowcharts executed in the previous embodiments are also unnecessary.

After step S23A, in which the operating member 221a of the solenoid 221 is retracted and the movable roller 220 is returned to its original state as shown in FIG. 32, the controller 50 proceeds to step S24B and stops the operation of the electric retractor 36 such that the rotary part 36a can turn freely. As a result, the spring load of the tension springs 225 causes the seat back 3 to pivot forward toward an upright position until it returns to the state in which it existed before the rollover condition was detected.

In this embodiment, too, a map is used to determine if a rollover condition exists. An explanation of the map is omitted here because the map is the same as the map shown in FIG. 11 of the first embodiment.

Similarly to the first embodiment, the vehicle rollover passenger restricting system 10C of this embodiment is configured such that when a rollover condition is detected, the passenger C can be tilted back by a prescribed amount along with the seat back 3 while being restrained in the seat 2. Consequently, the head Ch of the passenger C can be moved rearward about the main shaft 100 of the seat back 3 when the seat back 3 is tilted back. As a result, the space between the passenger's head Ch and the ceiling of the passenger compartment can be enlarged and contact of the passenger's head Ch against the ceiling can be suppressed in an effective manner.

Similarly to the third embodiment, a coordinating device 200B is provided between the electric retractor 36 and the seat back tilt-back device 40C and serves to coordinate the restraining of the passenger C and the tilting back of the seat back 3 such that they occur at the same time. Thus, when a rollover condition occurs, the seat back 3 can be tilted back while the passenger C is being restrained to the seat 2 by the seat belt apparatus 30.

The coordinating device 200B includes mainly a movable roller 220 and a solenoid 221. The movable roller 220 is arranged and configured such that a lower portion of the seat belt webbing 37 extending vertically along the back side of the seat back 3 passes there-over and can be moved frontward and rearward thereby. The movable roller 220 also directs the seat belt webbing 37 toward the electric retractor 36 arranged toward the front of the seat cushion 4. The solenoid 221 serves as a moving device that is configured and arranged to move the movable roller 220 toward the front of the vehicle when a rollover condition occurs. When a rollover condition occurs and the movable roller 220 is moved forward, the retracting force of the seat belt webbing 37 is converted into a force that causes the seat back 3 to tilt back. As a result, the retracting force exerted by the electric retractor 36 can be reliably employed to tilt the seat back 3 rearward.

Figure 35:
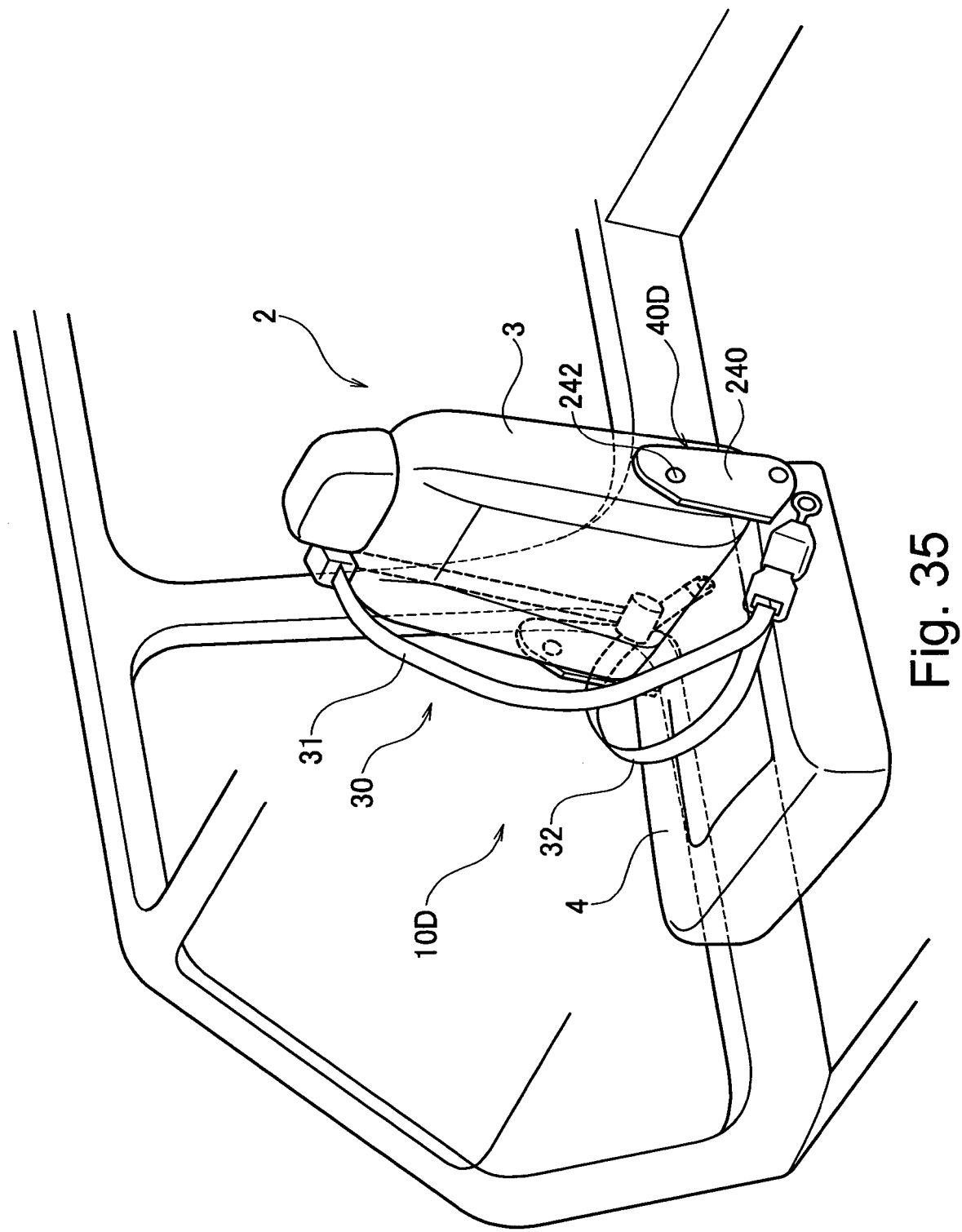
FIG. 35 is a perspective view of a passenger seat in which the passenger restricting system is equipped in accordance with a fifth embodiment of the present invention, with the seat shown during normal driving conditions.
Figure 36:
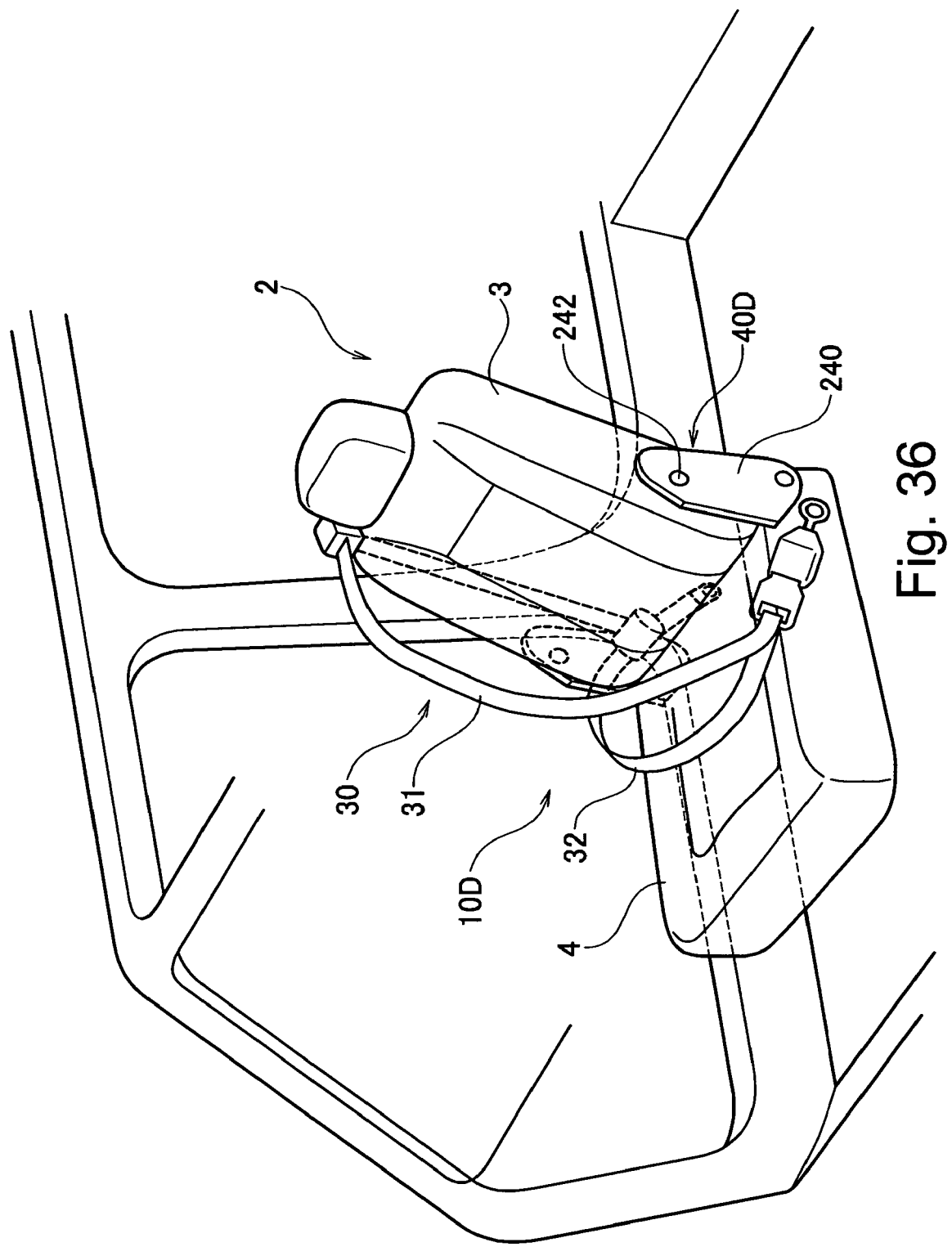
FIG. 36 is a perspective view of a passenger seat when a rollover condition is detected in accordance with the fifth embodiment of the present invention.
Figure 37:
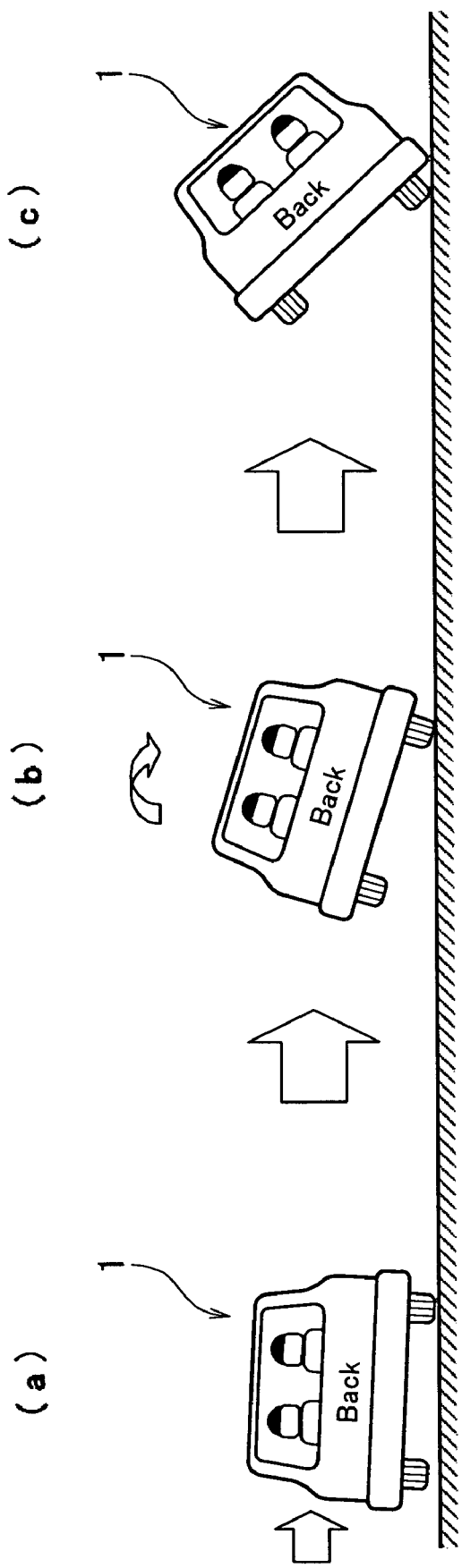
FIG. 37 is a series of rear views or diagrams (a) to (c) illustrating successive states that the vehicle assumes during a rollover condition.
Figure 38:
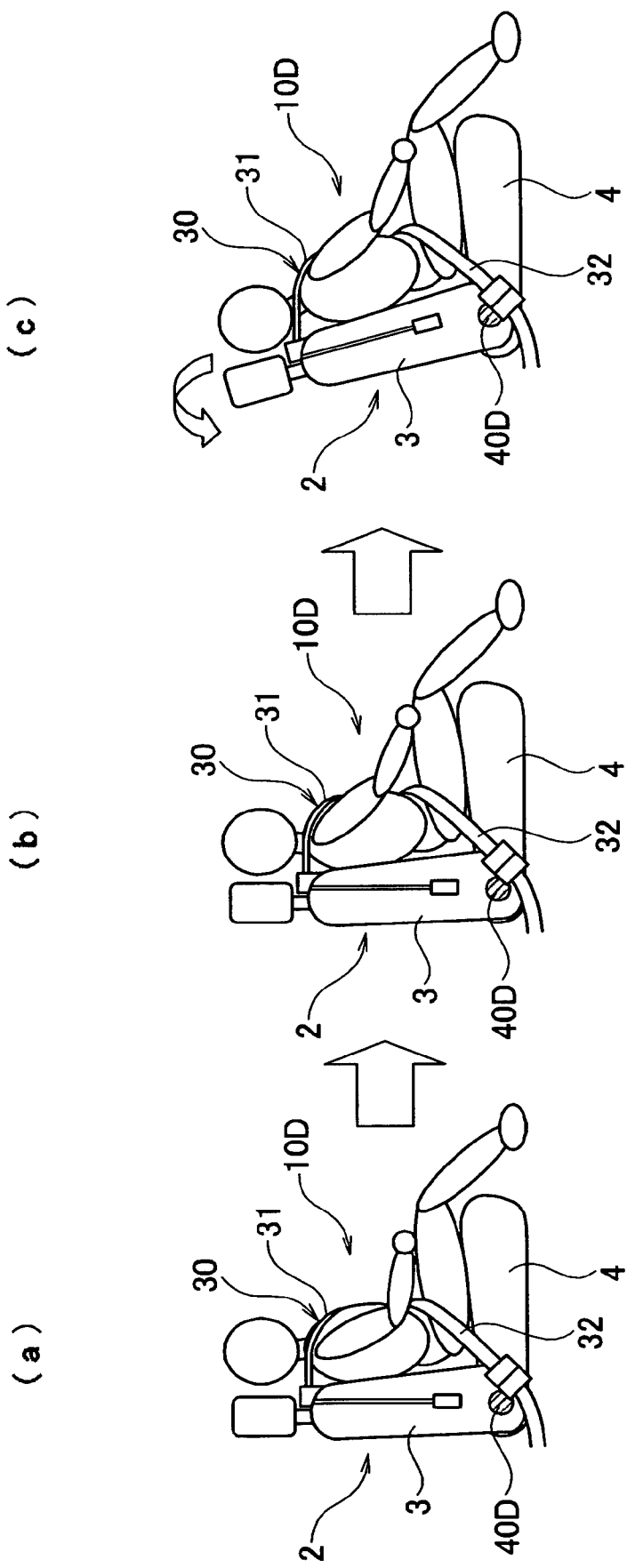
FIG. 38 is a series of side views or diagrams (a) to (c) of the seat illustrating successive operating states of the passenger restricting system during a rollover condition in accordance with the fifth embodiment of the present invention.

FIGS. 35 to 43 show a fifth embodiment of the present invention. Parts that are the same as the parts of the previously explained embodiments are indicated with the same reference numerals and explanations thereof are omitted for the sake of brevity. FIG. 35 is a perspective view of a seat in which the passenger restricting system is employed during normal driving conditions. FIG. 36 is a perspective view of the seat when a vehicle rollover condition is detected. FIG. 37 is a series of rear views or diagrams (a) to (c) illustrating successive states that the vehicle assumes during a rollover condition. FIG. 38 is a series of side views or diagrams (a) to (c) of the seat illustrating successive operating states of the passenger restricting system during a rollover condition.

Figure 39:
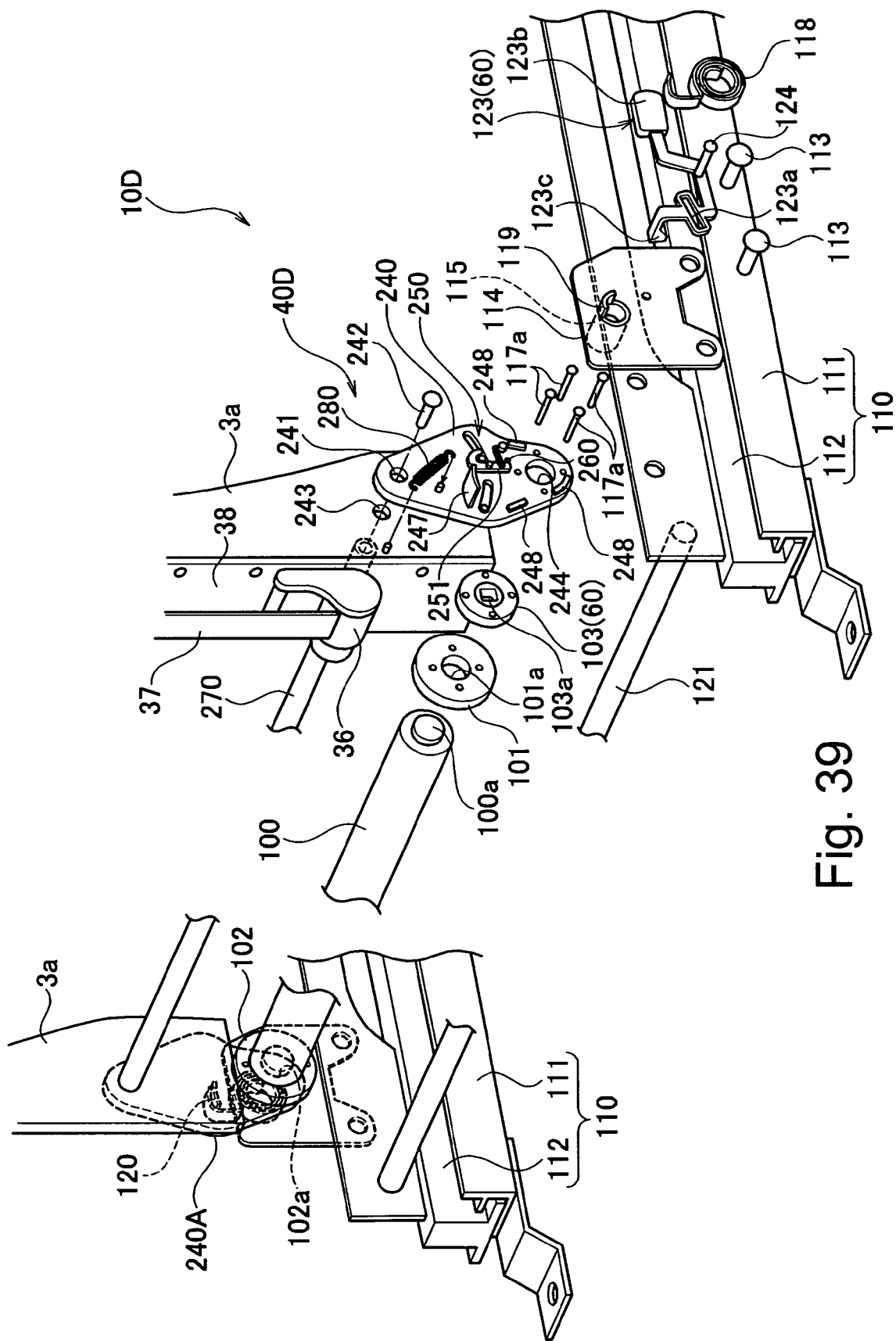
FIG. 39 is an exploded perspective view of selected details of the internal structure of a lower portion of the seat back in accordance with the fifth embodiment of the present invention.
Figure 41B:
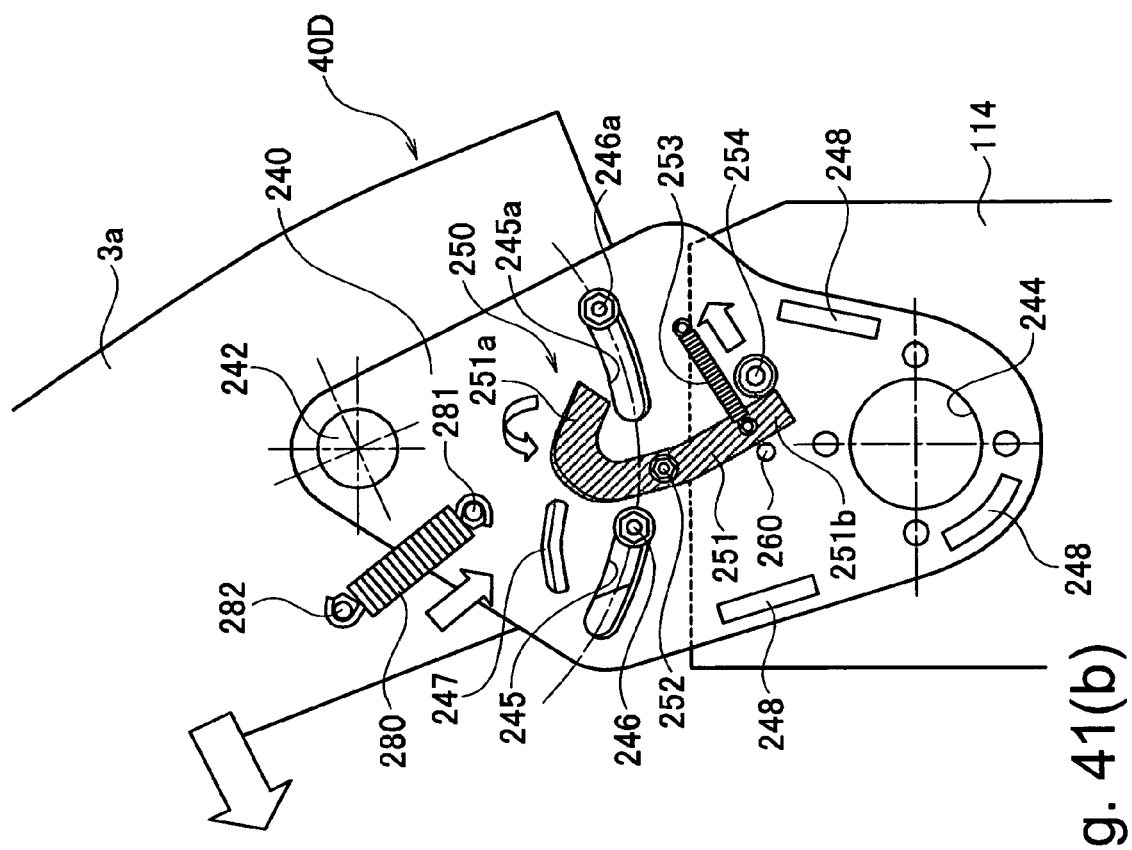
FIG. 41(b) is an enlarged side view of the main components of a seat back tilt-back device in accordance with the fifth embodiment of the present invention, with the seat back tilt-back device shown in a released state.
Figure 41A:
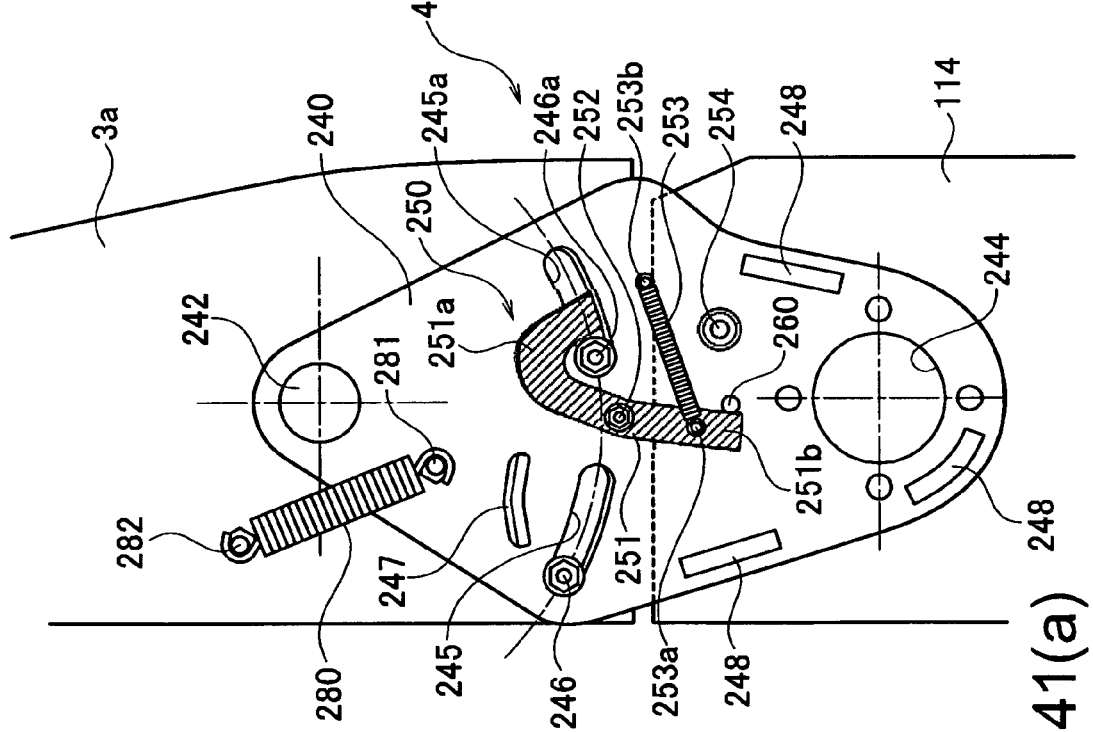
FIG. 41(a) is a enlarged side view of the main components of a seat back tilt-back device in accordance with the fifth embodiment of the present invention, with the seat back tilt-back device shown in a locked state.
Figure 42A:
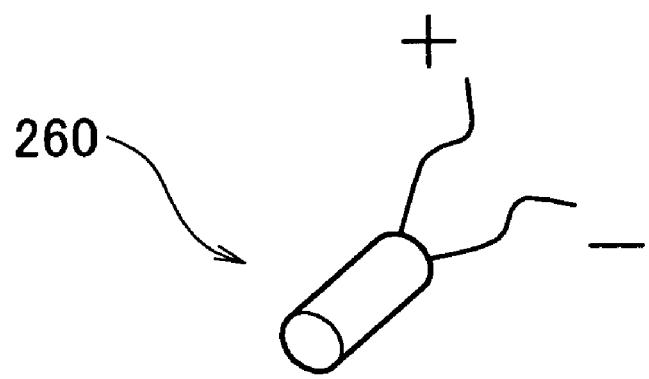
FIG. 42(a) is an enlarged perspective view of a lock releasing mechanism in accordance with the fifth embodiment of the present invention, with the lock releasing mechanism shown in a locked state.
Figure 42B:
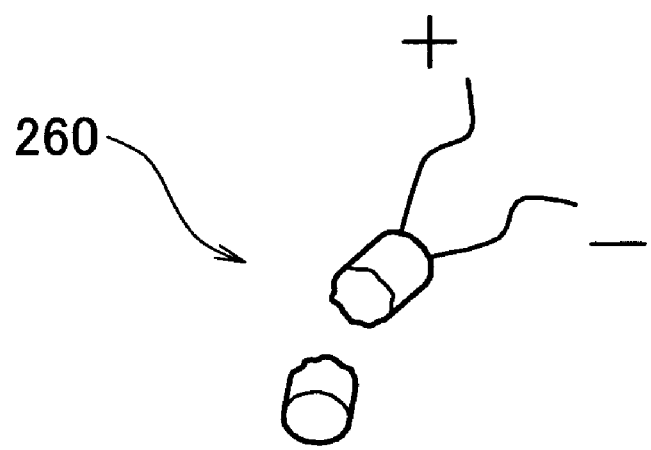
FIG. 42(b) is an enlarged perspective view of a lock releasing mechanism in accordance with the fifth embodiment of the present invention, with the lock releasing mechanism shown in a released state.
Figure 43:
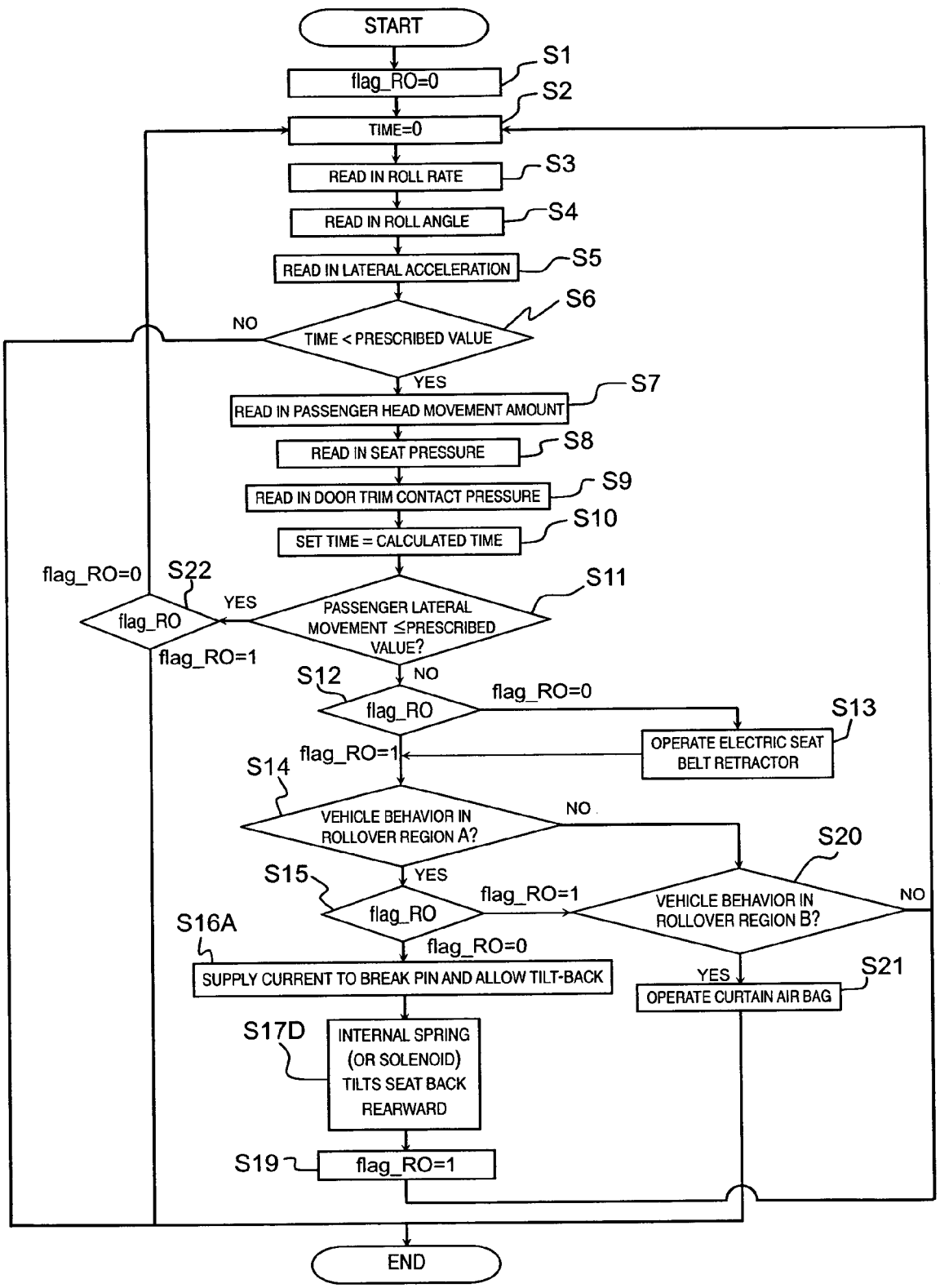
FIG. 43 is a flowchart showing the control operations executed by the controller in order to control the passenger restricting system in accordance with the fifth embodiment of the present invention.

FIG. 39 is an exploded perspective view showing the internal structure of a lower portion of the seat back in detail. FIG. 40 is an assembled perspective view showing the internal structure of the lower portion of the seat back in detail. FIGS. 41(a) and 41(b) are enlarged side views showing the main components of the seat back tilt-back device in a locked state and a released state, respectively. FIGS. 42(a) and 42(b) are enlarged perspective views showing the lock releasing mechanism in a locked state and a released state, respectively. FIG. 43 is a flowchart showing the control operations executed in order to control the passenger restricting system.

The vehicle rollover passenger restricting system 10D of this embodiment is basically the same as the passenger restricting system 10 of the first embodiment. More specifically, similarly to the passenger restricting system 10, the passenger restricting system 10D is provided with the vehicle rollover detector 20, the seat belt apparatus 30 serving as a passenger restraining device, a seat back tilt-back device 40D, and the controller 50. The vehicle rollover detector 20 and the controller 50 have the same constituent features as in the first embodiment. As shown in FIGS. 35 and 36, the seat belt apparatus 30 includes the shoulder belt 31 and the lap belt 32 to form a three-point seat belt structure as in the first embodiment.

In this embodiment, the seat back tilt-back device 40D is configured to support a lower portion of the seat back 3 on support pins 242 serving as rotational support parts such that the seat back 3 can be tilted back. The seat back tilt-back device 40D also includes a seat back plate 240, a lock mechanism 250, a breakable pin 260, and a spring 280. The seat back plate 240 is coupled to the reclining device 60, a lock mechanism 250 configured to prohibit relative rotation between the seat back plate 240 and the seat back 3. The breakable pin 260 serves as a lock releasing mechanism that is configured to release the locked state of the lock mechanism 250 when a rollover condition is detected by the vehicle rollover detector 20. The spring 280 serves as a tilt-back force applying device that is configured and arranged to apply a tilt-back force against the seat back 3 when the lock mechanism 250 is released.

When the vehicle 1 rolls over as shown in FIG. 37 of the first embodiment, the seat belt apparatus 30 and the seat back tilt-back device 40D operate as shown in diagrams (a) to (c) of FIG. 38, i.e., in the same manner as in the first embodiment, so as to lean the passenger C back by a prescribed amount, thereby widening the space between the passenger's head Ch and the ceiling of the vehicle.

In FIG. 37, diagram (a) illustrates the state of the vehicle body immediately before rollover, diagram (b) illustrates the state of the vehicle body when it has rotated a quarter turn, and diagram (c) illustrates the state of the vehicle body when it has rotated one half of a turn. Diagram (a) of FIG. 38 corresponds to diagram (a) of FIG. 37 and shows a passenger C seated during normal driving conditions with the seat belt apparatus 30 fastened. Diagram (b) of FIG. 38 corresponds to diagram (b) of FIG. 37 and shows the state of the passenger restricting system 10D immediately after a rollover condition has been detected. The electric retractor 36 retracts the seat belt webbing 37 such that the shoulder belt 31 is drawn in and securely restrains the passenger C to the seat back 3. Diagram (c) of FIG. 38 corresponds to diagram (c) of FIG. 37 and shows the state of the passenger restricting system 10D after the vehicle has progressed further into the rollover condition. The seat back 3 has been tilted back by a prescribed amount.

In this embodiment, the electric retractor 36 is configured such that it can rotate in both a forward and a reverse direction and, thus, the seat belt apparatus 30 is provided with a reversible function whereby it can return to the state in which it existed before a rollover condition was detected.

FIGS. 39 to 40 show the structure of the lower portion of the seat 2 in more detail. The lower end portions of the seat back frame 3a are pivotally mounted to the sliders 112 of the seat sliders 110 by using seat back plates 240 and 240A and plates 114. The seat back plates 240 and 240A are arranged on both sides of the seat 2 so as to be separated from each other along the widthwise direction of the vehicle and each of the plates 114 is arranged corresponding to the seat back plate 240 or 240A, respectively.

A tilt center shaft 270 is arranged between portions of the seat back frame 3a on both sides of the seat back 3 so as to span along the widthwise direction of the vehicle.

The seat back plates 240 and 240A are plate-like members shaped generally like a diamond oriented in the vertical direction. Two support pins 242 (one on each side) are inserted through upper mounting holes 241 provided in upper portions of the seat back plates 240 and 240A and passed through mounting holes 243 provided in the respective sides of the seat back frame 3a. The support pins 242 are installed into threaded holes provided in the ends of the tilt center shaft 270. As a result, the seat back frame 3a can rotate (pivot) relative to the seat back plates 240 and 240A about the support pins 242.

A lower mounting hole 244 is provided in a lower portion of each of the seat back plates 240 and 240A. The boss of the hole 115 provided in one of the plates 114 connected to the slider 112 is fitted in a freely rotatable manner into the lower mounting hole of the seat back plate 240 and the boss 115a (see FIG. 9) of the other plate 114 is fitted in a freely rotatable manner into the lower mounting hole of the seat back plate 240A.

The seat back plate 240 is arranged on the side of the seat 2 located more toward the inside of the vehicle (right side in FIG. 39). The seat back plate 240 is provided with a pair of arc-shaped openings 245 and 245a, as shown in FIGS. 41(a) and 41(b). The arc-shaped openings 245 and 245a are arranged on both sides of (i.e., in rear of and in front of) a vertical center portion of the seat back plate 240 and configured such that the center of curvature thereof is located at the support pin 242. Protruding guide pins 246 and 246a provided on the seat back frame 3a fit into the arc-shaped openings 245 and 245a, respectively, such that they can move freely relative thereto.

The spring 280 is installed in a tensioned state between the seat back plate 240 and the seat back frame 3a. One end of the spring 280 is hooked onto a holding pin 281 protruding from the seat back plate 240 in a position lower than the support pin 242 and the other end is hooked onto a holding pin 282 protruding from a rearward side portion of the seat back frame 3a in a position higher than the holding pin 281. The spring force of the spring 280 acts to tilt the seat back frame 3a, i.e., the seat back 3, rearward relative to the seat back plate 240 with the support pin 242 acting as the rotational axis.

The lock mechanism 250 is provided in a middle section of the seat back plate 240, and has a hook member 251 comprising a hook section 251a and an arm section 251b. The hook section 251a is generally shaped like an upside down letter U and constitutes an upper end portion of the hook member 251. The arm section 251b is configured to extend downward from a rearward part of the hook section 251a. The hook member 251 is attached to the seat back plate 240 in a freely rotatable manner by using a center pin 252 installed through a middle portion of the arm section 251b.

A spring 253 is arranged in a tensioned state with one end hooked to a pin 253a protruding from a lower end portion of the arm section 251b and the other end hooked to a pin 253b protruding from a frontward portion of the seat back plate 240. The spring 253 applies a spring force in such a direction as to cause the hook member 251 to rotate about the center pin 252 in the direction corresponding to the counterclockwise direction in the figure.

In the locked state shown in FIG. 41(a), the hook section 251a of the hook member 251 is engaged with the guide pin 246a and the lower end portion of the arm section 251b is stopped against the breakable pin 260.

The breakable pin 260 is cylindrical and has an electrical resistor installed inside as shown in FIG. 42(a). When a rollover condition is detected, the controller (see FIG. 1) applies a current to the resistor and causes the resistor to heat up. When the resistor heats up, the pin 260 breaks as shown in FIG. 42(b) and the stopped state of the arm section 251b of the hook member 251 is released.

When the stopped state of the arm section 251b of the hook member 251 is released by the breakage of the breakable pin 260, the hook member 251 is rotated in the counterclockwise direction about the center pin 252 due to the spring force of the spring 253 and the hook section 251a is disengaged from the guide pin 246a.

As a result, the seat back frame 3a is tilted rearward about the support pin 242 by the spring force of the spring 280 until the guide pins 246 and 246a touch against the frontward ends of the arc-shaped openings 245 and 245a. The hook member 251 stops turning when the arm section 251b touches against a stopper pin 254.

In this embodiment, too, the seat back recliner 103 and the shaft guide 101 are arranged on the inward side of the seat back plate 240 that is located more toward the inside of the vehicle relative to the widthwise direction of the vehicle (right-hand side in FIG. 39), the shaft guide 101 being located farther inward toward the seat than the seat back recliner 103. Similarly, the shaft guide 102 is arranged on the inward side of the seat back plate 240 that is located more toward the outside of the vehicle (left side in FIG. 39). The ends of the main shaft 100 are provided with smaller diameter support portions 100a and 100b that fit into center holes 101a and 102a of the shaft guides 101 and 102, respectively, and support the shaft guides 101 and 102 in a freely rotatable manner.

The seat back recliner 103 and the shaft guide 101 are coupled to the seat back plate 240 with the pins 117a, and the shaft guide 102 is coupled to the other seat back plate 240A with the pins 117a.

Similarly to the previous embodiments, one spiral spring 118 is arranged between the seat back frame 3a and the inside plate 114 and another spiral spring 118 is arranged between the seat back frame 3a and outside plate 114. The spiral springs 118 serve to torsionally spring load the seat back plates 240 and 240A in the return direction. The radially inward end of the one spiral spring 118 engages with an engaging protrusion 119 provided on the periphery the hole 115 and the radially inward end of the other spiral spring 118 engages with an engaging protrusion 120 provided on opposite side face of the outside plate 114 as the boss 115a. The radially outward ends of the spiral springs 118 engage with engaging protrusions 247 provided so as to protrude from respective side faces of the seat back plates 240 and 240A.

Similarly to the other embodiments, the recliner operating lever 123 is provided on the outward side of the plate 114 on the side of the seat 2 where the seat back recliner 103 is provided. The seat back recliner 103 and the recliner operating lever 123 constitute a reclining device 60 that enables the reclining position of the seat back 3 to be adjusted as desired.

The recliner operating lever 123 is mounted to the plate 114 with the pin 124 passed through an elongated hole 123a provided in a substantially middle portion of the recliner operating lever 123. The end portion 123c opposite an operating part 123b is passed through the hole/boss 115 and engages with the center hole 103a of the seat back recliner 103. Buffer members 248 also serving as spacers are provided on the seat back plate 240 to prevent surface contact and generally soften the contact between the seat back plate 240 and the plate 114.

In the passenger restricting system 10D of this embodiment, too, the controller 50 executes the steps shown in the flowchart of FIG. 43 in order to detect if the vehicle 1 is rolling over and to control the seat back tilt-back device 40D and the seat belt apparatus 30 based on the results of the rollover detection. The steps of the flowchart will now be explained. Control steps that are the same as in the previous embodiments are indicated with the same step numbers as in the respective flowcharts and explanations thereof are omitted for the sake of brevity.

Meanwhile, similarly to the fourth embodiment, the main shaft 100 is used only as a center axis about which the reclining device 60 tilts the seat back 3. Consequently, steps S18 and S25 of the flowcharts executed in the first to third embodiments are not necessary. Additionally, since a mechanism for returning the tilted seat back 3 to an upright position is not provided, steps S23 (S23A) and S24 (S24A, S24B) of the flowcharts executed in the first to fourth embodiments are also not necessary.

In step S16A, the controller 50 delivers a current to the breakable pin 260 to release the locked state of the lock mechanism 250. In step S17D, the lock mechanism 250 is released by the breakage of the breakable pin 260 and the seat back 3 is tilted rearward by a prescribed amount due to the spring force of the spring 280.

In this embodiment, too, a map is used to determine if a rollover condition exists. An explanation of the map is omitted here because the map is the same as the map shown in FIG. 11 of the first embodiment.

Similarly to the first embodiment, the vehicle rollover passenger restricting system 10D of this embodiment is configured such that when a rollover condition is detected, the passenger C can be tilted back by a prescribed amount along with the seat back 3 while being restrained in the seat 2. Consequently, the head Ch of the passenger C can be moved rearward about the main shaft 100 of the seat back 3 when the seat back 3 is tilted back. As a result, the space between the passenger's head Ch and the ceiling of the passenger compartment can be enlarged and contact of the passenger's head Ch against the ceiling can be suppressed in an effective manner.

In this embodiment, the seat back tilt-back device 40D is configured to support a lower portion of the seat back 3 on support pins 242 such that the seat back 3 can be tilted back. The seat back tilt-back device 40D also includes a seat back plate 240, a lock mechanism 250, a breakable pin 260 and a spring 280. The seat back plate 240 is coupled to the reclining device 60. The lock mechanism 250 is configured to prohibit relative rotation between the seat back plate 240 and the seat back 3. The breakable pin 260 is configured to release the locked state of the lock mechanism 250 when a rollover condition is detected by the vehicle rollover detector 20. The spring 280 serves as a tilt-back force applying device that is configured and arranged to apply a tilt-back force against the seat back 3 when the lock mechanism 250 is released. The breakable pin 260 can be broken reliably by sending a current thereto. As a result, when a rollover condition occurs, the lock mechanism 250 can be unlocked in a reliable manner and the seat back 3 can be tilted back quickly.

Additionally, with this embodiment, the inclusion of the seat back plates 240 and 240A on both sides makes it possible to operate the seat back tilt-back device 40D and the reclining device 60 independently of each other. Since the seat back 3 can be tilted back with the spring 280, the tilting back of the seat back 3 can be accomplished with a simple structure when a rollover condition occurs.

FIGS. 44(a) and 44(b) show a variation of the fifth embodiment. FIGS. 44(a) and 44(b) are enlarged side views showing the main components of the seat back tilt-back device in a locked state and a released state, respectively.

The fifth embodiment illustrates a case in which a spring 280 is used as the tilt-back force applying device of the seat back tilt-back device 40D. However, the invention is not limited to such a tilt-back force applying device and any other structure is acceptable so long as it can apply a tilt-back force to the seat back 3 when the lock mechanism 250 is released. For example, a solenoid 283 can be used as shown in FIGS. 44(a) and 44(b). This variation illustrates a case in which a solenoid 283 is used.

The solenoid 283 is provided on an upper portion of the seat back plate 240. A wire 284 is connected to the part of the solenoid 283 that is extended and retracted when the electric current supply to the solenoid 283 is turned on and off. An intermediate portion of the wire 284 is guided by a pin 285 protruding from the seat back plate 240 and an end portion of the wire 284 is coupled to a holding pin 286 protruding from the seat back frame 3a.

When the lock mechanism 250 is in the locked state shown in FIG. 44(a), the solenoid 283 is kept in such a state that the wire 284 is extended from the solenoid 283. When a rollover condition is detected, the lock mechanism 250 is released and, simultaneously, the solenoid 283 is operated such that the wire 284 is retracted. As a result, as shown in FIG. 44(b), the wire 284 pulls the holding pin 286 in a generally downward direction and, thereby, causes the seat back frame 3a to tilt rearward about the support pins 242.

Figure 45:
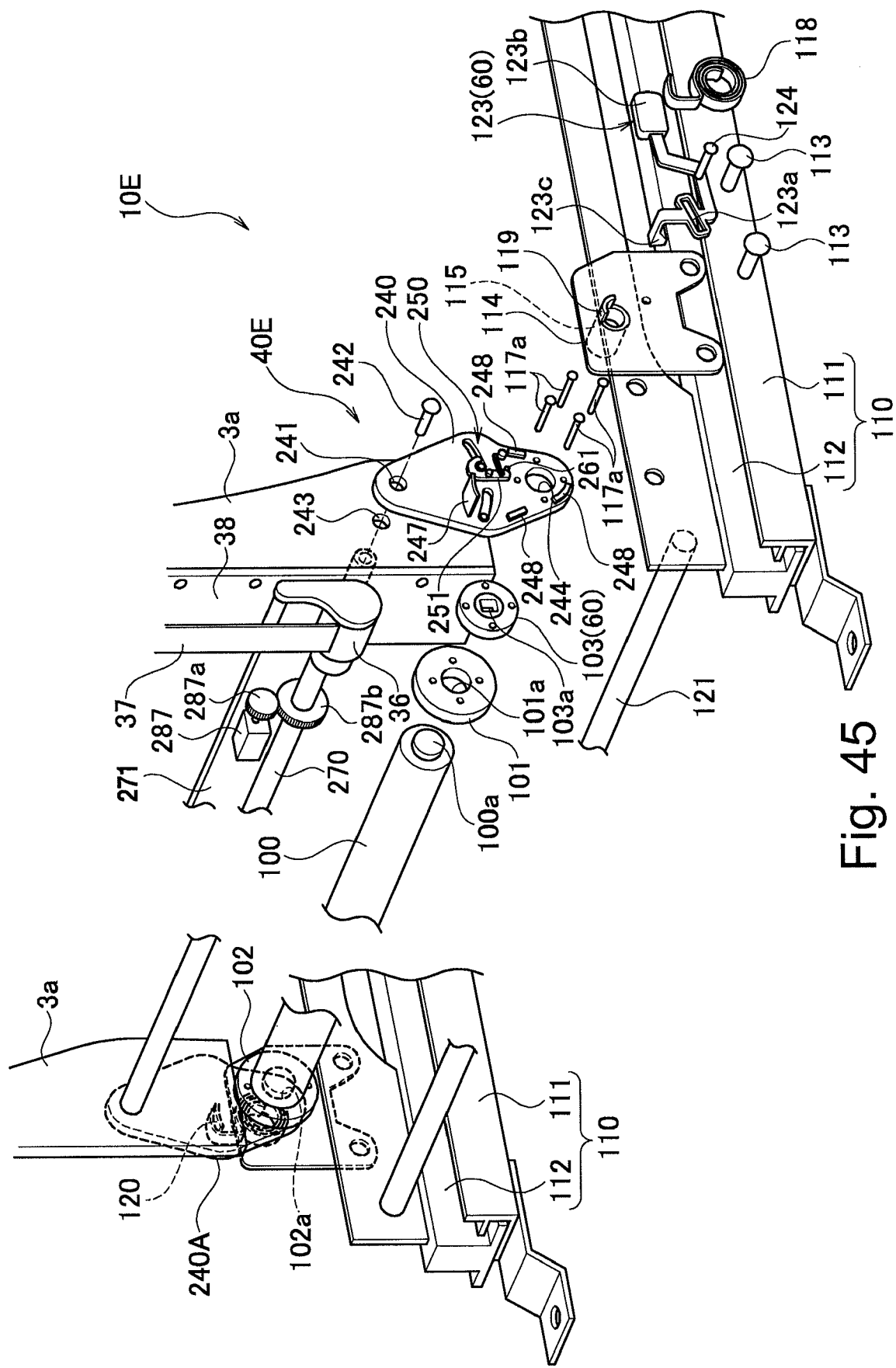
FIG. 45 is an exploded perspective view of selected details of the internal structure of a lower portion of the seat back in accordance with a sixth embodiment of the present invention.
Figure 47A:
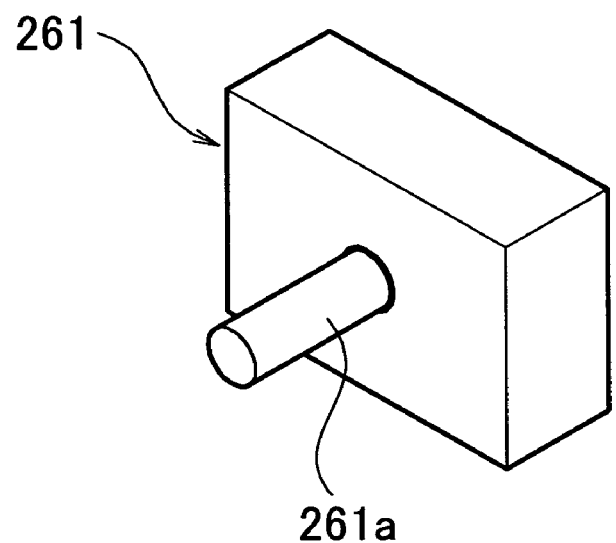
FIG. 47(a) is an enlarged perspective view of a lock releasing mechanism in accordance with the sixth embodiment of the present invention, with the lock releasing mechanism shown in a locked state.
Figure 47B:
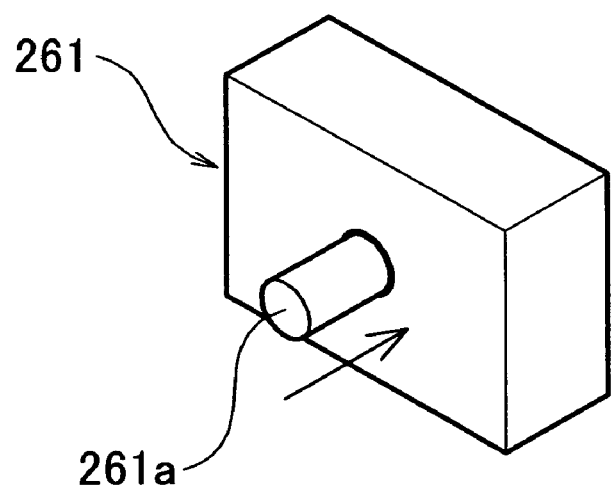
FIG. 47(b) is an enlarged perspective view of a lock releasing mechanism in accordance with the sixth embodiment of the present invention, with the lock releasing mechanism shown in a released state.
Figure 48:
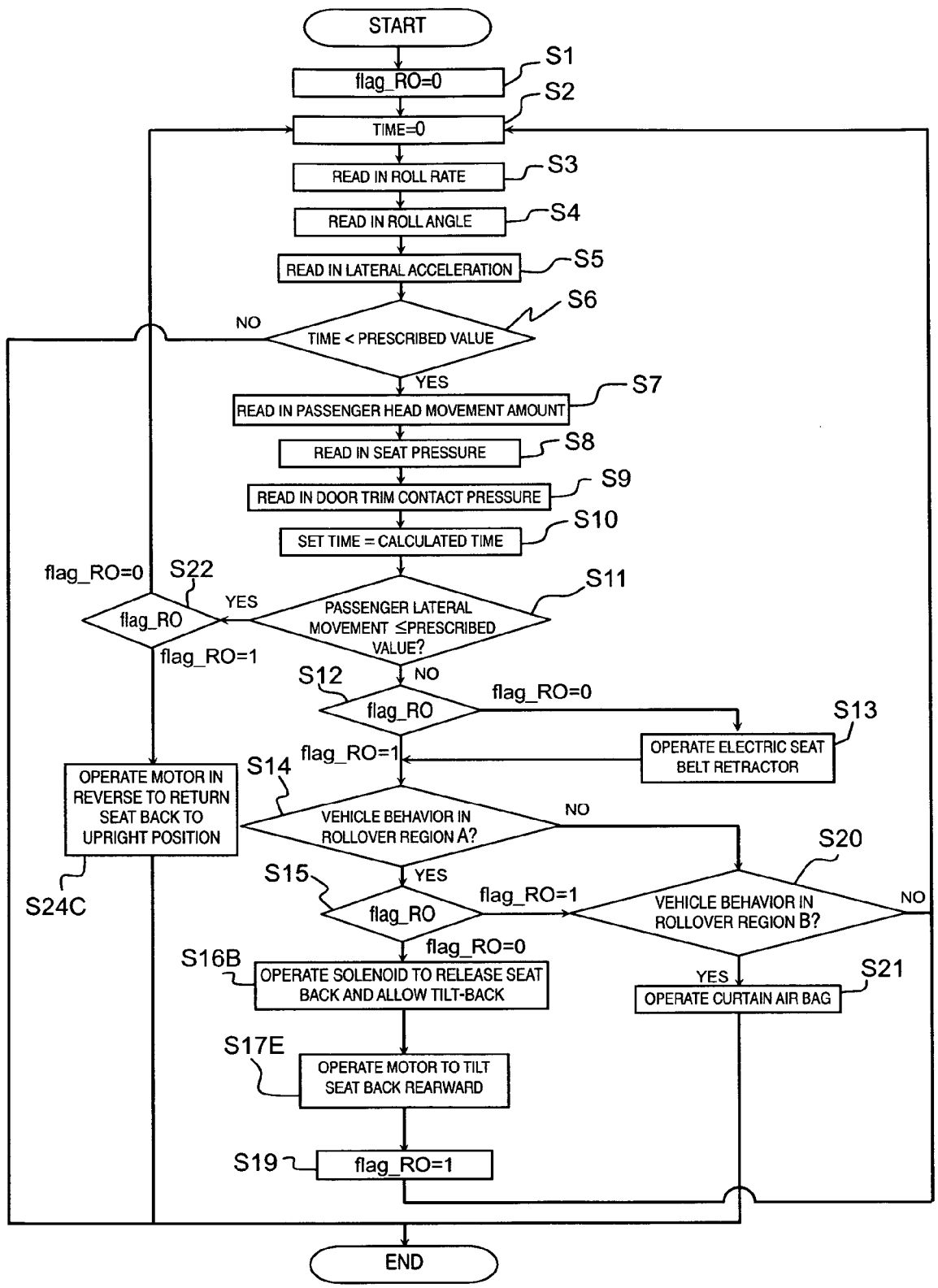
FIG. 48 is a flowchart showing the control operations executed by the controller in order to control the passenger restricting system in accordance with the sixth embodiment of the present invention.

FIGS. 45 to 48 show a sixth embodiment of the present invention. Parts that are the same as the parts of the previously explained embodiments are indicated with the same reference numerals and explanations thereof are omitted for the sake of brevity. FIG. 45 is an exploded perspective view showing the internal structure of a lower portion of the seat back in detail. FIGS. 46(a) and 46(b) are enlarged side views showing the main components of the seat back tilt-back device in a locked state and a released state, respectively. FIGS. 47(a) and 47(b) are enlarged perspective views showing the lock releasing mechanism in a locked state and a released state, respectively. FIG. 48 is a flowchart showing the control operations executed in order to control the passenger restricting system.

A vehicle rollover passenger restricting system 10E in accordance with this embodiment is basically the same as the passenger restricting system 10 of the first embodiment. More specifically, similarly to the passenger restricting system 10, the passenger restricting system 10E is provided with the vehicle rollover detector 20, the seat belt apparatus 30 serving as a passenger restraining device, a seat back tilt-back device 40E and the controller 50. As shown in FIGS. 45 and 46, the seat back tilt-back device 40E generally has the same constituent features as in the passenger restricting system 10D of the fifth embodiment. In particular, both seat back tilt-back device 40D and 40E have a pair of seat back plates 240 and 240A and a lock mechanism 250 provided on one of the seat back plates 240. The seat back tilt-back device 40E of this embodiment is different in that it uses a solenoid 261 as the lock releasing mechanism and a motor 287 as the tilt-back force applying device.

Similarly to the fifth embodiment, the seat back plates 240 and 240A are arranged on both sides of the seat 2 so as to be separated from each other along the widthwise direction of the vehicle. The upper end portions of the seat back plates 240 and 240A are coupled to the respective sides of the seat back frame 3a with support pins 242 in such a fashion that the seat back frame 3a can rotate relative to the seat back plates 240. The lower portions of the seat back plates 240 and 240A are rotatably fitted onto the boss of the hole 115 of one plate 114 and the boss 115a of the other plate 114, respectively.

The lock mechanism 250 is provided in a central portion of the seat back plate 240 that is arranged more toward the inside of the vehicle along the widthwise direction of the vehicle (right-hand side in FIG. 45). A hook member 251 comprising a hook section 251a and an arm section 251b is attached to the seat back plate 240 with a center pin 252 such that it can rotate freely. The hook member 251 is spring loaded in the direction of counterclockwise rotation (counterclockwise from the perspective of FIG. 45).

In the locked state shown in FIG. 46(a), the hook section 251a of the hook member 251 is engaged with the guide pin 246a and the lower end portion of the arm section 251b is stopped against the operating pin 261a of the solenoid 261.

During normal conditions when a rollover condition is not detected, the solenoid 261 is in such a state that the operating pin 261a is extended as shown in FIG. 47(a). When a rollover condition is detected, the controller 50 (see FIG. 1) applies a current to the solenoid 261 and causes the operating pin 261a to retract as shown in FIG. 47(b). As a result, the stopped state of the arm section 251b of the hook member 251 is released.

Similarly to the breakable pin 260 in the fifth embodiment, when the stopped state of the arm section 251b of the hook member 251 is released by the retraction of the operating pin 261a of the solenoid 261, the hook member 251 is rotated in the counterclockwise direction about the center pin 252 due to the force of the spring 253 and the hook section 251a is disengaged from the guide pin 246a. Simultaneously with the operation of the solenoid 261, the motor 287 is driven such that the seat back frame 3a is tilted rearward about the support pins 242.

As shown in FIG. 45, the motor 287 is mounted to a stationary plate 271 that is connected between both sides of the seat back frame 3a. A gear 287a is mounted on the rotary shaft of the motor 287 and arranged to mesh with another gear 287b mounted on the tilt center shaft 270. When the motor 287 is driven, the gears 287a and 287b cause the tilt center shaft 270 to rotate. Since the ends of the tilt center shaft 270 are connected non-rotatably to the seat back frame 3a, the seat back frame 3a is tilted by the rotation of the tilt center shaft 270.

In the passenger restricting system 10E of this embodiment, too, the controller 50 executes the steps shown in the flowchart of FIG. 48 in order to detect if the vehicle 1 is rolling over and to control the seat back tilt-back device 40E and the seat belt apparatus 30 based on the results of the rollover detection. The steps of the flowchart will now be explained. Control steps that are the same as in the previous embodiments are indicated with the same step numbers as in the respective flowcharts and explanations thereof are omitted for the sake of brevity.

The control flowchart for the passenger restricting system 10E of this embodiment is basically the same as the control flowchart shown in FIG. 43 for the passenger restricting system 10D of the fifth embodiment. However, in this embodiment, the step S16A of FIG. 43 is replaced with a step S16B in which the solenoid 261 is operated in order to release the lock mechanism 250 and the step S17D of FIG. 43 is replaced with a step S17E in which the motor 287 is operated in order to tilt the seat back 3 rearward.

Additionally, in the flowchart of this embodiment, when it determines in step S11 that the lateral movement of the passenger C has not exceeded a prescribed value and determines in step S22 that the seat back 3 is already tilted back (flag=1), the controller 50 proceeds to step S24C and rotates the motor 287 in reverse so as to return the tilted seat back 3 to its original state.

In this embodiment, too, a map is used to determine if a rollover condition exists. An explanation of the map is omitted here because the map is the same as the map shown in FIG. 11 of the first embodiment.

Similarly to the first embodiment, the vehicle rollover passenger restricting system 10E of this embodiment is configured such that when a rollover condition is detected, the passenger C can be tilted back by a prescribed amount along with the seat back 3 while being restrained in the seat 2. Consequently, the head Ch of the passenger C can be moved rearward about the main shaft 100 of the seat back 3 when the seat back 3 is tilted back. As a result, the space between the passenger's head Ch and the ceiling of the passenger compartment can be enlarged and contact of the passenger's head Ch against the ceiling can be suppressed in an effective manner.

Since the seat back tilt-back device 40E of this embodiment uses the motor 287 as the tilt-back force applying device, the tilting of the seat back 3 can be accomplished in a reversible manner with a simple structure and the seat back 3 can be returned to its original state automatically after the cause of the seat back 3 being tilted back, i.e., the cause of the rollover condition being detected, has been eliminated.

Figure 49:
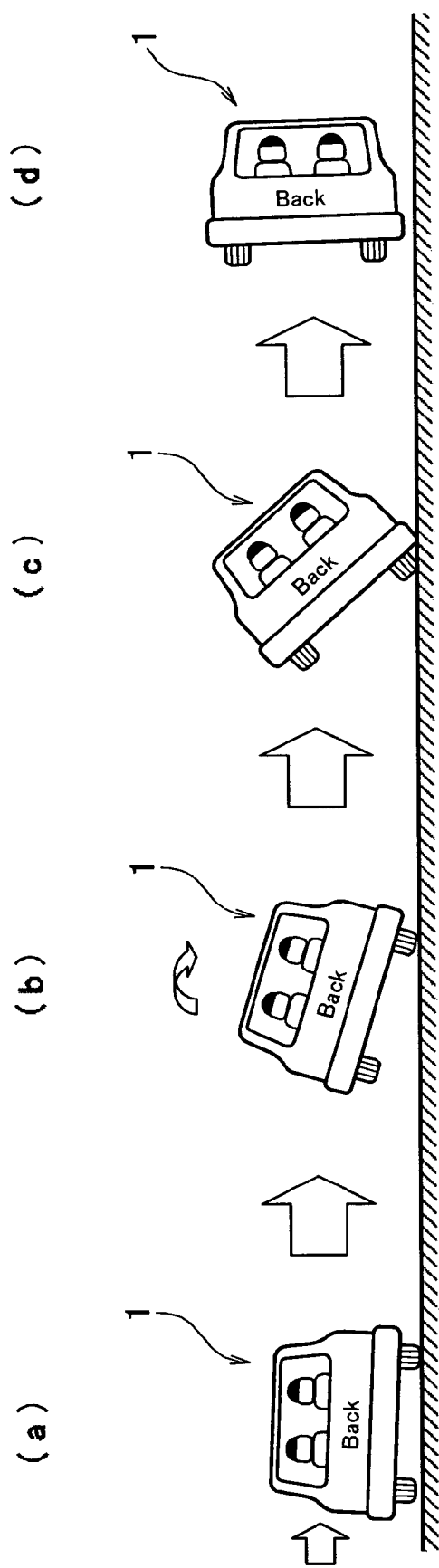
FIG. 49 is a series of rear views or diagrams (a) to (d) illustrating successive states that the vehicle assumes during a rollover condition in a seventh embodiment of the present invention.
Figure 50:
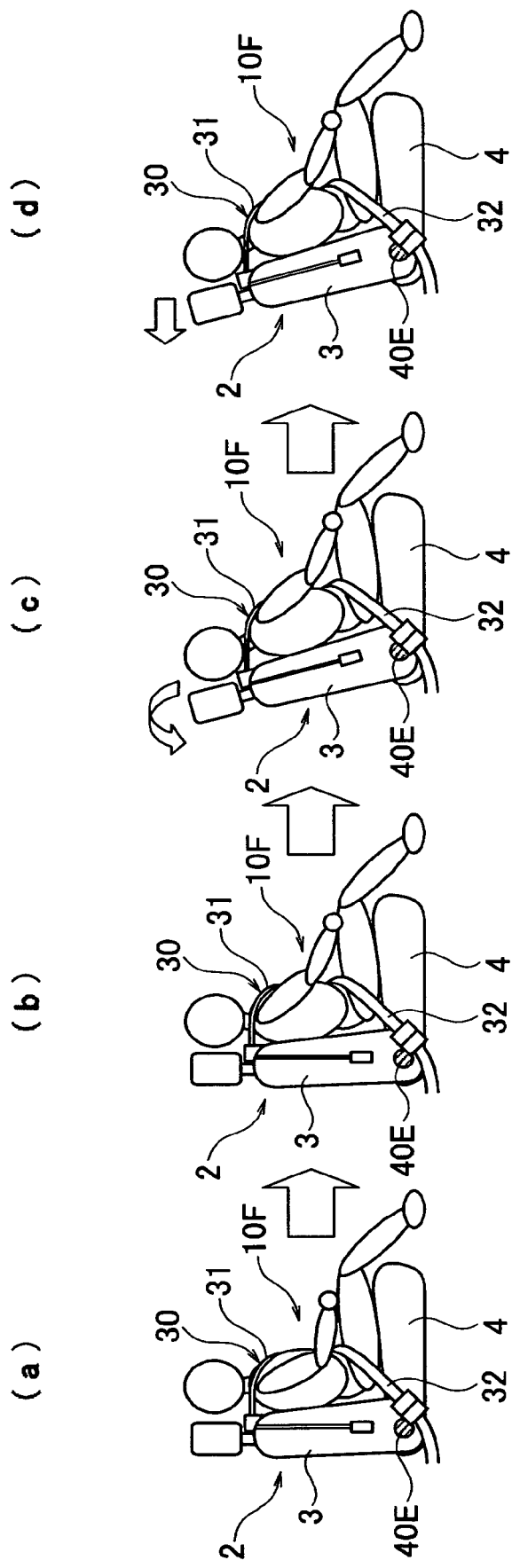
FIG. 50 is a series of side views or diagrams (a) to (d) of a seat illustrating successive operating states assumed by the passenger restricting system in accordance with the seventh embodiment of the present invention during a rollover condition.

FIGS. 49 to 57 show a seventh embodiment of the present invention. Parts that are the same as the parts of the previously explained embodiments are indicated with the same reference numerals and explanations thereof are omitted for the sake of brevity. FIG. 49 is a series of rear views or diagrams (a) to (d) illustrating successive states that the vehicle assumes during a rollover condition and FIG. 50 is a series of side views or diagrams (a) to (d) of the seat illustrating successive operating states of the passenger restricting system during a rollover condition.

Figure 51:
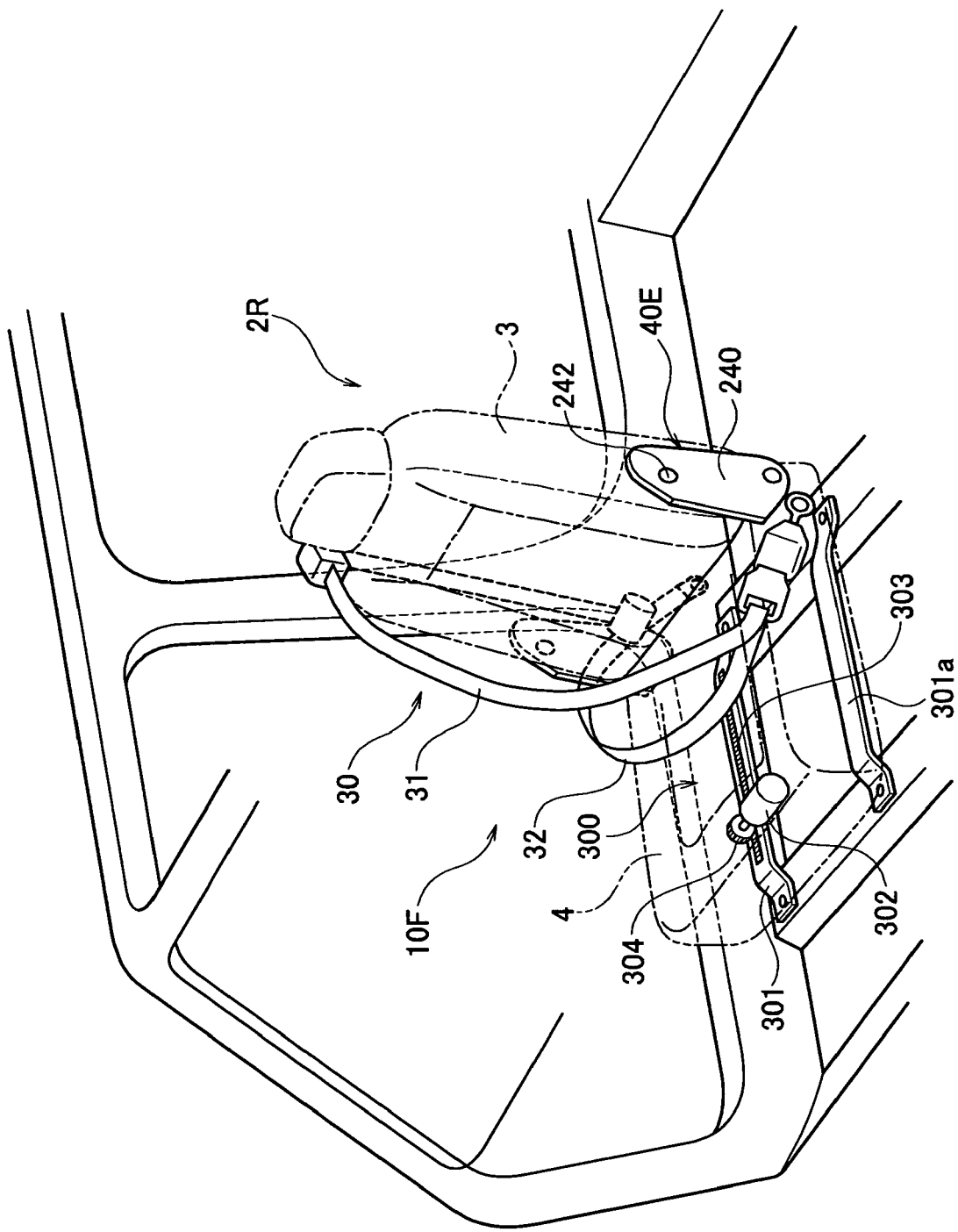
FIG. 51 is a perspective view of the right-hand seat during normal driving conditions in accordance with the seventh embodiment of the present invention.
Figure 52:
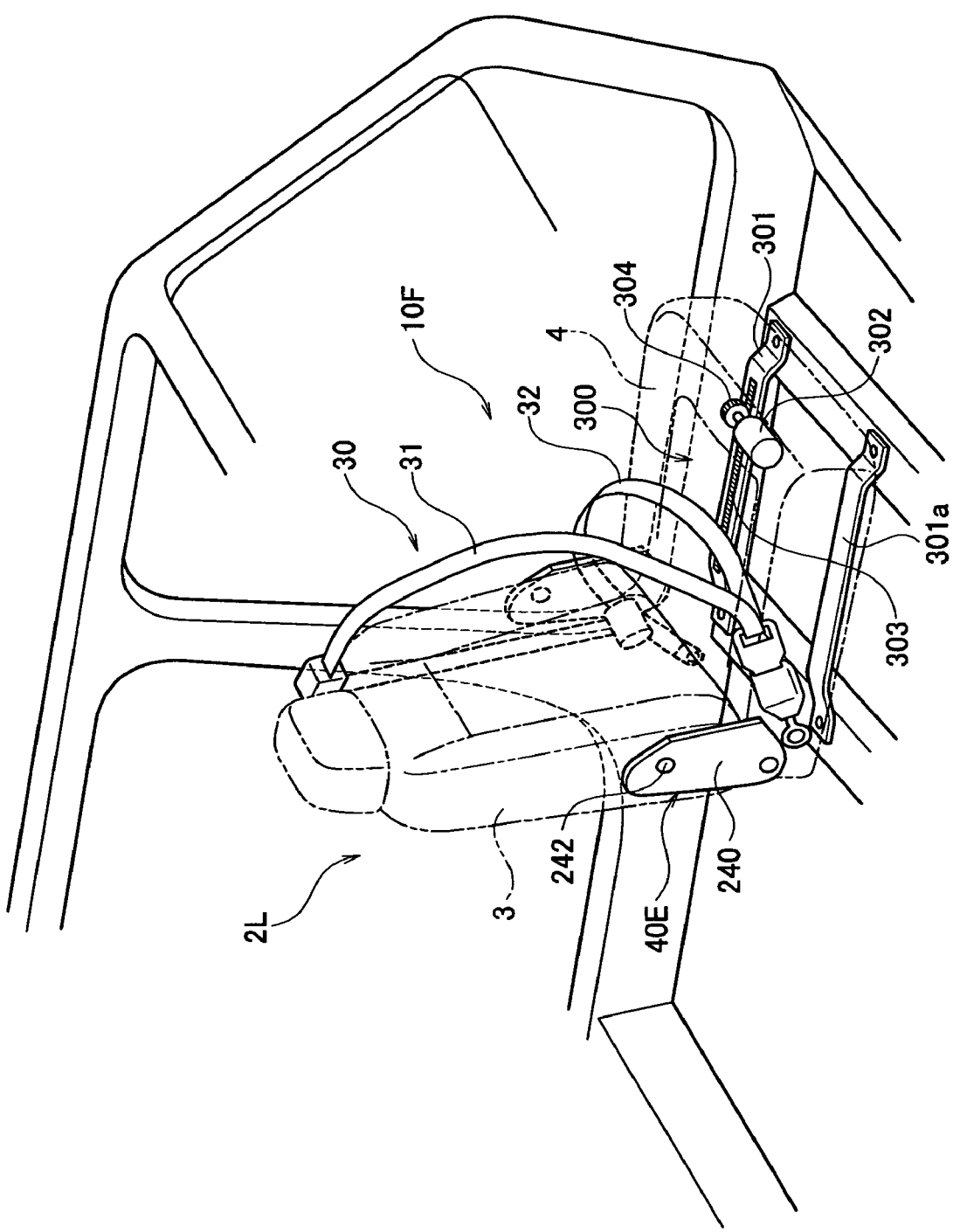
FIG. 52 is a perspective view of the left-hand seat during normal driving conditions in accordance with the seventh embodiment of the present invention.
Figure 53:
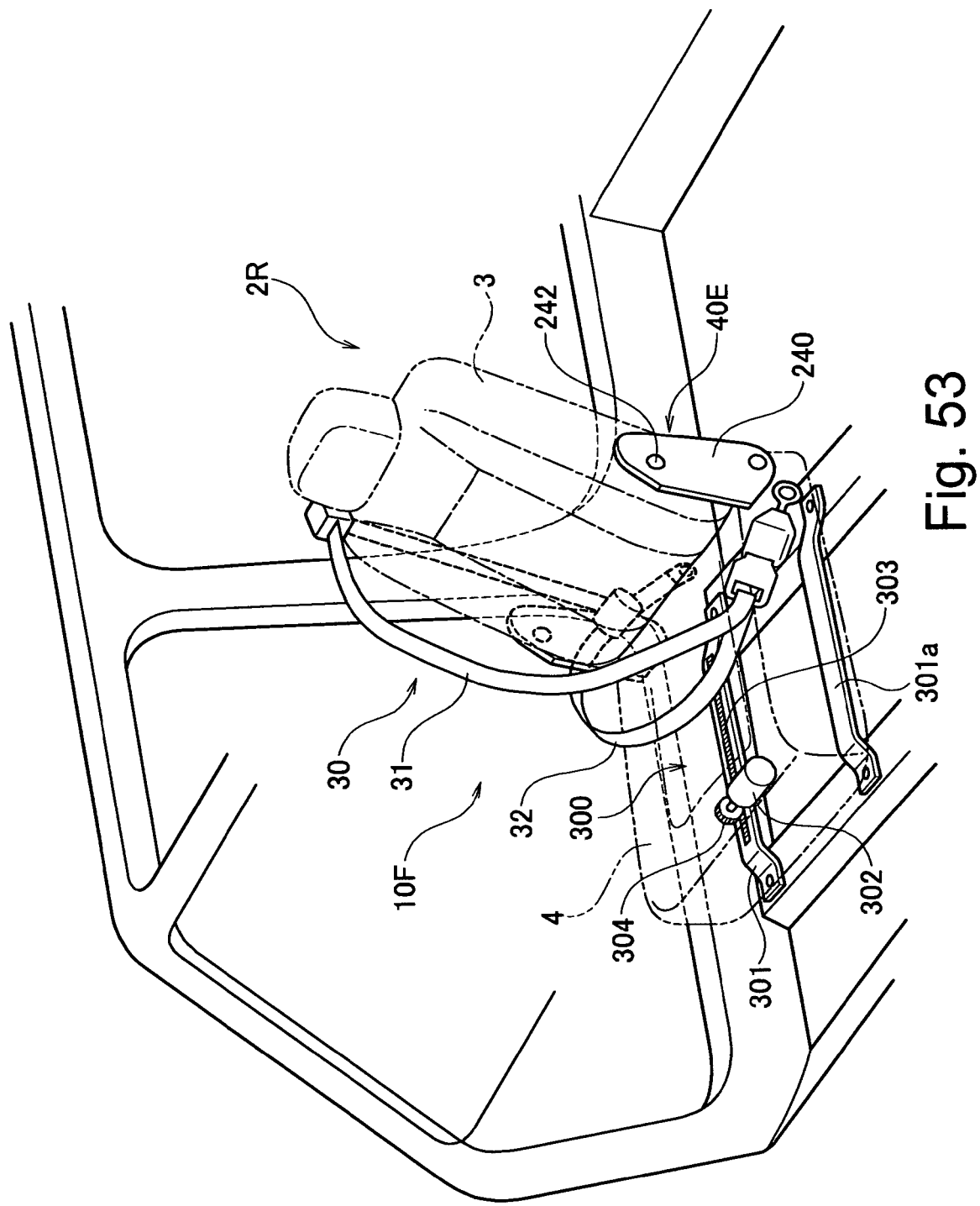
FIG. 53 is a perspective view of the right-hand seat with the seat back tilted back due to a rollover condition being detected in the seventh embodiment of the present invention.
Figure 54:
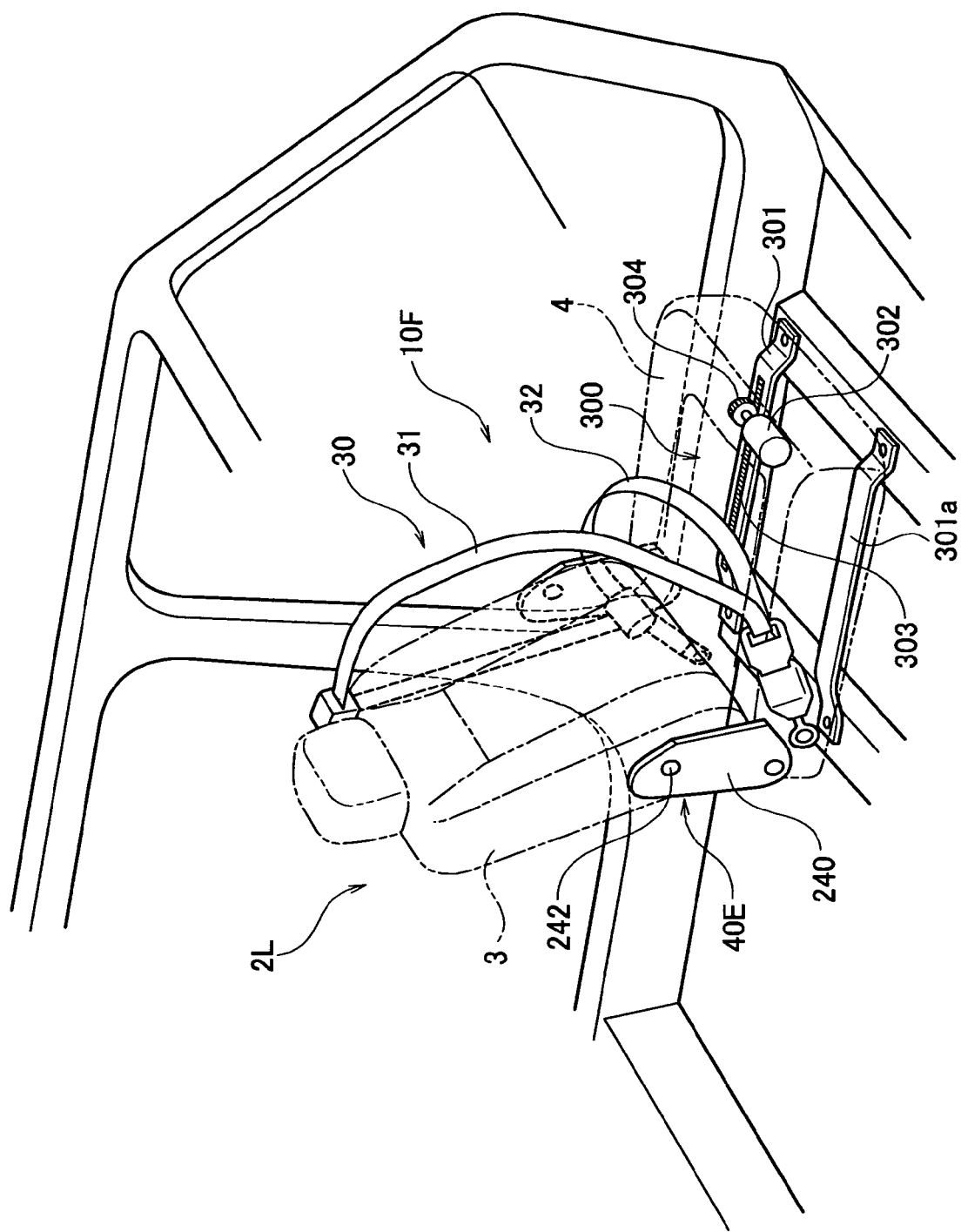
FIG. 54 is a perspective view of the left-hand seat with the seat back tilted back due to a rollover condition being detected in accordance with the seventh embodiment of the present invention.
Figure 55:
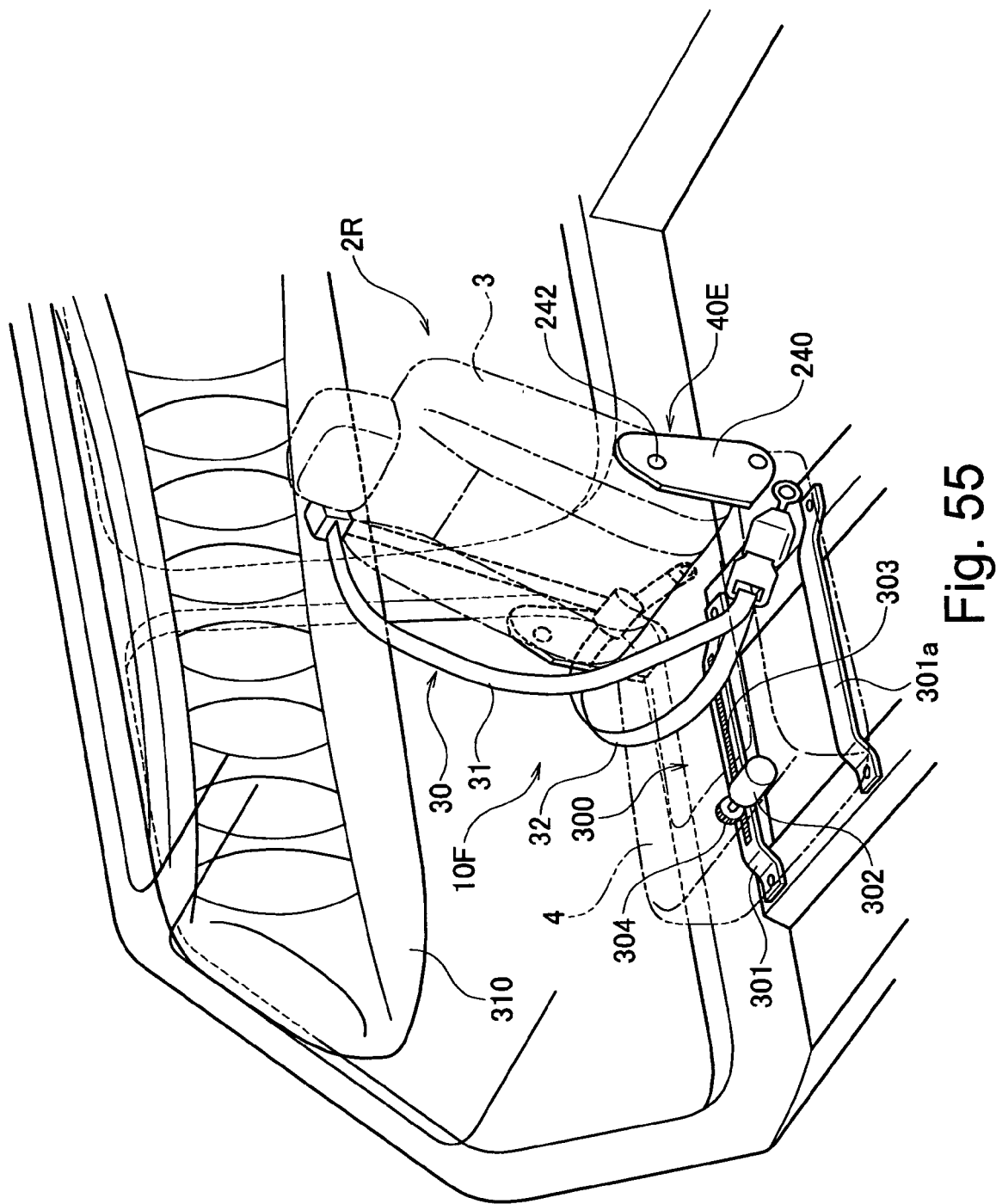
FIG. 55 is a perspective view of the right-hand seat during a rollover condition in accordance with the seventh embodiment of the present invention.
Figure 56:
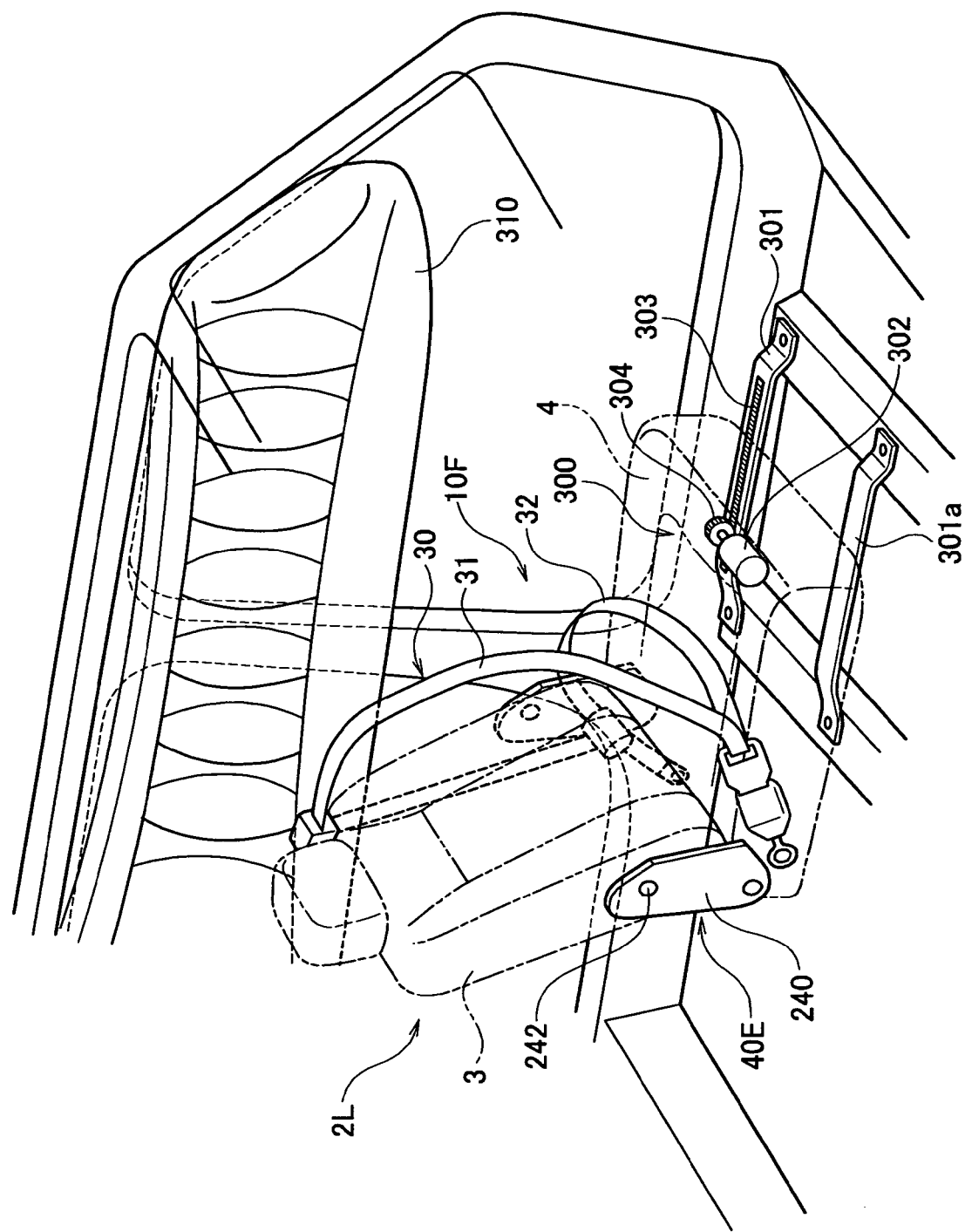
FIG. 56 is a perspective view of the left-hand seat in a tilted-back state during a rollover condition in accordance with the seventh embodiment of the present invention.
Figure 57:
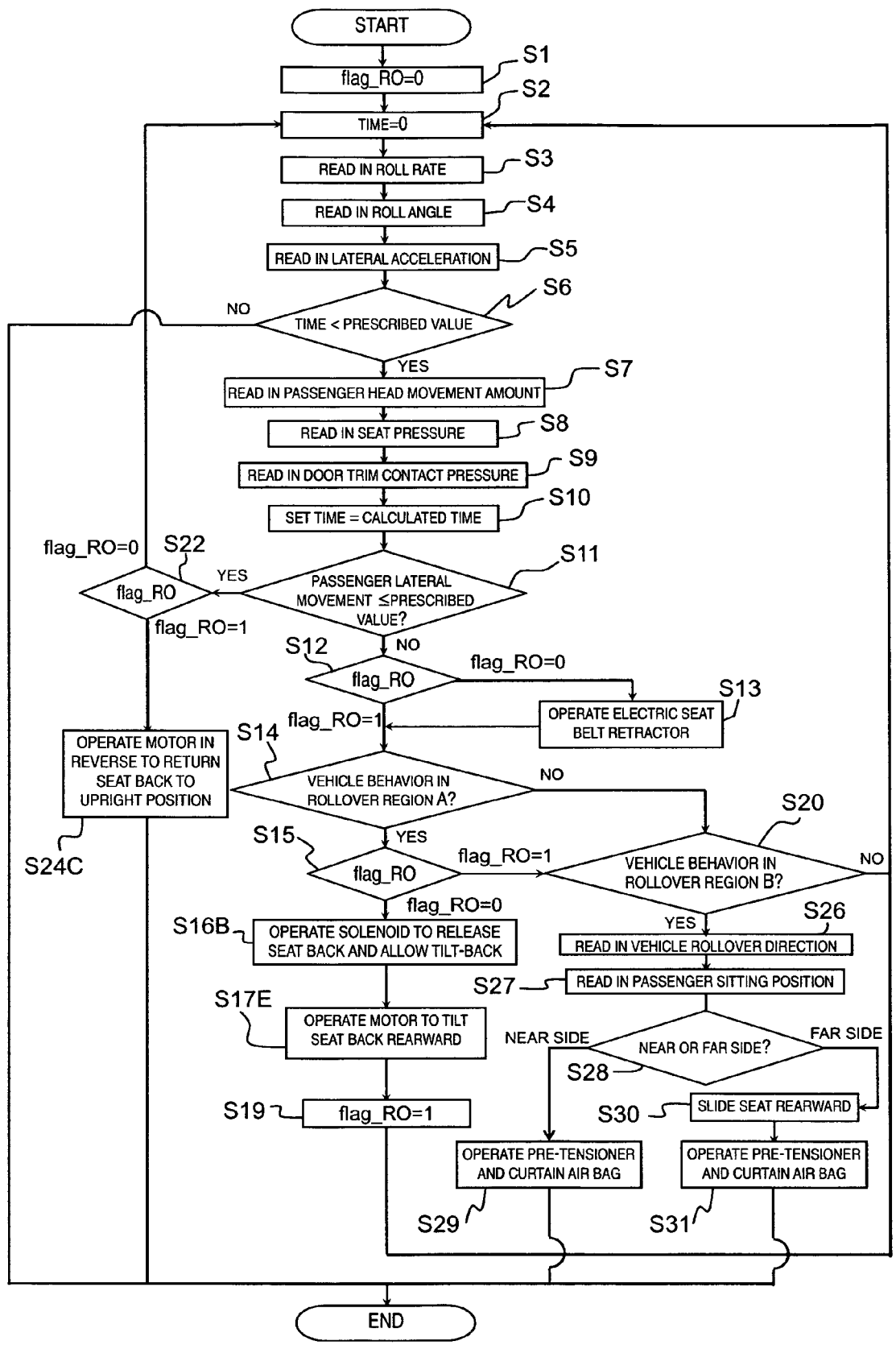
FIG. 57 is a flowchart showing the control operations executed by the controller in order to control the passenger restricting system in accordance with the seventh embodiment of the present invention.

FIG. 51 is a perspective view of the right-hand seat during normal driving conditions. FIG. 52 is a perspective view of the left-hand seat during normal driving conditions. FIG. 53 is a perspective view of the right-hand seat with the seat back tilted back due to detection of a vehicle rollover condition. FIG. 54 is a perspective view of the left-hand seat with the seat back tilted back due to detection of a vehicle rollover condition. FIG. 55 is a perspective view of the right-hand seat during a rollover condition. FIG. 56 is a perspective view of the left-hand seat during a rollover condition. FIG. 57 is a flowchart showing the control operations executed in order to control the passenger restricting system.

The vehicle rollover passenger restricting system 10F of this embodiment is basically the same as the first embodiment in that it is provided with the vehicle rollover detector 20, the seat belt apparatus 30 serving as a passenger restraining device, any one of the seat back tilt-back device 40 and 40A to 40E described in the first to sixth embodiments, and the controller 50. In this embodiment, it will be assumed that the seat back tilt-back device 40E of the sixth embodiment is used and a detailed explanation thereof is omitted.

As shown in FIGS. 51 and 52, in this embodiment, the seat 2R arranged on the right-hand side of the vehicle and the seat 2L arranged on the left-hand side of the vehicle are each provided with a seat retracting device 300 configured to move the seats 2R and 2L rearward by a prescribed amount. When a rollover condition is detected, the controller 50 operates the seat retracting device 300.

The seat belt apparatus 30, the seat back tilt-back device 40E, and the seat retracting device 300 of the right-hand seat 2R have the same constituent features as and are symmetrically arranged and configured with respect to the seat belt apparatus 30, the seat back tilt-back device 40E, and the seat retracting device 300 of the left-hand seat 2L. The same reference numerals are assigned to corresponding component parts of both seats 2R and 2L.

The seat retracting device 300 includes: seat rails 301 and 301a configured and arranged to support the seat cushion 4 on a floor of the vehicle in such a fashion that the seat cushion 4 can be moved back and forth along the longitudinal direction of the vehicle; and a motor 302 serving as an actuator configured and arranged to drive the seat cushion 4 toward the rear of the vehicle along the seat rails 301 and 301a when a rollover condition is detected.

A rack gear 303 is provided on the seat rail 301 and the motor 302 is mounted to the seat cushion 4. The motor 302 is provided with a pinion gear 304 configured and arranged to mesh with the rack gear 302 such that the seat cushion 4 and the seat 2 as a whole can be moved back and forth along the longitudinal direction of the vehicle by driving the motor 302. When a rollover condition is detected, the motor 302 is driven in such a direction that the seat cushion 4 is retracted (moved toward the rear of the vehicle).

When the vehicle 1 rolls over, it exhibits the stages of behavior shown in diagrams (a) to (d) of FIGS. 49. Diagram (a) of FIG. 49 illustrates the state of the vehicle body immediately before rollover. Diagram (b) of FIG. 49 illustrates the state of the vehicle body when it has rotated a quarter turn. Diagram (c) of FIG. 49 illustrates the state of the vehicle body when it has rotated one half of a turn. Diagram (d) of FIG. 49 illustrates the state of the vehicle body after it has rotated one half of a turn.

Diagrams (a) to (d) of FIG. 50 correspond to diagrams (a) to (d) of FIG. 49, respectively, and illustrate the behavior of the seats 2R and 2L during a rollover condition. Diagram (a) of FIG. 50 (which corresponds to diagram (a) of FIG. 49) shows a passenger C seated during normal driving conditions with the seat belt apparatus 30 fastened. The longitudinal positions of the left and right seats 2R and 2L are set in accordance with the physique of the respective passengers C as shown in FIGS. 51 and 52.

Diagram (b) of FIG. 50 (which corresponds to diagram (b) of FIG. 49) shows the state of the passenger restricting system 10F immediately after a rollover condition has been detected. The electric retractor 36 retracts the seat belt webbing 37 such that the shoulder belt 31 is drawn in and securely restrains the passenger C to the seat back 3.

Diagram (c) of FIG. 50 (which corresponds to diagram (c) of FIG. 49) shows the state of the passenger restricting system 10F after the vehicle has progressed further into the rollover condition. As shown in FIGS. 53 and 54, the seat backs 3 of the left and right seats 2R and 2L have been tilted back by a prescribed amount.

Diagram (d) of FIG. 50 (which corresponds to diagram (d) of FIG. 49) shows the state of the passenger restricting system 10F after the vehicle has progressed still further into the rollover condition. As shown in FIGS. 55 and 56, the seat 2 that is positioned farther from the rotational center of the vehicle as a result of the sitting position of the passenger C and the rotation direction of the vehicle is moved rearward toward the back of the vehicle. For example, in the case of a rightward rollover, the left-hand seat 2L is moved toward the rear of the vehicle. Conversely, in the case of a leftward rollover, the right-hand seat 2R is moved toward the rear of the vehicle. Meanwhile, curtain air bags 310 are deployed next to both the left and right seats 2R and 2L.

The control flowchart for the passenger restricting system 10F of this embodiment is basically the same as the control flowchart shown in FIG. 48 for the passenger restricting system 10E of the sixth embodiment. However, in this embodiment, the control executed after step S20 is different when it is determined that the vehicle behavior lies in the region B of the map. More specifically, after determining in step S20 that a rollover condition exists, the controller 50 proceeds to step S26 and reads in the detected rotation direction in which the vehicle is rolling over. The controller 50 then proceeds to step S27 and detects which of the seats 2R and 2L a passenger C is sitting in.

In step S28, the controller 50 determines if the seat in which the passenger C is sitting is closer to the rotational center (near side) or farther from the rotational center (far side) of the vehicle. If the passenger C is in sitting on the near side, the controller 50 proceeds to step S29 and operates the pre-tensioner of the electric retractor 36 while also deploying the curtain air bags 310 as shown in FIG. 55.

Meanwhile, if the passenger C is determined to be on the far side in step S28, the controller 50 proceeds to step S30 and moves the seat 2L rearward by a prescribed amount as shown in FIG. 56. The controller 50 then proceeds to step S31 and operates the pre-tensioner of the electric retractor 36 while also deploying the curtain air bags 310 as shown in FIG. 55.

In this embodiment, too, a map is used to determine if a rollover condition exists. An explanation of the map is omitted here because the map is the same as the map shown in FIG. 11 of the first embodiment.

Similarly to the first embodiment, the vehicle rollover passenger restricting system 10F of this embodiment is configured such that when a rollover condition is detected, the passenger C can be tilted back by a prescribed amount along with the seat back 3 while being restrained in the seat 2. As a result, by tilting back the seat back 3, the space between the passenger's head Ch and the ceiling of the passenger compartment can be enlarged and contact of the passenger's head Ch against the ceiling can be suppressed in an effective manner.

In this embodiment, the seats 2R and 2L are provided with seat retracting device 300 and the seat 2R or 2L that is farther from the rotational center of the vehicle is moved toward the rear of the vehicle when the vehicle is in a rollover condition. Consequently, an even larger gap can be secured between the head Ch of the passenger C and the ceiling. As a result, any input of force toward the head of the passenger C from a frontward portion of the roof can be alleviated more readily.

Figure 58:
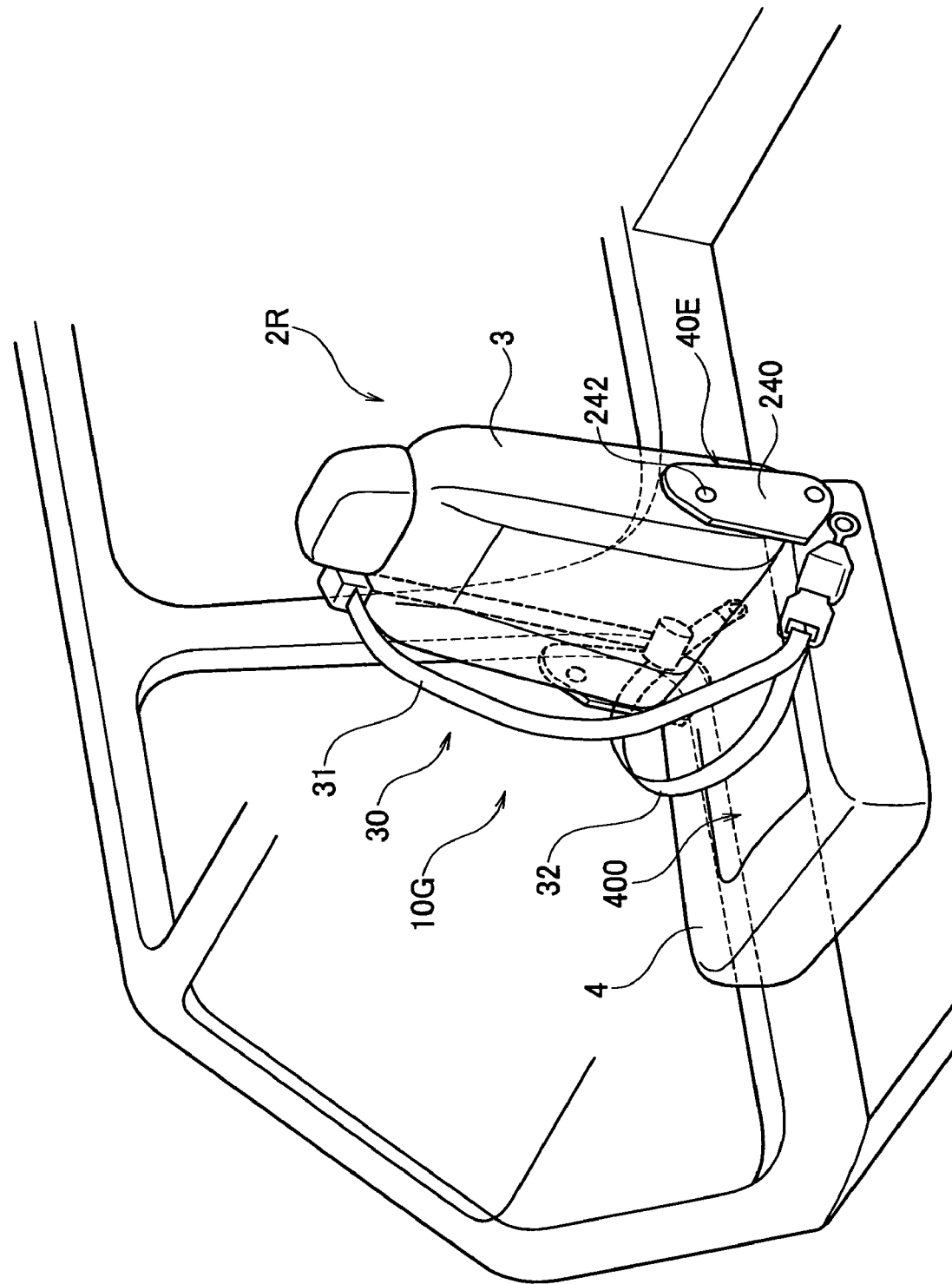
FIG. 58 is a perspective view of a right-hand seat during normal driving conditions in an eight embodiment of the present invention.
Figure 59:
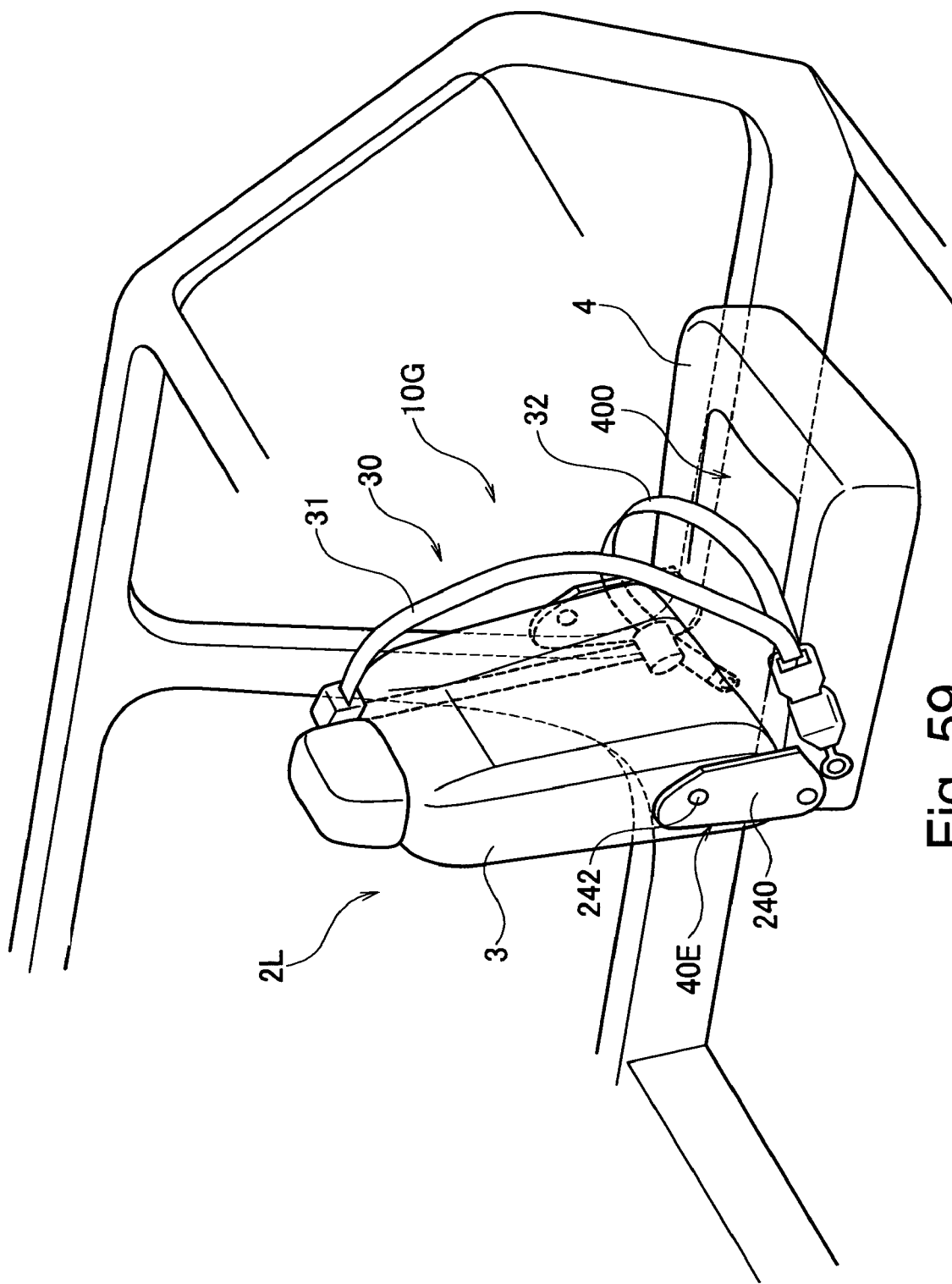
FIG. 59 is a perspective view of the left-hand seat during normal driving conditions in accordance with the eighth embodiment of the present invention.
Figure 60:
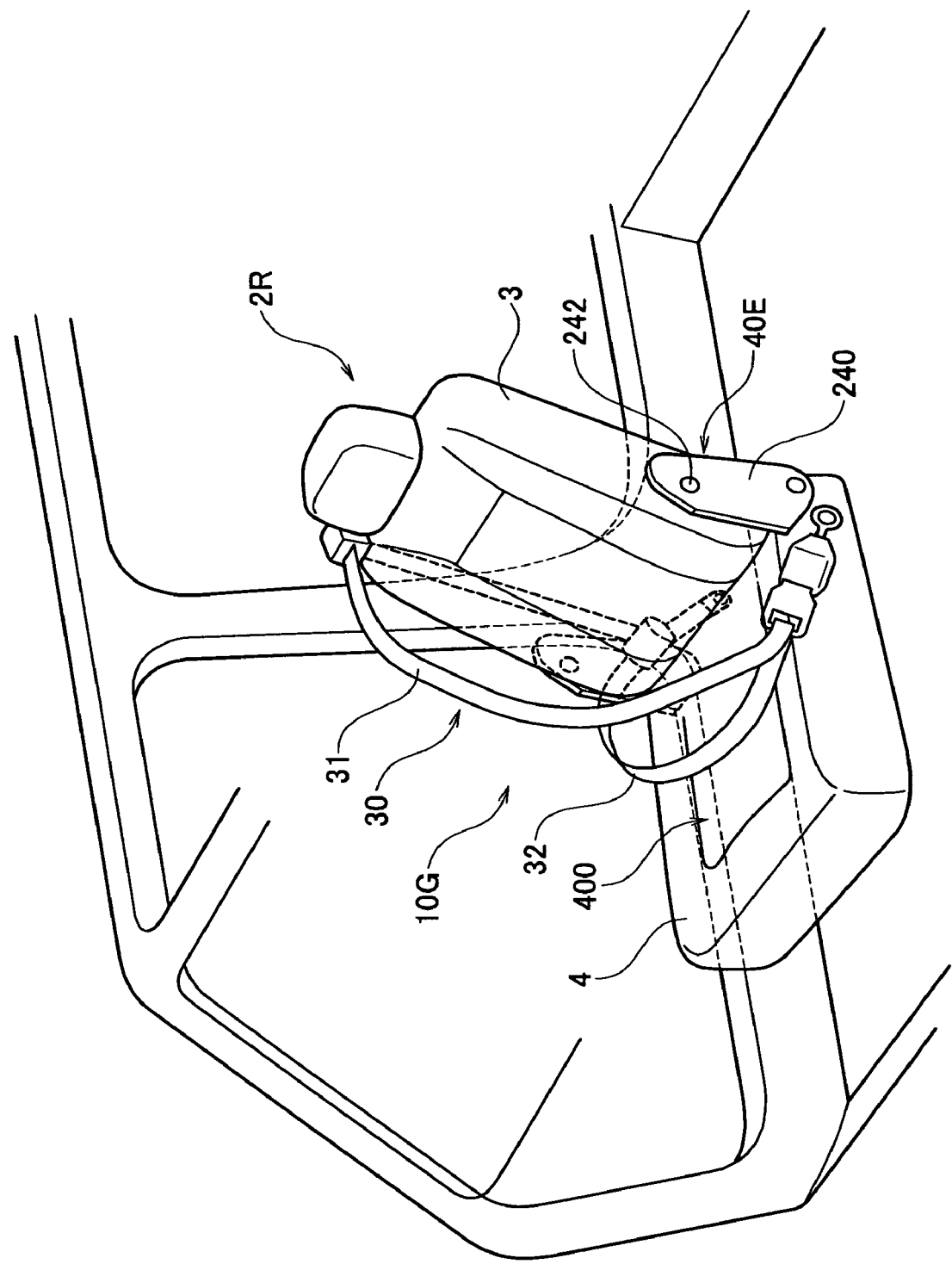
FIG. 60 is a perspective view of the right-hand seat with the seat back tilted back due to a rollover condition being detected in accordance with the eighth embodiment of the present invention.
Figure 61:
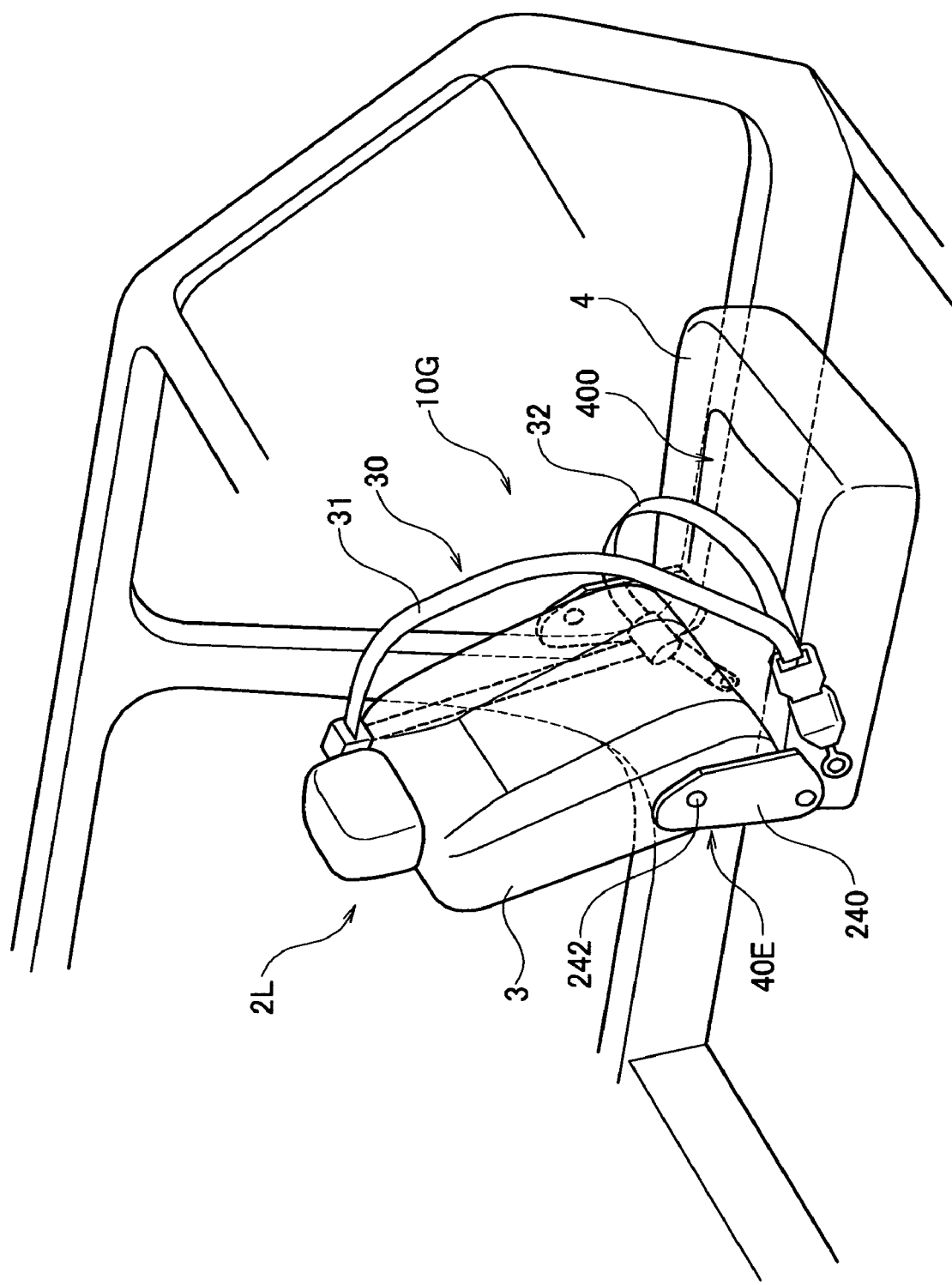
FIG. 61 is a perspective view of the left-hand seat with the seat back tilted back due to a rollover condition being detected in accordance with the eighth embodiment of the present invention.
Figure 62:
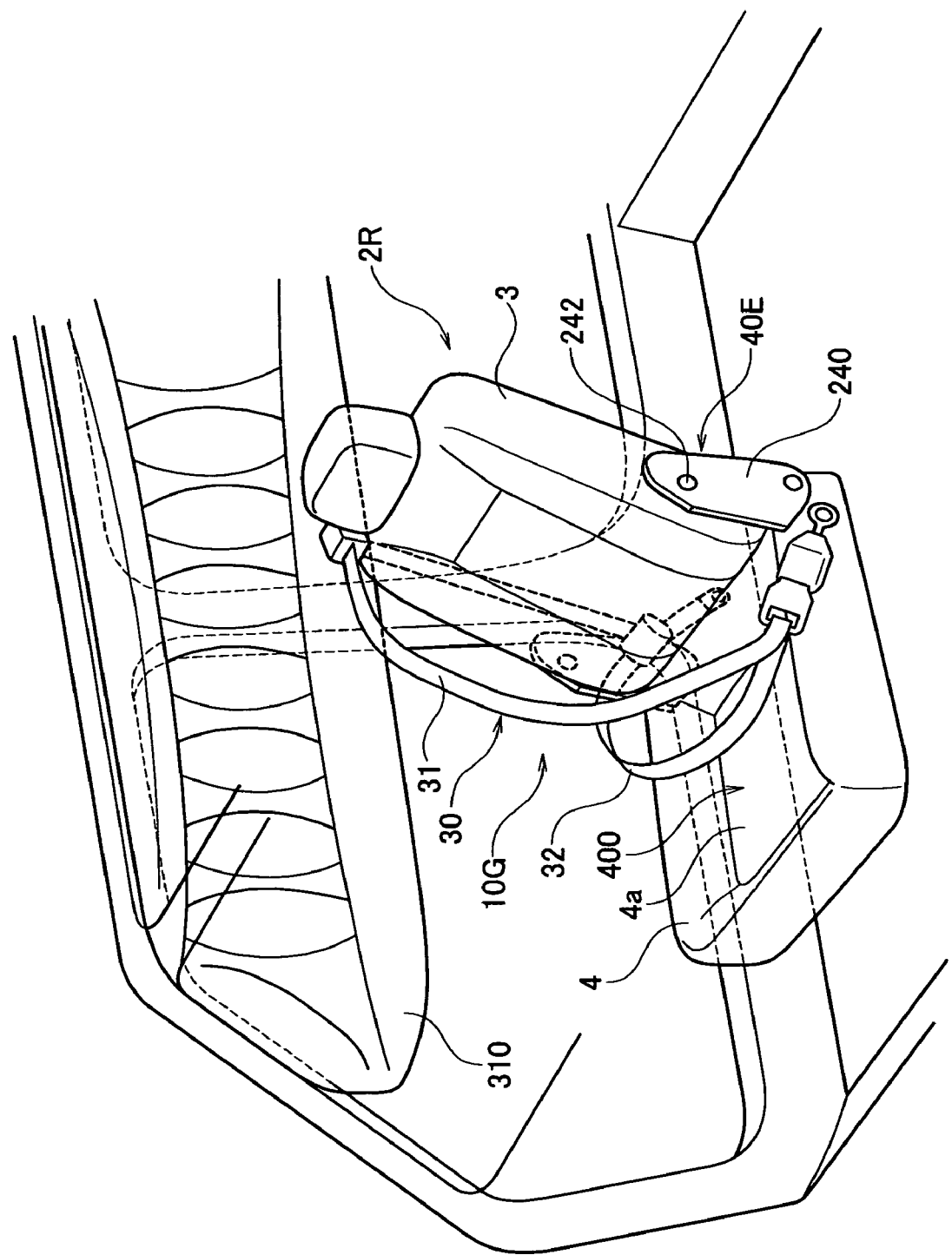
FIG. 62 is a perspective view of the right-hand seat during a rollover condition in accordance with the eighth embodiment of the present invention.
Figure 63:
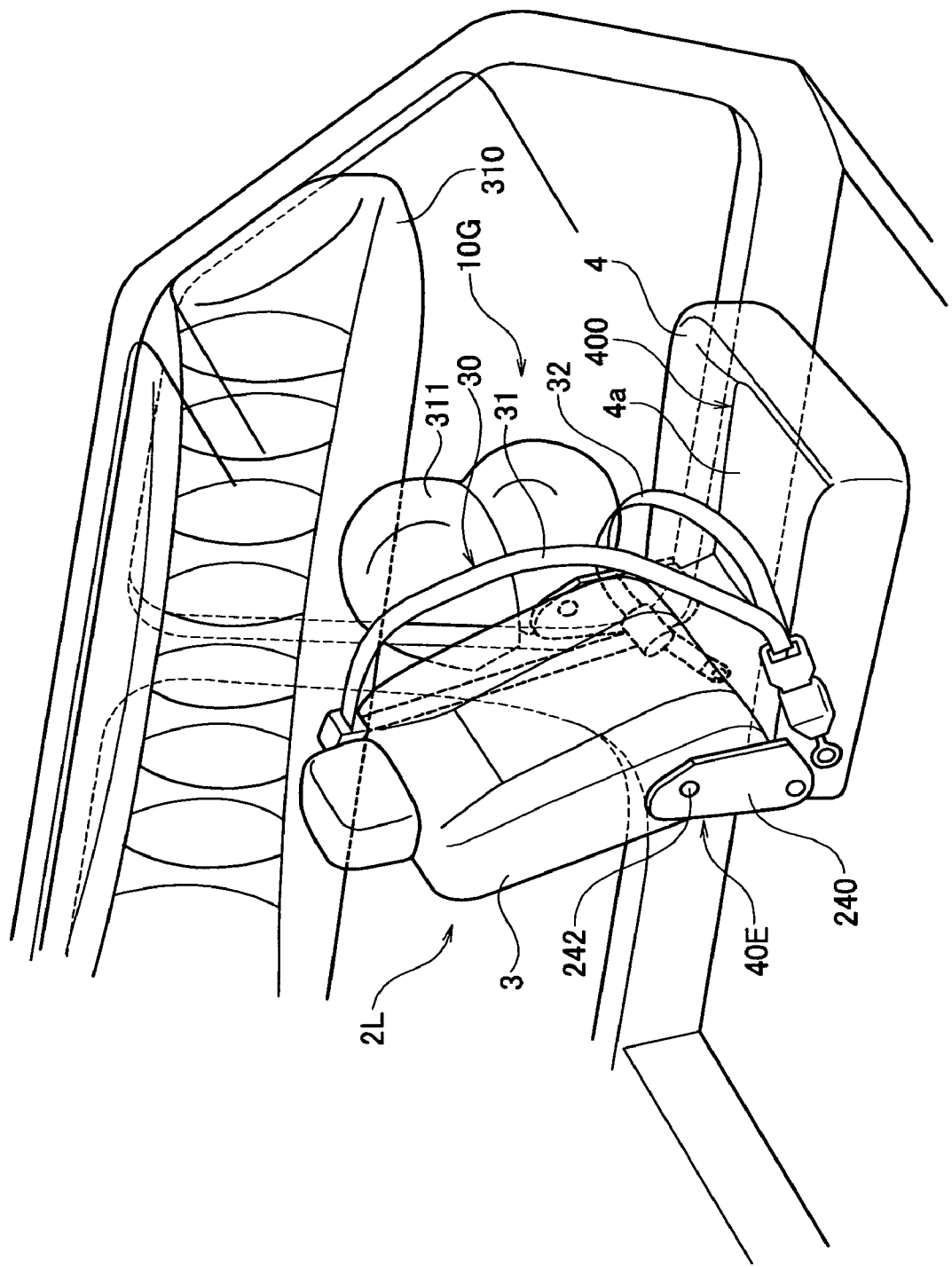
FIG. 63 is a perspective view of the left-hand seat during a rollover condition in accordance with the eighth embodiment of the present invention.

FIGS. 58 to 68 show an eighth embodiment of the present invention. Parts that are the same as the parts of the previously explained embodiments are indicated with the same reference numerals and explanations thereof are omitted for the sake of brevity. FIG. 58 is a perspective view of the right-hand seat during normal driving conditions. FIG. 59 is a perspective view of the left-hand seat during normal driving conditions. FIG. 60 is a perspective view of the right-hand seat with the seat back tilted back due to detection of a vehicle rollover condition. FIG. 61 is a perspective view of the left-hand seat with the seat back tilted back due to detection of a vehicle rollover condition. FIG. 62 is a perspective view of the right-hand seat during a rollover condition. FIG. 63 is a perspective view of the left-hand seat during a rollover condition.

Figure 64:
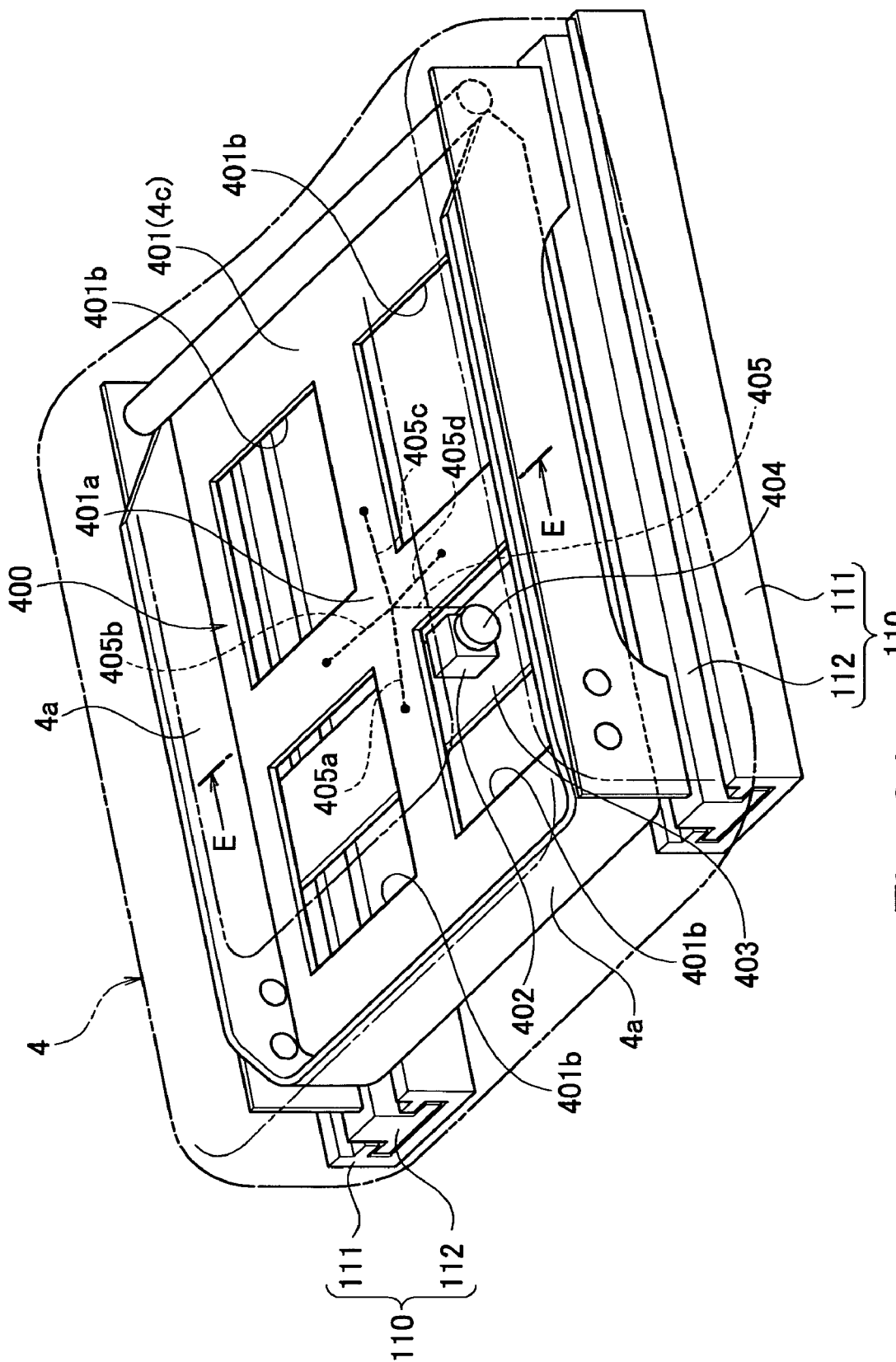
FIG. 64 is an enlarged perspective view of the internal structure of a seat cushion in accordance with the eighth embodiment of the present invention.
Figure 65:
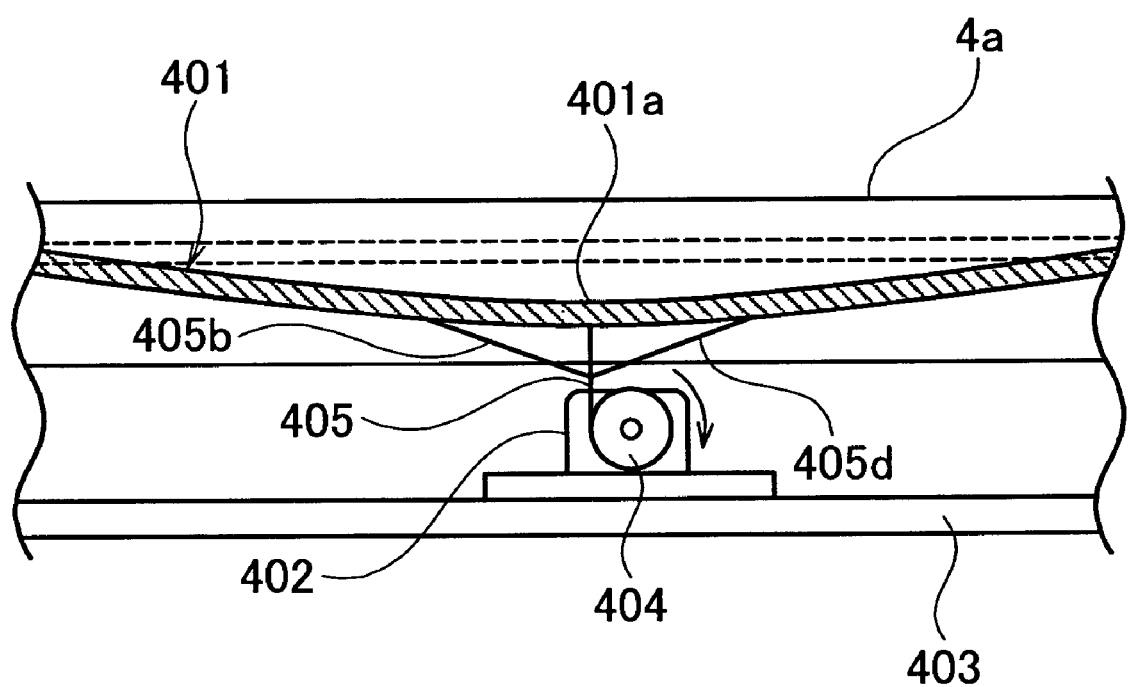
FIG. 65 is an enlarged cross sectional view of the internal structure of the seat cushion as seen along the section line E-E of FIG. 64.
Figure 66:
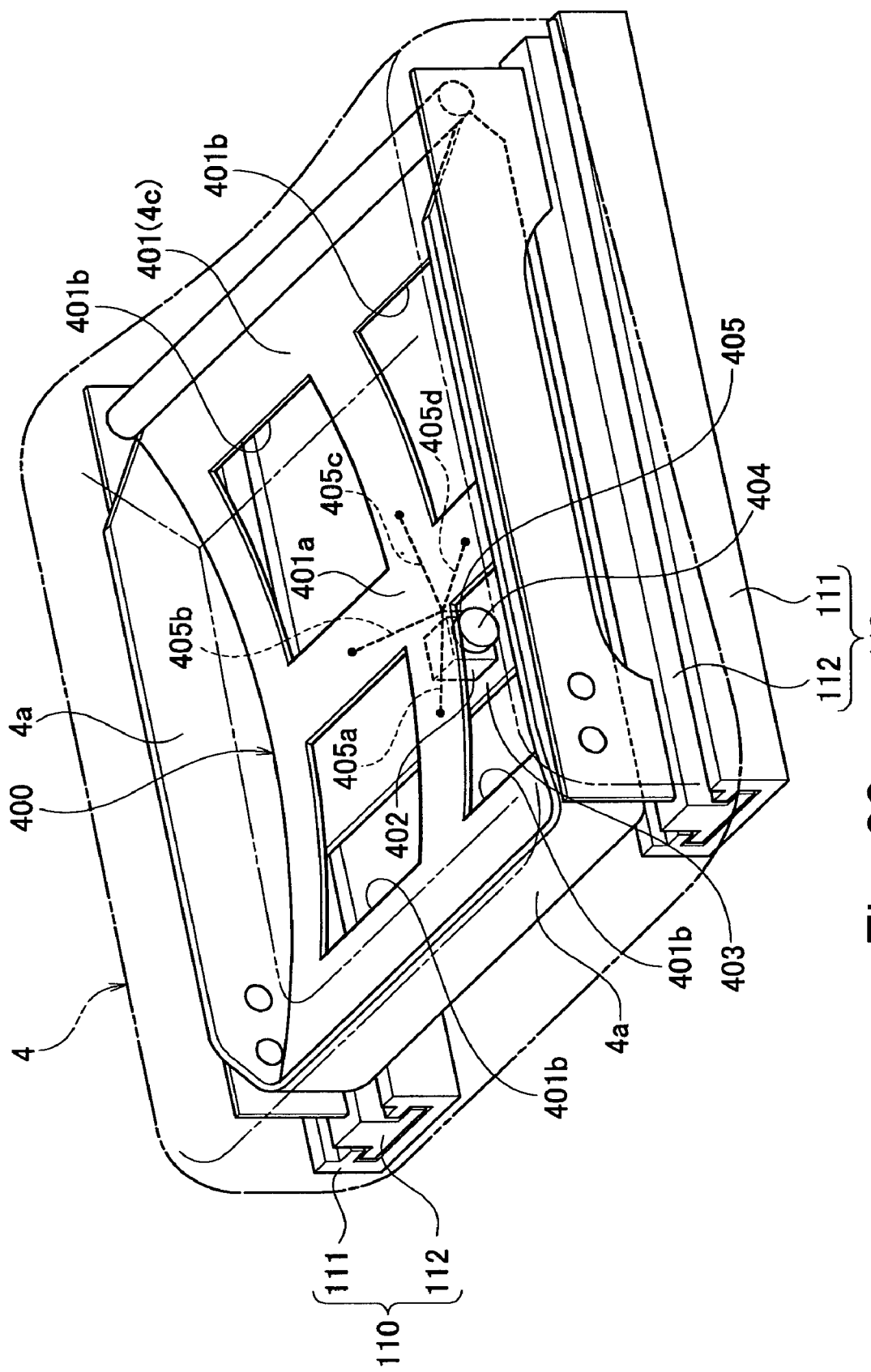
FIG. 66 is an enlarged perspective view showing the internal structure of the seat cushion when the seat cushion is in a lowered state in accordance with the eighth embodiment of the present invention.
Figure 67:
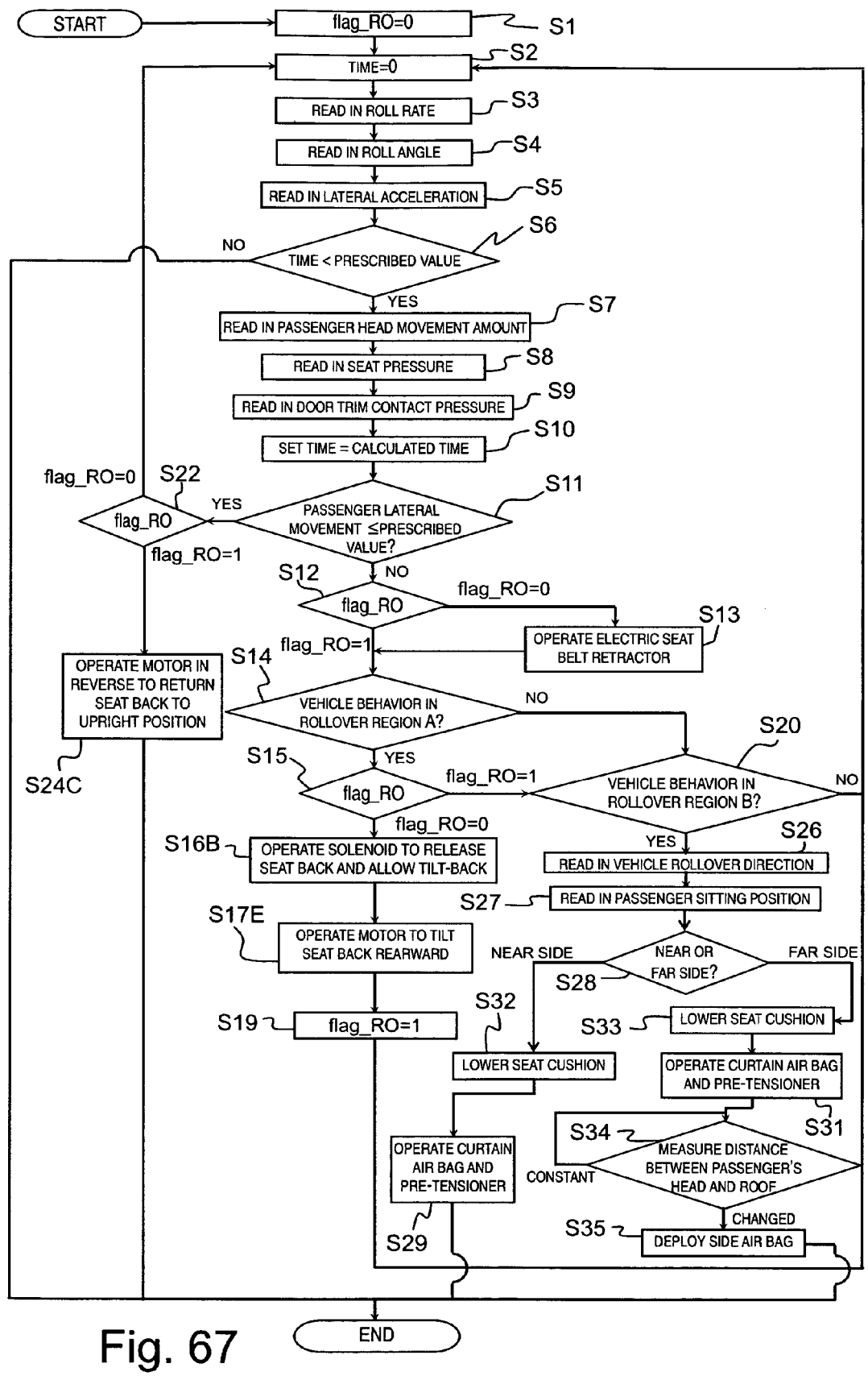
FIG. 67 is a flowchart showing the control operations executed by the controller in order to control the passenger restricting system in accordance with the eighth embodiment of the present invention.
Figure 68:
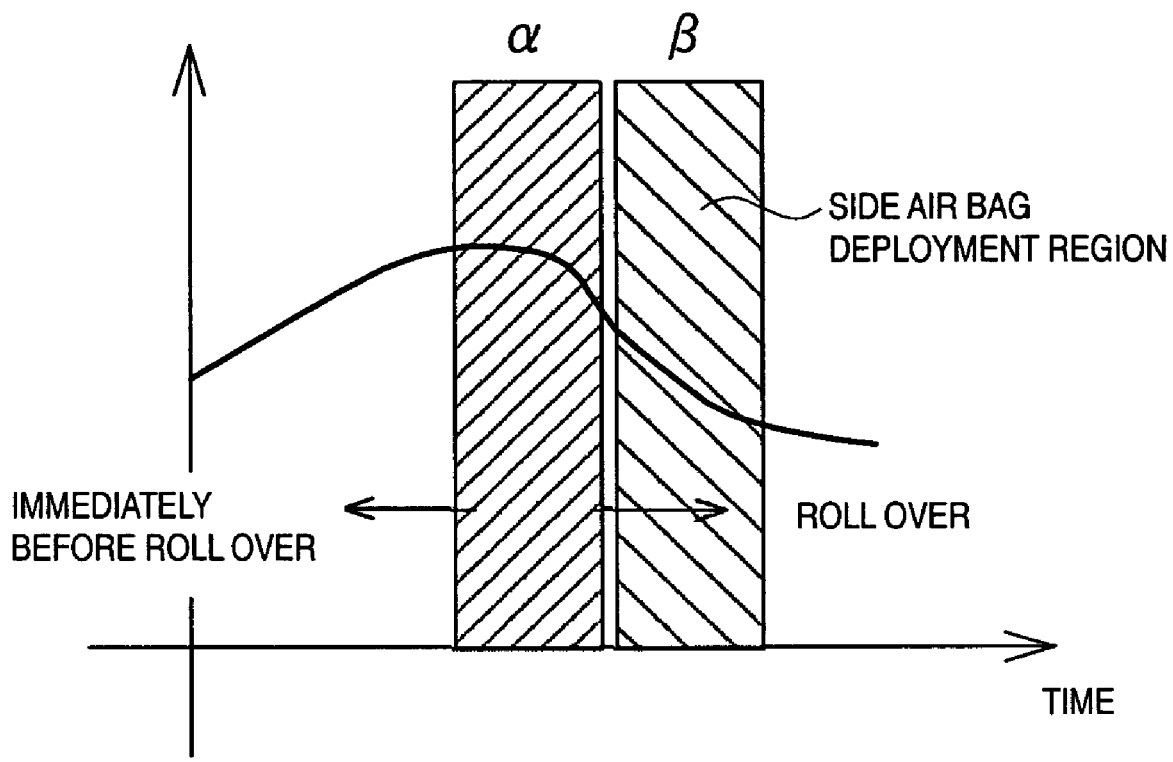
FIG. 68 is a map for deploying a side air bag used in accordance with the eight embodiment of the present invention.

FIG. 64 is an enlarged perspective view showing the internal structure of a seat cushion. FIG. 65 is an enlarged cross sectional view taken along the section line E-E of FIG. 64. FIG. 66 is an enlarged perspective view showing the internal structure of the seat cushion when the seat cushion is in a lowered state. FIG. 67 is a flowchart showing the control operations executed in order to control the passenger restricting system. FIG. 68 is a map for deploying a side air bag.

The vehicle rollover passenger restricting system 10G of this embodiment is basically the same as the first embodiment in that it is provided with the vehicle rollover detector 20, the seat belt apparatus 30 serving as a passenger restraining device, any one of the seat back tilt-back device 40 and 40A to 40E described in the first to sixth embodiments, and the controller 50. In this embodiment, it will be assumed that the seat back tilt-back device 40E of the sixth embodiment is used and a detailed explanation thereof is omitted.

In this embodiment, each of the seats 2R and 2L is provided with a seat cushion lowering device 400 configured to lower the seat cushion 4 by a prescribed amount as shown in FIGS. 64 to 66 and the controller 50 operates the seat cushion lowering device 400 when a rollover condition is detected.

The seat belt apparatus 30, the seat back tilt-back device 40E, and the seat cushion lowering device 400 of the right-hand seat 2R have the same constituent features as and are symmetrically arranged and configured with respect to the seat belt apparatus 30, the seat back tilt-back device 40E, and the seat cushion lowering device 400 of the left-hand seat 2L. The same reference numerals are assigned to corresponding component parts of both seats 2R and 2L.

The seat cushion lowering device 400 includes a seat plate 401 possessing an elastic quality and forming the sitting surface 4c of the seat cushion 4 and a motor 402 serving as an actuator configured and arranged to warp (flex) the seat plate 401 downward when a rollover condition is detected.

The four large rectangular openings 401b are formed in the seat plate 401 at four corner portions thereof such that a cross-shaped bridge 401a remains in the middle. As shown in FIG. 65, a shelf 403 is connected to a seat cushion frame 4a so as to be arranged below the seat plate 401. A motor 402 is provided on a middle portion of the shelf 403, i.e., in a position corresponding to the middle of the cross-shaped bridge 401a, and a pulley 404 is provided on the motor 402. A wire 405 whose tip end is divided into four branches 405a to 405d is wound onto the pulley 404.

The tip of each of the branches 405a to 405d of the wire 405 is connected to a different section of the cross-shaped bridge 401a at a position near the middle of the respective section. Thus, when the motor 402 is rotated in the direction of winding in the wire 405, the wire 405 is wound onto the pulley 404 and the cross-shaped bridge 401a is pulled downward as shown in FIG. 66. As a result, the entire seat plate 401 is warped into a downwardly concave form and the sitting surface 4c of the seat cushion 4 is lowered.

The motor 402 is rotated such that the wire 405 is retracted by a prescribed amount and then the rotation is stopped. The seat plate 401 is held in a lowered state by continuing to apply current to the motor or by some other structure of maintaining the retracting force acting on the wire 405. When the current to the motor 402 is shut off, the elastic force of the seat plate 401 causes the wire 405 to unwind and the seat plate 401 to return to its original state, thereby causing the sitting surface 4c to rise. In this way, the seat cushion lowering device 400 is provided with a reversible function.

Similarly to the seventh embodiment, when the vehicle 1 rolls over, it exhibits the stages of behavior shown in diagrams (a) to (d) of FIG. 49. Diagram (a) of FIG. 50 corresponds to diagram (a) of FIG. 49 and shows a passenger C seated with the seat belt apparatus 30 fastened immediately before a rollover condition is detected (same as during normal driving conditions). The longitudinal positions of the left and right seats 2R and 2L are set in accordance with the physique of the respective passengers C as shown in FIGS. 58 and 59.

Diagram (b) of FIG. 50 corresponds to diagram (b) of FIG. 49 and shows the state of the passenger restricting system 10G immediately after a rollover condition has been detected, i.e., when the vehicle has rotated by a quarter turn. The electric retractor 36 retracts the seat belt webbing 37 such that the shoulder belt 31 is drawn in and securely restrains the passenger C to the seat back 3.

Diagram (c) of FIG. 50 corresponds to diagram (c) of FIG. 49 and shows the state of the passenger restricting system 10G after the vehicle has progressed further into the rollover condition, i.e., when the vehicle has rotated by one half of a turn. As shown in FIGS. 60 and 61, the seat backs 3 of the left and right seats 2R and 2L have been tilted back by a prescribed amount.

Diagram (d) of FIG. 50 corresponds to diagram (d) of FIG. 49 and shows the state of the passenger restricting system 10G after the vehicle has progressed still further into the rollover condition, i.e., when the vehicle has rotated by more than one half of a turn. As shown in FIGS. 62 and 63, the seat cushions 4 of the left and right seats 2R and 2L have been lowered.

In addition, when a rollover condition occurs, the curtain air bags 310 next to both the left and right seats 2R and 2L are deployed and a side air bag 311 stored inside the seat back 3 of the seat on the side that is farther from the rotational center of the vehicle (seat 2L in this embodiment) is deployed in accordance with the distance with respect to the roof.

The control flowchart for the passenger restricting system 10G of this embodiment is basically the same as the control flowchart shown in FIG. 57 for the passenger restricting system 10F of the seventh embodiment. However, in this embodiment, the control steps executed after the determination of whether the passenger C is on the near side or the far side, i.e., after step S28, are different.

In this embodiment, too, a map is used to determine if a rollover condition exists. An explanation of the map is omitted here because the map is the same as the map shown in FIG. 11 of the first embodiment. In this embodiment, a map is also used to determine if the side air bag 311 should be deployed.

As shown in FIG. 68, the determination regarding the side air bag 311 is made based on a correlation between the time and the distance with respect to the roof. The region α is a rollover determination region and the region β is a region for deploying the side air bag 311. The deployment region β is set to occur at a prescribed amount of time after the determination region α.

Steps of the control flowchart for this embodiment that are the same as the steps of the control flowchart shown in FIG. 57 are indicated with the same step numerals as in FIG. 57 and explanations thereof are omitted for the sake of brevity.

In the control flowchart for this embodiment (see FIG. 67), in step S28 the controller 50 determines if the seat in which the passenger C is sitting is on the near side (i.e., the side closer to the rotational center of the vehicle) in the same manner as in the flowchart of FIG. 57. If the passenger C is in sitting on the near side, the controller 50 proceeds to step S32 and lowers the seat cushion 4. The controller 50 then proceeds to step S29, where it operates the pre-tensioner of the electric retractor 36 and deploys the curtain air bags 310.

If it is determined in step S28 that the passenger C is sitting on the far side, the controller 50 proceeds to step S33 and lowers the seat cushion 4 before proceeding to step S31, where it operates the pre-tensioner and deploys the curtain air bags 310. Then, in step S34, the controller 50 measures the distance between the head of the passenger C and the roof. If the distance has changed, the controller 50 proceeds to step S35 and deploys the side air bag 311.

Similarly to the first embodiment, the vehicle rollover passenger restricting system 10G of this embodiment is configured such that when a rollover condition is detected, the passenger C can be tilted back by a prescribed amount along with the seat back 3 while being restrained in the seat 2. As a result, by tilting back the seat back 3, the space between the passenger's head Ch and the ceiling of the passenger compartment can be enlarged and contact of the passenger's head Ch against the ceiling can be suppressed in an effective manner.

In this embodiment, the seats 2R and 2L are provided with a seat cushion lowering device 400 and the seat cushions 4 of both seats 2R and 2L are lowered when the vehicle is in a rollover condition. Consequently, an even larger gap can be secured between the head Ch of the passenger C and the ceiling.

Additionally, in this embodiment, a side air bag 311 is deployed at the seat 2 that is farther (on the far side) from the rotational center of the vehicle about which the vehicle is rolling over. The centrifugal force of the vehicle rotation will tend to make a passenger C sitting on the far side move to an upper portion of the side of the vehicle interior. The side air bag 311 serves to help hold the passenger C in the middle of the interior and, thus, enables an even larger space to be secured above the passenger's head immediately before the roof contacts the ground.

Figure 69:
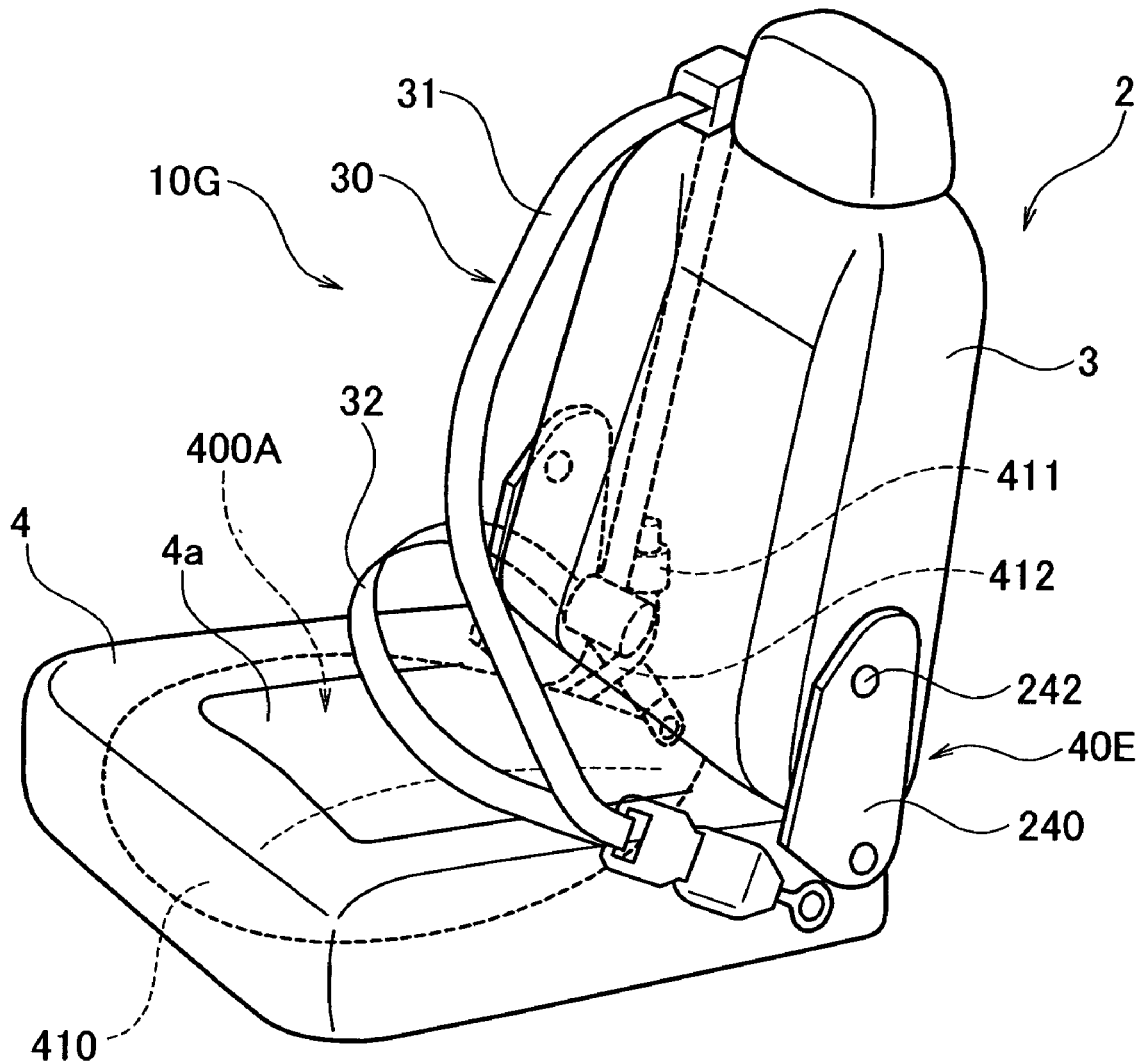
FIG. 69 is a perspective view of a passenger seat in accordance with a variation of the eight embodiment of the present invention, with the seat cushion in the normal driving position.
Figure 70:
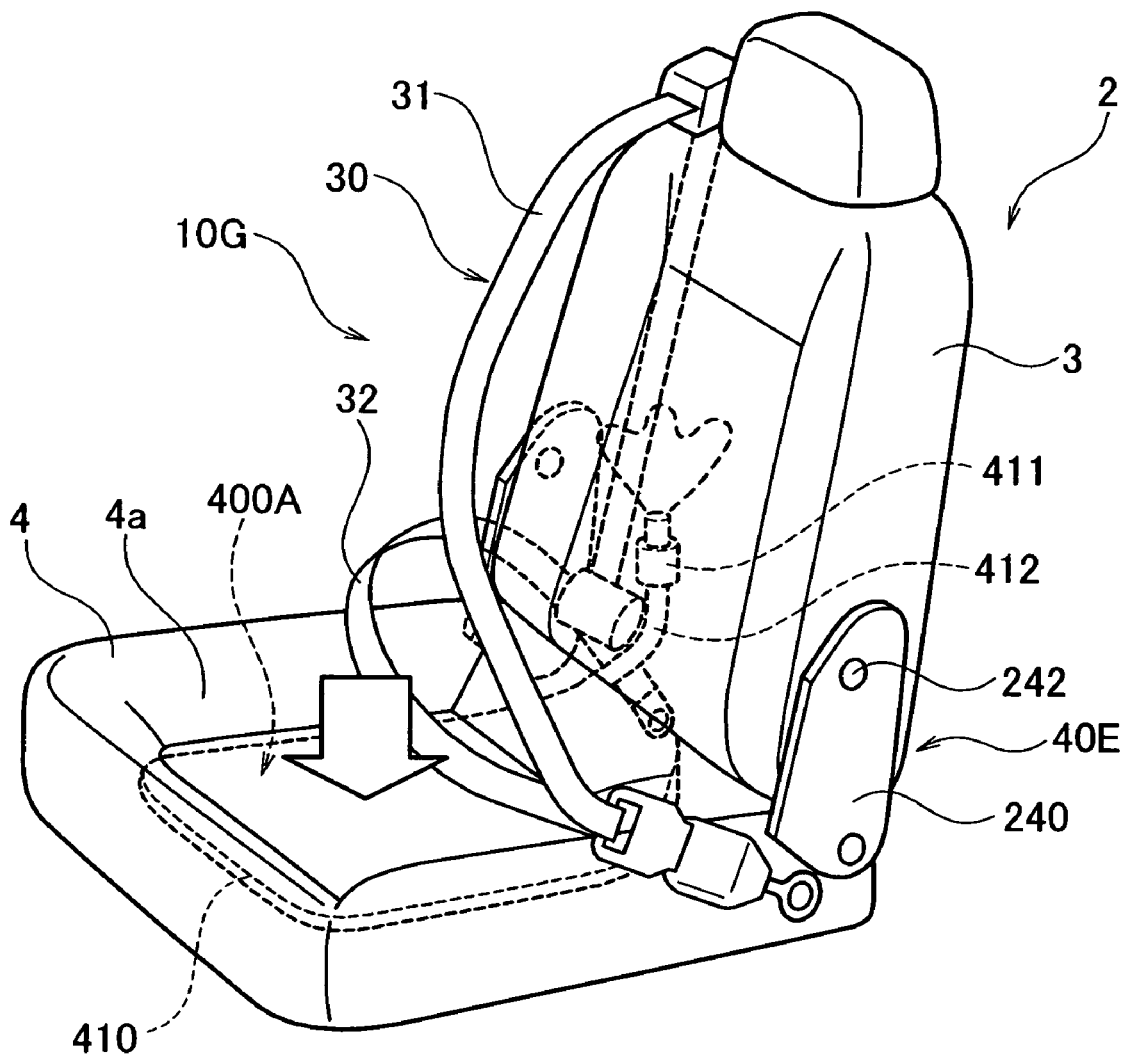
FIG. 70 is a perspective view of the seat in accordance with the variation of the eight embodiment of the present invention with the seat cushion in the lowered position.

FIGS. 69 and 70 show a variation of the eight embodiment. Parts that are the same as the parts of the previously explained eighth embodiment are indicated with the same reference numerals and explanations thereof are omitted for the sake of brevity. FIG. 69 is a perspective view of a seat with the seat cushion in the normal position and FIG. 70 is a perspective view of the seat with the seat cushion in the lowered position.

In this variation, the seat cushion lowering device 400A includes a gas-filled bag 410 inflated with a gas and installed inside the seat cushion 4 and a valve member 411 configured to discharge the gas from inside the gas-filled bag 410 when a rollover condition is detected.

The valve member 411 is a solenoid valve configured to open and close in response to a control signal from the controller 50. The valve member 411 is connected to the gas filled bag 410 through a tube 412. The gas filled bag 410 is configured such that the seat cushion 4 is at a normal height when the gas filled bag 410 is in an inflated state. The gas used to fill the gas filled bag 410 can be air or an inert gas, such as nitrogen.

Thus, in this variation, in order to lower the seat cushion 4 as shown in the FIGS. 62 and 63 of the eighth embodiment, the valve member 411 is opened such that the gas inside the gas filled bag 410 is discharged due to the weight of the passenger C. As the gas filled bag 410 shrinks, the seat cushion 4 is lowered.

The control flowchart for the eighth embodiment shown in FIG. 67 can be used as the control flowchart for this variation. The only difference would be that the lowering of the seat cushion 4 in steps S32 and S33 would involve opening the valve member 411.

The explanations presented above are merely examples. Thus, while only selected embodiments have been chosen to illustrate the present invention, it will be apparent to those skilled in the art from this disclosure that various changes and modifications can be made herein without departing from the scope of the invention as defined in the appended claims. For example, in all of the previously described embodiments, the seat back is tilted rearward when a rollover condition occurs. However, it is also possible to tilt the entire seat rearward, thereby tilting the seat back rearward and widening the space between the passenger's head and the ceiling of the vehicle interior. Also, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle passenger restricting system comprising:
   a passenger seat;
   a rollover detector configured to detect a vehicle rollover condition;
   a vehicle passenger restricting device including a seat belt system having a shoulder belt and a lap belt, the vehicle passenger restricting device being configured to restrict passenger movement on the passenger seat such that webbing of the shoulder belt moves upwardly across a front portion of the passenger seat in response to detection of the vehicle rollover condition by the rollover detector;
   a seat tilting device configured to tilt the seat in a backward direction;
   a controller configured to activate the seat tilting device to tilt the seat backwards in response to detection of the vehicle rollover condition by the rollover detector;
   a mechanical coordinating device mechanically coupling the seat tilting device to the webbing of the shoulder belt of the passenger restricting device and configured to synchronize operation of the seat tilting device and operation of the passenger restricting device in a coordinated manner such that the seat tilting device operates in direct mechanical response to operation of the passenger restricting device.

2. The vehicle passenger restricting system as recited in claim 1, wherein
   the passenger seat has a seat back and a seat cushion,
   the seat tilting device is further configured to recline the seat back in the backward direction relative to the seat cushion; and
   the controller is further configured to activate the seat tilting device to recline the seat back backwards when the rollover detector detects the vehicle rollover condition exists.

3. The vehicle passenger restricting system as recited in claim 2, wherein
   the vehicle passenger restricting device further includes a seat belt retractor built into one of the seat back and the seat cushion to retract the shoulder belt, with the shoulder belt being guided to the retractor from an upper end of the seat back.

4. The vehicle passenger restricting system as recited in claim 3, wherein
   the seat belt retractor includes a retractable motor configured to be used during normal driving and an explosive retractor configured to be used during an emergency situation.

5. The vehicle passenger restricting system as recited in claim 1, further comprising
   a retractable device configured to return the passenger restricting device and the seat tilting device to pre-activation states existing before the rollover condition was detected.

6. The vehicle passenger restricting system as recited in claim 1, wherein
   the seat belt system further includes a seat belt retractor; and
   the coupling device further includes a rotating part of the seat belt retractor, a pulley attached to a pivot shaft of the seat back, and an endless belt transmitting rotation movement between the rotating part and the pivot shaft.

7. The vehicle passenger restricting system as recited in claim 1, wherein
   the seat belt system further includes a seat belt retractor operatively coupled to the shoulder belt; and
   the coupling device further includes a rotary member that is configured to rotate a pivot shaft of the seat back, with the pivot shaft being moved by the shoulder belt that is connected to the seat belt retractor, during detection of the vehicle rollover condition existing.

8. The vehicle passenger restricting system as recited in claim 1, wherein
   the seat belt system further includes a seat belt retractor operatively coupled to the seat belt; and
   the coupling device further includes a roller arranged to guide the shoulder belt along a rear side of the seat back to the seat belt retractor that is attached to the seat cushion, and a roller moving device arranged to move the roller forwardly relative to the seat back to convert a retracting force acting against the shoulder belt by the seat belt retractor into a reclining force acting against the seat back, during detection of the vehicle rollover condition existing.

9. The vehicle passenger restricting system as recited in claim 2, wherein the seat back further includes a reclining device disposed between the seat back and the seat cushion for adjusting a reclining angle of the seat back relative to the seat cushion.

10. The vehicle passenger restricting system as recited in claim 1, wherein the rollover detector further includes a sensor configured to detect both a vehicle roll angle and a vehicle roll rate, and the controller is further configured to determine the vehicle rollover condition exists when at least one of the vehicle roll angle and roll rate detected by the rollover detector exceeds a prescribed value.

11. A vehicle passenger restricting system comprising:

a passenger seat;

a rollover detector including a passenger movement sensor that detects a vehicle rollover condition by sensing passenger movement, the passenger movement sensor including a seat pressure sensor configured to detect a passenger reaction force against the passenger seat;

a vehicle passenger restricting device configured to restrict passenger movement on the passenger seat;

a seat tilting device configured to tilt the seat in a backward direction; and a controller configured to activate the seat tilting device to tilt the seat backwards when the rollover detector detects the vehicle rollover condition exists, the controller determining the vehicle rollover condition exists when a detected value of the seat pressure sensor exceeds a prescribed value.

12. The vehicle passenger restricting system as recited in claim 2, wherein the seat tilting device further includes a plate disposed between the seat back and the seat cushion, the plate including a guide arranged to tilt the seat back in the backward direction, and an automatic actuator powered to produce the backward movement following to the guide of the plate.

13. The vehicle passenger restricting system as recited in claim 2, wherein the passenger restricting device further includes a seat cushion lowering device configured to lower a position of the passenger seat cushion, a seat cushion traveling device configured to produce backward movement of the passenger seat cushion, and an airbag expanded by an inflator activated by a rollover signal from the rollover detector.

14. The vehicle passenger restricting system as recited in claim 13, wherein the passenger seat cushion lowering device further includes an electric actuator configured to lower a height of a surface of the seat cushion relative to a vehicle floor to prescribed value, during detection of the vehicle rollover condition existing.

15. The vehicle passenger restricting system as recited in claim 13, wherein the passenger seat cushion lowering device further includes a gas discharging device configured to lower a height of a surface of the passenger seat cushion from a vehicle floor to a prescribed value, during detection of the vehicle rollover condition existing.

16. The vehicle passenger restricting system as recited in claim 13, wherein the passenger seat cushion traveling device further includes an electric actuator configured to produce the backward movement of the passenger seat cushion from a selected position by the passenger to a preliminary decided certain position, during detection of the vehicle rollover condition existing.

17. A method for restricting a passenger on a passenger seat comprising:

detecting whether a vehicle rollover condition exists;

restricting movement of the passenger on the passenger seat such that webbing of a shoulder belt of a seat belt system moves upward across a front portion of the passenger seat in response to the detecting of the vehicle rollover condition;

reclining the passenger seat to increase a clearance between a passenger's head and a vehicle roof in response to the detecting of the vehicle rollover condition; and mechanically coordinating the restricting of movement of the passenger and the reclining of the passenger seat directly via the webbing of the shoulder belt such that the reclining of the passenger seat synchronically occurs in direct mechanical response to the restricting of movement of the passenger.

18. A vehicle passenger restricting system comprising:

a passenger seat;

a rollover detector configured to detect a vehicle rollover condition;

a vehicle passenger restricting device configured to restrict passenger movement on the passenger seat;

a seat tilting device configured to tilt the seat in a backward direction;

a controller configured to activate the seat tilting device to tilt the seat backwards when the rollover detector detects the vehicle rollover condition exists;

a mechanical coordinating device mechanically coupling the seat tilting device to the passenger restricting device and configured to synchronize operation of the seat tilting device and operation of the passenger restricting device in a coordinated manner such that the seat tilting device operates in direct mechanical response to operation of the passenger restricting device, the seat tilting device and the passenger restricting device both being actuated by a single motor.

19. The vehicle passenger restricting system as recited in claim 11, wherein the passenger movement sensor is further configured to detect an upper torso movement of the passenger and the controller is further configured to determine the vehicle rollover condition exists when the upper torso movement of the passenger exceeds a prescribed value.

20. A method for restricting a passenger on a passenger seat comprising:

sensing passenger movement by detecting a passenger reaction force against the passenger seat;

detecting that a vehicle rollover condition exists when a detected passenger reaction force value exceeds a prescribed value;

restricting movement of the passenger on the passenger seat in response to the detecting that the vehicle rollover condition exists; and reclining the passenger seat to increase a clearance between a passenger's head and a vehicle roof in response to the detecting that the vehicle rollover condition exists.

21. The vehicle passenger restricting system as recited in claim 11, wherein the passenger movement sensor further includes a door trim contact pressure sensor configured to detect a door trim contact pressure distribution and the controller is further configured to determine the vehicle rollover condition exists when a detected value of the door trim contact pressure sensor exceeds a prescribed value.

22. A method for restricting a passenger on a passenger seat comprising:

detecting whether a vehicle rollover condition exists;

restricting movement of the passenger on the passenger seat upon detecting the vehicle rollover condition exists;

reclining the passenger seat to increase a clearance between a passenger's head and a vehicle roof upon detecting the vehicle rollover condition exists; and mechanically coordinating the restricting of movement of the passenger and the reclining of the passenger seat such that the reclining of the passenger seat synchronically occurs in direct mechanical response to the restricting of movement of the passenger, the restricting of movement of the passenger and the reclining of the passenger seat both being actuated by a single motor.

* * * * *